US009805491B2

(12) United States Patent
Herman et al.

(10) Patent No.: US 9,805,491 B2
(45) Date of Patent: Oct. 31, 2017

(54) TECHNIQUES AND WORKFLOWS FOR COMPUTER GRAPHICS ANIMATION SYSTEM

(71) Applicant: DigitalFish, Inc., Burlingame, CA (US)

(72) Inventors: Daniel Lawrence Herman, Burlingame, CA (US); Mark J. Oftedal, Naperville, IL (US)

(73) Assignee: DIGITALFISH, INC., Burlingame, CA (US)

( * ) Notice: Subject to any disclaimer, the term of this patent is extended or adjusted under 35 U.S.C. 154(b) by 0 days.

(21) Appl. No.: 14/942,833

(22) Filed: Nov. 16, 2015

(65) Prior Publication Data
US 2016/0078662 A1    Mar. 17, 2016

Related U.S. Application Data

(63) Continuation of application No. 12/494,219, filed on Jun. 29, 2009, now Pat. No. 9,216,351, which is a
(Continued)

(51) Int. Cl.
*G06T 13/00*     (2011.01)
*G06T 13/20*     (2011.01)
(Continued)

(52) U.S. Cl.
CPC .............. *G06T 13/20* (2013.01); *A63F 13/10* (2013.01); *A63F 13/52* (2014.09); *G06F 3/0481* (2013.01);
(Continued)

(58) Field of Classification Search
None
See application file for complete search history.

(56) References Cited

U.S. PATENT DOCUMENTS 5,267,154 A    11/1993  Takeuchi et al.
5,511,158 A     4/1996  Sims
(Continued)

FOREIGN PATENT DOCUMENTS

EP    0461577 A2    12/1991
EP    0466154 A2     1/1992
(Continued)

OTHER PUBLICATIONS

International Preliminary Report on Patentability mailed Mar. 12, 2009 in International Patent Application No. PCT/US2006/014713, filed Apr. 18, 2006.
(Continued)

*Primary Examiner* — Andrew G Yang
(74) *Attorney, Agent, or Firm* — Davis Wright Tremaine LLP; Philip H. Albert

(57) ABSTRACT

The disclosed implementations describe techniques and workflows for a computer graphics (CG) animation system. In some implementations, systems and methods are disclosed for representing scene composition and performing underlying computations within a unified generalized expression graph with cycles. Disclosed are natural mechanisms for level-of-detail control, adaptive caching, minimal re-compute, lazy evaluation, predictive computation and progressive refinement. The disclosed implementations provide real-time guarantees for minimum graphics frame rates and support automatic tradeoffs between rendering quality, accuracy and speed. The disclosed implementations also support new workflow paradigms, including layered animation and motion-path manipulation of articulated bodies.

51 Claims, 14 Drawing Sheets

Related U.S. Application Data continuation of application No. 11/406,050, filed on Apr. 17, 2006, now abandoned.

(60) Provisional application No. 60/672,459, filed on Apr. 19, 2005.

(51) Int. Cl.
| | |
|---|---|
| *A63F 13/52* | (2014.01) |
| *A63F 13/40* | (2014.01) |
| *G06T 13/40* | (2011.01) |
| *G06F 3/0481* | (2013.01) |

(52) U.S. Cl.
CPC ......... *G06T 13/40* (2013.01); *A63F 2300/66* (2013.01); *G06T 2200/24* (2013.01)

(56) References Cited

U.S. PATENT DOCUMENTS

| | | | |
|---|---|---|---|
| 5,729,673 | A | 3/1998 | Cooper et al. |
| 5,754,189 | A | 5/1998 | Doi et al. |
| 5,852,450 | A | 12/1998 | Thingvold |
| 5,907,317 | A | 5/1999 | Tanaka et al. |
| 6,091,427 | A | 7/2000 | Boezeman et al. |
| 6,111,590 | A | 8/2000 | Boezeman et al. |
| 6,115,036 | A | 9/2000 | Yamato et al. |
| 6,191,798 | B1 | 2/2001 | Handelman et al. |
| 6,326,972 | B1 | 12/2001 | Buhler et al. |
| 6,361,438 | B1 | 3/2002 | Morihira |
| 6,522,331 | B1 | 2/2003 | Danks |
| 6,552,729 | B1 | 4/2003 | Di Bernardo et al. |
| 6,714,201 | B1 | 3/2004 | Grinstein et al. |
| 6,741,270 | B1 | 5/2004 | Rzepkowski et al. |
| 7,151,542 | B2 | 12/2006 | Isner |
| 7,472,046 | B2 | 12/2008 | Rasmussen et al. |
| 2001/0043219 | A1* | 11/2001 | Robotham ............ G06T 7/0022 345/474 |
| 2002/0089541 | A1 | 7/2002 | Orbanes et al. |
| 2002/0140698 | A1 | 10/2002 | Robertson et al. |
| 2004/0012594 | A1* | 1/2004 | Gauthier ................ G06T 13/40 345/473 |
| 2004/0046760 | A1 | 3/2004 | Roberts et al. |
| 2005/0156932 | A1 | 7/2005 | Vienneau et al. |
| 2005/0231512 | A1 | 10/2005 | Niles et al. |
| 2005/0264572 | A1 | 12/2005 | Anast et al. |
| 2006/0098017 | A1 | 5/2006 | Tarditi et al. |
| 2007/0159487 | A1 | 7/2007 | Felt |

FOREIGN PATENT DOCUMENTS

| | | |
|---|---|---|
| EP | 0528631 A2 | 2/1993 |
| EP | 1004987 A1 | 5/2000 |
| WO | 0127880 A1 | 4/2001 |
| WO | 2006113787 A2 | 10/2006 |

OTHER PUBLICATIONS

International Search Report and Written Opinion mailed Feb. 21, 2008 in International Patent Application No. PCT/US2006/014713, filed Apr. 18, 2006.

Duecker et al., "Visual-Textual Prototype of 4D Scenes," Proceedings of the IEEE Symposium on Visual Languages. pp. 328-335. Sep. 23-26, 1997.

Extended European Search Report mailed Jul. 31, 2009 in European Patent Application No. 07119914.5, filed Nov. 2, 2007.

Extended European Search Report mailed Jul. 31, 2009 in European Patent Application No. 07119917.8, filed Apr. 18, 2006.

Extended European Search Report mailed Mar. 3, 2010 in European Patent Application No. 06758411.0, filed Oct. 17, 2007.

Faloutsos et al., "Composable Controllers for Physics-Based Character Animation." Proceedings of the 28th annual conference on Computer graphics and interactive techniques. pp. 251-260. Aug. 2001.

Communication Pursuant to Article 94(3) EPC mailed Apr. 5, 2012 in European Patent Application No. 067584110, filed Oct. 17, 2007.

Communication Pursuant to Article 94(3) EPC mailed Apr. 5, 2012 in European Patent Application No. 071199145, filed Nov. 2, 2007.

Lee, "A General Specification for Scene Animation." Proceedings of the 1998 International Symposium on Computer Graphics, Image Processing, and Vision. pp. 216-223. Oct. 20-23, 1998.

Lewis et al., Maya® 5 Fundametals. New Riders. pp. 63-93; 319-343. Jan. 23, 2004.

\* cited by examiner

TECHNIQUES AND WORKFLOWS FOR COMPUTER GRAPHICS ANIMATION SYSTEM

CROSS-REFERENCE TO PRIORITY AND RELATED APPLICATIONS

This application is a continuation of pending U.S. application Ser. No. 12/494,219, filed Jun. 29, 2009, entitled "Techniques and Workflows For Computer Graphics Animation System," which is a continuation of and claims priority to U.S. application Ser. No. 11/406,050, filed Apr. 17, 2006, entitled "Techniques and Workflows For Computer Graphics Animation System," (now abandoned), which claims priority to U.S. Provisional Patent Application No. 60/672,459, entitled "Generalized Expression Graphs With Temporal Caching For Use In An Animation System, And Related Methods," filed Apr. 19, 2005. The application herein claims the benefit of priority from all of the above listed patent applications and hereby incorporates by reference, as if set forth in full in this document, for all purposes, and in their entirety the said patent applications.

TECHNICAL FIELD

The disclosed implementations are generally related to computer graphics.

BACKGROUND

Three-dimensional (3D) Computer Graphics (CG) animation systems are used by a variety of industries (e.g., entertainment, advertising, etc.) to generate animated content for movies, video games, commercials and the like. Unfortunately, it can take a long time to produce animated content due to deficiencies associated with conventional 3D CG animation systems. For example, it can take as long as four years to produce a two-hour animated movie.

Traditional animators hold paper in hand while flipping between poses to get a sense of the motion before recording a pencil test. This gives the animator an intuitive "feel" for the animation they are creating. CG animators would like to flip back and forth between poses in the same way, but the time it takes conventional 3D CG animation systems to update a new frame does not allow for instant visual feedback. Instant visual feedback can speed-up the animation workflow, resulting in less time to generate the final product.

The tools of a traditional animator are simple: a pencil and eraser. These tools are easily mastered so that the tools become an extension of the mind of the artist. Conventional 3D CG animation systems are more complex to master. Ideas can take a winding path from the mind of the artist, through the mouse or stylus, then through the software user interface, and finally to the character rig itself. Conventional 3D CG animation systems often provide user interfaces that are too complex or that are not intuitive, resulting in the animator spending more time learning the animation system than on animating.

Animation is an experimental process. Even veterans of the art form like to try something new without worrying that it will destroy the work they have already completed. In traditional animation, drawings are easily erased and drawn over. Conventional CG animation systems often do not allow non-destructive experimentation, forcing the animator to make compromises on creativity to meet deadlines.

Traditionally, animation is a team effort. Communication and artwork flow back and forth between departments, animators, assistants, supervisors, directors, managers, and even studios collaborating at great distances. Conventional CG animation systems often fail to provide features that facilitate collaboration among team members, resulting in unnecessary delays in the animation process.

SUMMARY

The disclosed implementations describe techniques and workflows for a CG animation system. In some implementations, systems and methods are disclosed for representing scene composition and performing underlying computations within a unified generalized expression graph with cycles. Disclosed are natural mechanisms for level-of-detail control, adaptive caching, minimal re-compute, lazy evaluation, predictive computation and progressive refinement. The disclosed implementations provide real-time guarantees for minimum graphics frame rates and support automatic tradeoffs between rendering quality, accuracy and speed. The disclosed implementations also support new workflow paradigms, including layered animation and motion-path manipulation of articulated bodies.

In some implementations, an animation method includes: providing a display environment for presentation on a display device; providing a body for display in the display environment; and determining a motion path for a first portion of the body relative to a second portion of the body.

In some implementations, an animation includes: providing a display environment for presentation on a display device; providing a body for display in the display environment; providing a first motion path for a first portion of the body relative to a second portion of the body; providing a second motion path for the first portion of the body relative to a second portion of the body; and providing a mechanism for animating the first portion of the body to follow either the first or second motion path.

In some implementations, a method of creating expression graphs for an animation system includes: providing a graphical user interface; receiving a first node selection from a plurality of node types; receiving a second node selection from the plurality of node types; displaying graphical representations of the selected nodes in the graphical user interface; and providing a connection mechanism for enabling a user to connect at least one output of the first node with at least one input of the second node to form a graphical structure that represents an expression.

In some implementations, a method of creating an expression graph for an animation system includes: providing a text-based programming language for specifying expression graphs for an animation system; executing a program developed with the programming language to generate an expression graph; and animating a body in a display environment using the expression graph.

In some implementations, an animation method includes: providing a display environment for presentation on a display device; providing a first body for display in the display environment; providing a second body for display in the display environment; and determining a motion path for a portion of the first body relative to the second body.

In some implementations, an animation method includes: providing a display environment for presentation on a display device; providing a body for display in the display environment; and determining a motion path for a portion of the body relative to a coordinate system associated with the display environment.

In some implementations, an animation method includes: providing a display environment for presentation on a display device; providing a body for display in the display environment; evaluating an expression graph associated with the body at a first rate; processing body geometry at a second rate; and rendering the body in the display environment at a third rate, where the first and second rates are decoupled from the third rate.

Other implementations are disclosed that are directed to systems, methods, apparatuses and computer-readable mediums.

DETAILED DESCRIPTION

Figure 1:
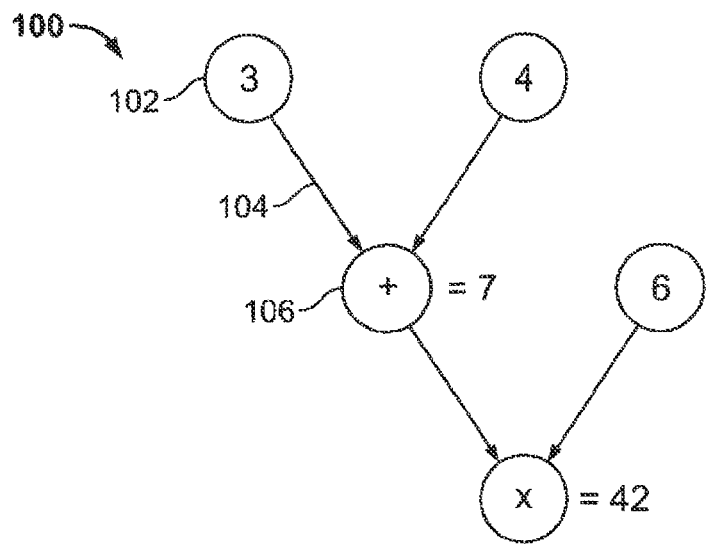
FIG. 1 illustrates an exemplary data flow network.

1.0 Generalized Expression Graphs with Temporal Caching

It is common practice in computer graphics to represent the geometry in a scene with directed acyclic graphs (DAG's) while possibly maintaining a separate expression graph for update of the scene geometry. We describe a method of representing scene composition and underlying computations within a unified generalized expression graph with cycles. Our system provides natural mechanisms for level-of-detail control, adaptive caching, minimal recompute, lazy evaluation, predictive computation and progressive refinement. It provides real-time guarantees for minimum graphics frame rates and supports automatic tradeoffs between rendering quality, accuracy and speed. It supports new work paradigms described herein, including layered animation and motion-path manipulation of articulated bodies.

1.1 Terminology

At the core of our system lies an expression graph that generalizes the scene tree data structure traditional to computer graphics. The terms "graph" and "tree" here come from the mathematical field of graph theory. A graph is a set of nodes and a set of edges, or lines, that interconnect the nodes. The edges connecting to a given node are incident to that node. If, starting from one node A, you can follow a series of incident edges and get to a second node B, then there is a path between A and B; the number of edges you traversed in getting from A to B is the path length. If there is a path from each node in a graph to every other node, then the graph is connected. If there is a non-empty (length>0) path from some node A back to A, then this loop is called a cycle and the graph is cyclic. A graph with no cycles is acyclic.

Throughout the discussion that follows, when referring to graphs we will mean directed graphs or digraphs, that is, graphs in which the edges have direction. Typically when drawing a digraph we show the nodes as circles or rectangles, and the edges as arrows between nodes. If an incident directed edge points to node A, it is an incoming edge of A. If it points away from A, it is an outgoing edge. If an edge e is from A to B, we say A is the origin of e, and B is the destination of e.

Digraphs may be used to denote mathematical expressions. For example, the expression "(3+4)*6" may be represented as a digraph in which "3", "+", "4", "*", "6", are denoted by nodes, and the steps of combining these elements are edges between the nodes. Thus there are edges from "3" to "+" and from "4" to "+"; and from "+", to "*" and from "6" to "*". Such an expression graph provides a compact representation allowing evaluation of the mathematical expression. Moreover, the graph illustrates dependencies in the expression; for example, in the expression above, that the addition occurs before the multiplication, i.e., that the result of the multiplication depends on the addition, but not vice versa.

A tree is an acyclic, connected graph. We can designate a unique node of a tree to be the root; then the tree is a rooted tree, and there is an implicit direction given to all edges in the tree pointing away from the root. All nodes in a rooted tree have zero or one incoming edges and zero or more outgoing edges. Only the root node has zero incoming edges. Nodes with zero outgoing edges are leaves.

Trees are traditionally used in computer graphics to represent the contents of a 3-dimensional (3-D) scene. Individual nodes in the tree may denote objects that are rendered to the screen, for example, geometry (e.g., a group of polygons describing the surface of an object), or geometric transformations (e.g., a rotation), lights providing virtual illumination of the scene, virtual cameras, etc. Such a structure is referred to as a scene tree.

1.2 Generalized Scene Graph

As is common in graphics systems, we use a graph for representing dependencies in a 3-D scene. We describe a construction on graphs used for representing our 3-D scene data and the computational dependencies that underlie that data. In contrast with traditional scene trees, our graph is a generalized directed graph that may contain cycles. This graph represents not only our scene geometry in the way a scene tree does, but further represents the hierarchy of computations that govern the motion and interrelationships between scene elements. Our expression graph is sufficiently general to describe any computational process that could be described in a general-purpose programming language; specifically it is Turing complete. Indeed, we describe a text-based computer language in Section 2 for use in specifying these graphs that is capable of expressing any algorithm or process that could be described in a programming language such as C.

Within this expression graph, we retain the notion of embedded subgraphs that correspond to traditional acyclic, rooted scene trees. However, there is not a single such grouping that constitutes a unique scene tree in our graph. Rather, the same graph may have many overlapping groupings that each constitutes a scene tree, and these groupings may change over time. We may dynamically enable and disable edges, change edge arrow directions, and partition the graph into subgraphs each with its own scene tree. Though it is often convenient to designate a root node, this is not necessary, and in fact at times we may designate a different node of a particular subgraph to be the root of that subgraph. Embedded scene trees and the dynamic nature of graph topology are described in detail in Sections 1.9 and 1.17.

1.3 Data Flow Network

FIG. 1 illustrates an exemplary data flow network 100. Such a network represents a computation by encoding data 102 (e.g., a number) or operations 104 (e.g., addition) within nodes, while edges 106 denote the dependencies between nodes. We think of data as flowing along the edges in a graph in the direction the edge arrows point. As is common in such networks, nodes may internally maintain a cache of the value they represent within the total expression. We maintain in each node a state flag, or dirty flag, that indicates whether the data cached at that node is currently valid. We refer to data cached in a dirty node as stale data.

The graph implements a push-pull network, which models the state dependencies of computational objects underlying a character or a scene. Nodes "pull" against the direction of the edge arrows to get needed data from other nodes higher "up" in the graph, and when data changes nodes push an indication of the change (though not necessarily the data itself) "down", in the arrow direction, to nodes that are dependent on that data. This way, if a node A has pulled data from another node B, A knows it does not need to pull the data again until it receives a push from B.

Because our graphs may be cyclic, the terms "up" and "down" are used loosely. In fact, a node may be "down" (or "up") from itself, in the event it is part of a directed cycle, that is, if while following from the node a series of edges in (or against) the direction of the edge arrows one will encounter that node again. For convenience, we will mean the directions "down" and "up" to refer to traversing edges in the direction of and against the direction of edge arrows, respectively.

Initially all nodes in the graph are dirty (i.e., their dirty flag is set). When an output value at a particular node is needed, we pull on the node. If the node is clean (i.e., the dirty flag is cleared), the value stored at that node is returned. If the node is dirty, the node pulls on its incoming edges (its inputs). Pulling on an edge fetches the value of the origin node of the edge by pulling on that node. Such a pull may recursively propagate upwards through the graph. In this way, the subgraph upstream of a node is pulled clean. Now the node re-evaluates itself, stores a new value in its cache, marks itself as clean, and returns the value to the node that initiated the pull.

Conversely, an external process may cause the value at a node to change. Now the values stored at nodes downstream are marked dirty. The node pushes its output edges, which in turn push their destination nodes, which in turn push their outputs, and so forth. In this way, the subgraph downstream of a node is pushed dirty.

This push-dirty, pull-clean mechanism allows us to evaluate sub-pieces of the expression graph while doing a minimal recompute. That is, we preferably do not recompute more than is necessary based on what data we have already computed and cached within the graph and what has changed to invalidate our prior computations. Significant in this scheme is that when something changes, we don't immediately recompute anything, we simply note the scope of the effect (by pushing dirty through the affected subgraph). We will later pull-clean subgraphs only as needed. This in effect provides lazy evaluation of the graph.

1.4 Cyclic, Multi-Cached Graph Evaluation

Our graphs differ from traditional data flow networks in many respects. Our graphs may be cyclic, that is, they may contain loops. Normally data flow networks are acyclic, because cycles in such a network could lead to an infinite cycle of pushes or pulls and thus a computer crash. We employ a marker mechanism, described below, to provide controlled looping or recursion through such cyclic structures.

The data flowing along edges in our system conceptually are (parameter,value) pairs, where often (but not always) the parameter refers to time, and the value designates the state of a node output at that time. Thus, pulls upwards in the system are for data at a particular parameter value, while pushes downward signaling state invalidity will indicate the parameter intervals that the state change affects. That is, Pull(t) yields a pair <t,v>, and invalidation messages take the form Push($\Gamma$), where $\Gamma=(\sigma_1,\sigma_2,\sigma_3,\ldots)$ gives the closed intervals $\sigma_i=[t_a,t_b]=\{u | t_a<=u<=t_b\}$ over which invalidation is to occur. A pulled node itself performs a Pull(t) on its inputs if necessary (and so on, recursively upwards through the graph). A node may use this t internally in the calculation it performs on its inputs in producing its output values, or it may simply pass it upwards via the pull. A node may even perform a pull at a different t than it itself was pulled at, or it may perform multiple pulls at different t's.

It is up to each individual node whether or not to retain internally the data only for the most recently requested parameter value, or to cache data across many parameter values. We refer to the latter as "temporal caching", since usually it is used to cache data over a range of times. The decision whether or not to employ temporal caching within a particular node may be made automatically, as described below, or it may be set by a human operator.

When a node pulls for data, it may either designate an explicit parameter value for which it wants the data, or alternatively it may ask for data at an unspecified "input" parameter value (designated herein as kInputParam). This second case is only allowed when the source of the data depends on a parameter input from a "parameter driver" node, typically a clock, somewhere up the graph. Pulling on a parameter driver yields the "current" value for that parameter. In this second case then, the pull at kInputParam is implicitly a request for the data as it would be at the "current" parameter values for all drivers upwards in the pull chain. In the simple case of a single parameter driver that is the animation clock, pulling at kInputParam yields the value of a node output for the current animation time. Pulling at another parameter value t yields the node output data for time t. The kInputParam token is discussed further in Section 1.18.1.

Because the graph may contain cycles, we take care not to pull endlessly along a series of edges that lie in a cycle. Unchecked, such a cyclic pull would lead to an "infinite loop" or "infinite recursion" and a program crash. We guard against this by raising a marker flag in each node as it begins its pull, and lower the flag once it has received its data. If a node receives a pull while its marker flag is raised, it knows the pull is recursive. It then has a choice to either signal an error, to return an estimated, default, or stale value; or to allow some finite number of recursions to occur by keeping count of how many pulls it receives while its flag is raised.

The human operator who assembles the graph makes the choice among these options. We use the last option, of allowing some finite level of recursion to occur, to build subgraphs that are capable of recursive computations, such as iterative error-minimization algorithms for solving inverse kinematics and dynamics problems. We use a similar technique to provide progressive refinement of expensive algorithms as described in a later section.

When a node pushes a state invalidation message Γ, this message specifies the (closed, possibly disjoint) interval of parameter values over which the invalidation has occurred. Again considering the usual case where the parameter refers to animation time, the push designates that the output of the node is invalid over some set of animation frames. The nodes that receive this push (that is, the nodes to which edges point from the node that initiated the push), can themselves push along their output edges, and this continues recursively. In this way, the graph downward from the initiating node is flooded with state-invalidation messages. Because the graph may contain cycles, we take care not to continue this recursion through a cycle, as this would lead to an "infinite loop" or "infinite recursion" and a program crash. We guard against this simply by not pushing dirty intervals past nodes that are already dirty over at least the interval being pushed. By induction, we know that the entire subgraph below such a node is already also dirty over at least that interval, so there is no point in continuing the push.

1.5 Adaptive Caching

An individual node may contain no cache of its current value, may contain a single-line cache of the value for the most recently pulled parameter t, or may contain a multi-line cache of values for various t's. In the case where t denotes time, we refer to multi-line caching as temporal caching. If a node contains no cache, then effectively it is dirty: any pull on it will result in it pulling upstream. If a node caches a single value, computed for some parameter t, then it is clean at t but dirty at all u≠t. If a node caches a set of values, then it has a set of dirty bits, one per cache line, and it will be clean over some (possibly empty) set of disjoint intervals. As detailed below, these cache lines are not infinitely sharp, that is, a parameter interval around t will be mapped to t's cache line. We say such cache lines have a non-zero cache line width.

Nodes may have more than one output, and each output will have a separate cache. Outputs of the same node that use the same caching scheme will share a common set of dirty flags. In some cases, a node may have an output, but no outgoing edge is connected to that output. In this case, it is as if the node did not have the output, and no value is computed for or cached in that output.

Node outputs themselves decide which caching scheme (none, single, or multi-line) they will use, or the user may explicitly designate which scheme a particular output shall use. The scheme used at a particular output may change dynamically during program execution, either automatically or because the user changes it.

Automatic selection of a caching scheme involves a cost-benefit calculation. Cost of a caching scheme is the cost of the data copy during cache write plus the memory storage cost. Using no caching has no cost; single-line caching costs a copy on cache-write for each cache miss plus memory needed for storing one cache slot; multi-line caching costs a copy on cache-write for each cache miss plus memory for storing n cache slots. Thus, we calculate a unitless, abstract cost of caching an output as:

$$\text{cache\_cost} = \begin{cases} k*\text{cache\_slot\_size}*(1+n) & \text{when cached} \\ 0 & \text{when uncached} \end{cases}$$

where cache_slot_size is the size of the value type for the output, and the "1+" reflects the cost of the cache write for cached outputs.

The benefit of a cache scheme depends on how often the node is pulled, how effective is its cache, how expensive are cache misses, and how important is the node. The pull rate on a node output V is the number of times V is pulled per unit time. The cache hit ratio of V is the number of cache hits for V divided by the total number of pulls on V (windowed over a unit time interval); for uncached outputs, the cache hit ratio will be zero. The cost of a cache miss is the time spent on average in re-evaluating the node following a miss; when a node or node output has high evaluation cost, we say that node or output is expensive. The importance of a node is given by that node's priority, as described in following sections. (As detailed elsewhere, the priority reflects salience due to projected screen area and user focus.) Expensive outputs of high-priority nodes with a high pull rate but a low cache-hit ratio are good candidates for a more aggressive caching scheme. Finally, we define the periodic evaluation cost of a node as the aggregate time spent re-evaluating that node over some sliding-interval window. Thus, cache_benefit=evaluation_cost*priority*pull_rate*cache_hit_ratio cache_inadequacy=evaluation_cost*priority*pull_rate*(1−cache_hit_ratio), and we track these values (as sliding-window averages) for every output whose cache-selection method is "automatic" and that belongs to a node whose periodic evaluation cost exceeds some fixed threshold. Periodically (following frequent cache misses or occasionally during idle time) we reconsider the caching scheme used at such an output. We evaluate:

cache_worth=cache_benefit/(1+cache_cost)

using the cache cost of the current caching scheme, and cache_need=cache_inadequacy/(1+cache_cost), using the cache cost of the next most aggressive caching scheme.

Outputs with the highest cache_need are switched to a more aggressive caching scheme. Outputs with the lowest cache_worth and lacking a high cache_need (or that are already using multi-line caching) are switched to a less aggressive caching scheme. Also, outputs which are regularly differentiated or integrated (Section 1.14), or that drive a motion path (Section 4.1) automatically use multi-line caches when feasible.

For nodes employing multi-line caches, the mapping from parameter t to a line in the cache is determined by a cache-mapping function M. This function depends on the total parameter range $[t_{min}, t_{max}]$ that is cached, as well as the number of cache lines, and the width of those lines. We use the cache mapping function:

$$s = M_{c_0, c_r}(t) = c_0 + \text{round}(c_r t)$$

and say t maps to cache line s under M if and only if $$(0 \leq s < N) \wedge (\text{abs}(c_r t - \text{round}(c_r t)) \leq c_{tol})$$

where:
t=the parameter value at which lookup occurs,
s=the cache line to which t maps,
N=the number of lines in the cache (cache lines are numbered from 0 to N−1),
$c_0$=the cache line corresponding to t=0,
$c_r$=the number of cache lines per unit change in parameter t,
$c_{tol}$=the cache tolerance, equals ½ the cache line width,
round(x)=x rounded to the nearest integer,
abs(x)=the absolute value of x, that is,
abs(x)=x for x≥0, otherwise abs(x)=−x, and
∧ =logical AND, that is,
a^b is true if and only if both a is true and b is true.

If t in [$t_{min}$, $t_{max}$] maps to some cache line s and s is marked clean, we say a cache hit occurred, otherwise we say there was a cache miss. We define the cache inclusion ratio as:

$$c_{inclusion} = 2c_{tol}c_r.$$

If $c_{inclusion}$=1, all parameter values t within [$t_{min}$, $t_{max}$] yield valid cache mappings; the cache slots are maximally wide (they abut one another). This provides us with potentially inaccurate but very fast graph evaluation, since all t in this range will map onto the cache. By allowing $c_{inclusion}$<1, we increase the accuracy of graph evaluation at the expense of evaluation speed, since as $c_{inclusion}$ decreases, fewer queries will result in cache mappings, but the t that do map onto the cache will be better centered within the cache lines. At $c_{inclusion}$=0, only exact cache mappings are allowed; the cache slots are infinitely thin. Varying $c_{inclusion}$ in the range [0,1] provides us with a continuous Level of Detail (LOD) control on graph evaluation, enabling us to vary the trade off between speed and accuracy. We can control this tradeoff per-node by allowing each node to specify its own $c_{inclusion}$. This is just one of several LOD mechanisms available, as described next.

1.6 Approximate and Partial Evaluation

When a cache hit occurs in response to a query Pull(t), the node retrieves the value v stored in cache line s, and returns the tuple ⟨t,v⟩. If a cache miss occurs, the node may do any one of:

1. return the value $v_{stale}$, which is the value stored at the nearest cache line to s, even if that cache line is marked dirty;
2. return the value $v_{approximate}$, interpolated between the nearest neighboring cache lines $s^-$ and $s^+$ that are non-dirty, where $s^-$<s and $s^+$>s;
3. Pull(u) on each of its incoming edges, where normally u=t, then recompute its output values $v_i$ for each output i.
4. Pull(u) on each incoming edge, but only partially recompute its output values.

When (3) occurs, we say the node re-evaluates. If t maps to some cache line s, then the node will place each $v_i$ in that cache line for output i and mark the cache flag for line s as clean.

When (4) occurs, we say the node does a partial re-evaluation. The node will not store any value in the output caches and will not change the state of any cache flag. It will store enough information to enable later continuing evaluation where it left off. In returning ⟨t,v⟩ to the node that initiated the Pull(t), it will include a special token that says this is a partial or intermediate result and needs further subsequent refinement. This provides a mechanism for progressive refinement of complex computations within the graph. Further, it provides the ability to create graph structures supporting looping and recursion.

Nodes automatically choose between mechanisms (1)-(4) above based on the urgency and level of detail of the pull. The urgency is a global value, computed by the application, that reflects how much time is left before the total graph evaluation is complete so that the updated 3-D scene may be drawn on the screen. (Urgency and level-of-detail are described in Section 1.7.) Ideally, all cache misses result in (3) occurring, that is, dirty nodes are fully re-evaluated and dirty subgraphs are pulled clean. In some circumstances, we may begin running out of time while doing this graph re-evaluation; the application will raise the urgency of the evaluation as the deadline for drawing the next frame approaches. This will result in dirty nodes employing strategies (1), (2), or (4), as detailed in Sections 1.7 and 1.8 below. Preference between strategies (1) and (2) for a given node is hard-coded into each node type and may be overridden by the user or model builder per-node. Generally strategy (1) is preferred over strategy (2) because it involves no extra computation and usually it provides the least-surprising behavior. Strategy (1) tends to create a delay or "lag" during direct manipulation when very expensive (or very low-priority, e.g., due to small screen size) sections of the 3-D scene don't update at the full frame rate.

This flexibility in providing stale, approximate, or partial results provides us with real-time guarantees on the execution speed of the graph evaluation, and ensures we can maintain a target frame rate in redrawing the scene. This provides still another LOD-mechanism, trading off accuracy and/or node recompute rate in order to maintain frame rate. More generally, it decouples the frame rendering rate from node evaluation rates, and even the evaluation rates of different nodes within the same graph. We further generalize this level-of-detail control within the Pull( ) mechanism, as described below under Level-of-Detail (Section 1.7). The usage of this LOD control to achieve constant frame-rate is described below under Real-Time Guarantees (Section 1.8).

1.7 Pull Level-of-Detail

We now extend the Pull(t) semantics to include a specification of the level of detail (LOD) for which the value is requested. We say Pull(t,lod) yields ⟨t,v⟩. (The lod is actually a vector quantity, but we discuss it first as a scalar quantity for simplicity.) This level-of-detail control can provide a switch between multiple alternative representations, for example, geometry may be multiply represented within the graph with the lod-mechanism used to automatically select the best representation. The level-of-detail can also be used internally within nodes to select alternative algorithms or to set the desired accuracy of an algorithm, for example, by controlling the refinement level of a subdivision surface.

The initial lod value originates at the application level and is passed through a sequence of Pull's or Render's. (Render calls are described in Section 1.9 below.) Nodes may modify lod as they pass it along for their own internal reasons. For example, a node may want to evaluate an input subgraph very roughly as one step of its own internal evaluation, so it may initiate the Pull on that input at a low lod. The user may explicitly raise or lower the relative lod of particular nodes through a dialog in the user interface or programmatically during model construction. As described in the next section, the application can automatically lower lod globally as needed between or even during render passes to attempt to provide lighter-weight, and therefore faster, graph traversal. This allows the application to trade-off rendering detail and accuracy with speed to maximize quality while meeting frame-rate goals.

Interpretation of specific numerical values of lod is left to the nodes themselves; at the graph level, lod is regarded as an abstract, unitless value that is normally greater than or equal to zero. Zero lod specifies that the simplest/fastest possible representation or algorithm should be used. Lod greater than zero specifies that a more-accurate representation should be used. A negative lod specifies that no evaluation or rendering should be performed at all; what happens instead differs between Pull's and Render's. A Pull at negative lod will result in cached, stale, or incomplete values being returned, as described in Section 1.6. The connection between negative lod and increasing urgency is detailed below in Section 1.8.1.

For a Render with negative lod, neither that node nor its children will be rendered at all. For Render's at zero lod, if an imposter (a polygon texture-mapped with an image of an object saved from a previous render) is available, the imposter will be drawn in place of the object itself; otherwise some extremely lightweight rendering (such as a bounding box) is used.

While we have discussed lod as if it were a single scalar (real) value, in fact we maintain distinct levels-of-detail for geometry, articulation, deformation, shading and lighting. That is, rather than maintaining and passing a scalar lod, we rely on a vector-valued lod=(lod$_{geom}$, lod$_{artic}$, lod$_{deform}$, lod$_{shade}$, lod$_{light}$). Particular types of nodes generally will depend only on a single one of these components. The lod component(s) to which a given node type responds are referred to as that node type's LOD control channel(s). For example, mesh deformer nodes generally respond just to lod$_{deform}$, while nodes representing light-emitting surfaces may respond to both lod$_{geom}$ and lod$_{light}$. Again, it is left to each node to decide how to interpret the values within lod, except that all node types return from Pull and Render calls immediately when any one of their control channels fall negative.

1.8 Real-Time Guarantees

We desire to provide soft-real-time guarantees on the maximum time taken to traverse the graph for a given operation (typically renders). We achieve this through various mechanisms:
  dynamically adapt LOD
  partial evaluation
  progressive refinement
  adaptive caching
  parallel evaluation
  predictive precomputation 1.8.1 Dynamic Level-of-Detail As mentioned in the previous section, the system can dynamically adapt level-of-detail at the application level between and during render traversals. After each render traversal, the application notes how much time was taken relative to the target traversal rate. If the traversal was considerably faster than necessary, the application increases the top-level lod. The next render pass will be initiated with this higher lod. Conversely, if the traversal took longer than desired, the application will reduce the top-level lod.

The application can adapt lod globally during the course of recursive Pull's or Render's by adjusting a global urgency value. Urgency is initially 0.0 when the application itself initiates a Pull or Render. As time passes, a watchdog thread will increase urgency towards 1.0 as the time approaches the traversal time deadline. In the event the deadline is exceeded, urgency rises above 1.0. Each call to Pull and Render multiplies its lod parameters by 1.0—urgency and uses the results as its effective lod's. Thus, effective lod's will fall as the deadline approaches, encouraging the use of simpler and faster representations. If the deadline is exceeded, effective lod's will become negative, preventing any further evaluation or rendering and ensuring a near-immediate return from traversal recursion.

In this way, based on how well a given render pass has met its real-time deadlines, the application will adjust its own top-level lod, attempting to maximize quality and accuracy of the rendering without exceeding deadlines. When the application is too ambitious, using an excessively high lod, it will raise urgency to ensure nonetheless that traversal terminates in soft real-time.

1.8.2 Partial Evaluation

As described in Case 4 of Section 1.6, there are circumstances in which a node may return a pulled output value before it has completed re-evaluation. This happens when a node begins re-evaluation (i.e., a pull occurs) with urgency<1.0, but urgency rises above 1.0 (i.e., effective lod becomes negative) during evaluation. It may also happen because the time spent in a single invocation of the node evaluation function exceeds an application-specified time limit. Nodes may also electively prematurely terminate a particular evaluation, for example, because a particular algorithmic condition occurs within the evaluation function (such as exceeding some set number of iterations within a loop). In all cases, graph traversal proceeds normally following the return from the partially evaluated output, except that the output subgraph of that output continues to be marked dirty. Subsequent Pull's on that subgraph will in turn pull on the partially re-evaluated node, eventually causing it to fully re-evaluate, at which point the output subgraph will be marked clean, as described previously.

Similarly, as identified in Cases 1 and 2 of Section 1.6, a pulled node will return stale or approximate results when the effective lod of the Pull is negative (i.e., when urgency>1.0). Again, the subgraph below the node will remain dirty, and subsequent Pull's on the subgraph will continue to pull on that node. Due to other sections of the graph becoming clean and/or cached, these subsequent pulls should occur with greater time available, so that effective lod is eventually non-negative (i.e., urgency<=1.0) upon reaching this node. Recall that, following Section 1.5, caching strategies within the graph will be automatically adjusted during these repeated pulls, shifting resources as necessary to allow us to Pull with non-negative lod. One circumstance in which we may not be able to achieve a non-negative-lod Pull at a given node is if the mere process of traversing edges upwards in the graph to reach that node exceeded the available time bounds for graph traversal. Because edge traversal itself is an extremely lightweight (fast) operation, only an enormously large graph would exhibit this problem. Clearly such a large graph would be beyond our ability to recompute effectively, and we doubt such graphs will be encountered in practical situations. However, this does highlight that the maximum path length in a given graph gives important information about how costly evaluation of that graph may be.

The native ability of the graph to partially or approximately recompute provides a mechanism for achieving rough results when real-time demands do not allow for a full recompute.

1.8.3 Progressive Refinement

If we perform partial evaluation over multiple successive traversals, we will progressively refine pass accuracy. In the case of elective partial evaluation, we can compute an error metric and bound, returning clean when we have achieved the error threshold. Similar to what occurs with strategy (1) in Section 1.6, this tends to create a delay or "lag" during direct manipulation when very expensive (or very low-priority, e.g., due to small screen size) sections of the 3-D scene don't update at the full frame rate. In the case of progressive refinement, this gives the effect of computationally heavyweight scene components gradually updating in response to rapid user direct-manipulations. For example, a complex deforming surface may change shape gradually over several frames despite the fact that the underlying skeleton is redrawn at an interactive frame rate.

1.8.4 Adaptive Caching

As mentioned above and in Section 1.5, the caching strategy within a given node may change over time in response to observed efficacy of any existing cache and cost and frequency of node re-evaluation. This process is integral to our ability to sensibly manage resources to enable high-priority (e.g., large screen area or user-focused) subgraphs to re-evaluate rapidly. Thus, adaptive caching is an important enabler of the real-time evaluation methods described in this section.

1.8.5 Parallel Evaluation

Given that we can traverse a graph node-by-node, pulling input subgraphs clean or rendering output subgraphs, we may wish to break up traversals of subgraphs into separate threads. This enables symmetric multiprocessing on shared-memory architectures. Every recursive pull or render presents the opportunity to spawn a new thread. We track pull/render cost (as described for evaluation cost in Section 1.5 and elsewhere) and use that as a guide of when to spawn a new thread. The ideal situation is a node in which two expensive Pull's or Render's are performed on large disjoint subgraphs. In this case, ideally we traverse both subgraphs simultaneously. In fact, this occurs quite commonly in the form of Render's at the scene graph root: different large top-level models ideally will be evaluated on different processors. Potentially this provides an order-n speedup when running on a machine with n symmetric processors.

1.8.6 Predictive Precomputation

It is common wisdom that the vast majority of processor time in the typical computer is spent idle waiting for user actions. We can take advantage of idle time to re-evaluate dirty nodes. This is particularly valuable in conjunction with temporal caching: we re-evaluate nodes at times corresponding to dirty cache slots, thereby filling those cache slots with clean values. We refer to this as predictive evaluation, because we are anticipating that the outputs of these nodes will be pulled at parameter values other than the current value, although no such pull has yet occurred.

We prioritize nodes for predictive re-evaluation based on the product of priority and cost, with those measures computed as described in Section 1.5. The greater is the product, the higher is the priority for predictive re-evaluation. If we have an estimate of the error in a given cache slot (this may be easily computed for certain node types, such as those performing subdivision or similar refinement algorithms), we may use that error estimate to scale the re-evaluation priority. Similarly we may track how much time has passed since a cache-slot was last re-evaluated, and scale priority by cache-slot age. Scaling priority by error is useful for nodes that employ Case 2 of Section 1.6 (return approximate value). Scaling priority by age is useful for nodes that employ Case 1 of Section 1.6 (return stale value).

At the application level we maintain a priority queue that ranks nodes according to:

| | |
|---|---|
| priority * cost * age | for nodes that have previously returned $v_{stale}$, |
| priority * cost * error | for nodes that have previously returned $v_{approximate}$ and possessing an easily observable error metric, or |
| priority * cost | for nodes that are not Pull-ed with negative effective lod (or that lack any simple error metric). |

For efficiency, we only bother to include in the priority queue those nodes that have both a high priority and a historically high actual cost. Other nodes we expect to be poor candidates for predictive re-evaluation. In practice, this means we include in the priority queue those nodes for which temporal caching is enabled on one or more outputs.

At program startup, we create one (or n, on n-processor systems) low-priority idle thread(s). When the system is busy, the idle threads will sleep, yielding CPU time to more-urgent work. When idle time becomes available, an idle thread will run, pulling a node for re-evaluation from the top of the priority queue. We evaluate the node at those times at which its cache slots are dirty. This evaluation may result in Pull's on other nodes; if these nodes have temporally cached outputs and no other thread is re-evaluating them yet, this idle thread will also pull these ancestor nodes from the priority queue.

In this way we wander the graph filling caches during idle time, helping to ensure that we will be able to respond rapidly to further user actions, especially frame changes, which tend to be the most-challenging action to consistently perform in real time. We refer to this process as pre-caching, since we are filling caches in advance of when the cached data is needed. This mechanism is especially effective in conjunction with symmetric multiprocessing, allowing us simultaneously to handle user interaction and to prepare for anticipated future demands on graph evaluation.

1.9 Render

The ultimate goal of graph traversal generally is to draw something on screen. As with prior systems, we accomplish this via a top-down render traversal, distinct from the bottom-up evaluation traversal initiated by a Pull. The render traversal occurs over a connected subgraph of special expression nodes called scene graph nodes (or simply scene nodes); we refer to this subgraph as the scene graph. All scene nodes possess a ctm_in input and a ctm_out output (and possibly additional node-specific inputs and outputs). The parent of a scene node A is the scene node above A's ctm_in input, if any such node exists; otherwise A is an orphan. The children of a scene node A are the scene nodes below A's ctm_out output, if any such nodes exist; otherwise A is a leaf. The ancestors of a scene node A are those scene nodes in the scene graph above A. The descendents of A are the scene nodes in the output scene graph of A. Scene graph nodes are described more fully in Section 1.18.3.

Render traversal initiates via a Render message to a scene node and propagates depth-first to all enabled nodes in the output scene graph (with certain exceptions described here and in Section 1.17). To render the full 3D scene, the application calls Render on a designated orphan root node. Nodes may be disabled (explicitly, by the user), which prevents these nodes and their children from being traversed during rendering.

Parameters to the Render call specify: (1) a graphics output context, or graphics port, to which drawing should occur, (2) the pull parameter at which to evaluate the expression graph, (3) the desired level-of-detail of the render, and (4) the render mode settings to be used. That is, a render call is a message:

Render (gp, param, lod, Φ);
where:
gp=the output graphics port,
param=the graph parameter at which to perform the render (usually the value of the global animation clock, i.e., time),
lod=(lod$_{geom}$, lod$_{artic}$, lod$_{deform}$, lod$_{shade}$, lod$_{light}$)=the desired levels of detail, and
Φ=a vector of render mode settings (described below).

When node A receives a Render, it possibly modifies the state of the designated graphics port in some node-specific way, issues any node-specific geometry to that port, and then recurses over its children by calling Render on each enabled child. After all children have returned from render traversal, node A reverts the graphics port to its state prior to A's modifications, if any, and returns to whomever initiated the render call on A.

The graphics port render parameter gp designates the graphics target to which output should be directed. For interactive rendering, this could be an OpenGL context, for example. For rendering to an external target, such as a high-quality off-line renderer, this might refer to the invocation context of a rendering-export plugin. "Graphics ports" are simply a wrapper for naming such heterogenous output targets. It falls to the output target referenced by gp to decide how to act upon the state changes, geometry issues, etc., generated during render traversal. The gp parameter is passed unmodified through the recursive render calls to the child nodes.

The param render parameter designates the animation "time" at which the state of the scene should be rendered. In most cases, this param will be used as the parameter for resultant Pull's and for recursive Render's of child nodes. Certain nodes perform input pulls or child renders at different parameter values. For example, the MotionPath node (Section 4) evaluates its ctm_in input across a range of parameter values. In fact, MotionPath nodes entirely ignore the param render parameter except when special path rendering options, such as tickertaping and path dilation, are enabled (Section 4.1.2).

The lod render parameter designates the levels-of-detail at which the scene should be rendered. In most cases, this lod will be used unmodified as the lod for resultant pulls and for recursive renders of child nodes. A node whose bounding box projects to a small screen area may scale lod by a value less than unity before recursing over children, providing fast, less-detailed rendering of objects that are not visually important in the rendered image. The lod may be scaled by a value greater than unity for the active model, that is, the model containing the currently or most recently selected node. Automatic scaling of the lod parameter up or down is generally performed in Model nodes (Section 1.18.3). In addition to automatic scaling due to visual importance or user focus, the user may explicitly override any of the lod values at any node via an application dialog; the overridden value is used for input pulls or child renders from that node.

The Φ render parameter designates a number of render mode settings. These settings control various aspects of interactive rendering, including: geometry style (e.g., surfaces, skeletons, bounding boxes), render style (e.g., wireframe, hidden line, flat shaded, smooth shaded), optional aids to visualizing geometry (e.g., local coordinate frames, normals, surface-curvature, texture coordinates, node names, bones), and so forth. The user may explicitly override any of the Φ settings at a node via an application dialog; the overridden Φ is used for rendering that node and for child render calls from that node. The Φ parameter has no affect on exports to external offline renderers.

Because the graph may contain cycles, we take care not to render endlessly along a series of edges that lie in a cycle. Unchecked, such a cyclic traversal would lead to an "infinite loop" or "infinite recursion" and a program crash. We guard against this by raising an inRender marker flag in each node as it begins its render, and lower the flag once it has completed its render. If a node receives a render message while its inRender flag is raised, it knows the render occurred recursively via a cycle, and it will return immediately from the recursive render without traversing to its children. This is analogous to the mechanism described in Section 1.4 for ensuring cycle-safety of graph pulls.

The value provided at the ctm_in input of a scene node is the Concatenated Transformation Matrix (CTM) defining the coordinate space in which that node should be rendered. This is also known as the pre-ctm of the node, since it defines the coordinate space existing before the node makes any of its own graphics-state changes. The ctm_out output specifies the coordinate space in which children of a node exist, i.e., the post-ctm of the node. That is, the post-ctm of a given node is the pre-ctm of its children. Most nodes do not modify the coordinate system, thus the value at the ctm_in of these nodes is passed through unmodified to ctm_out, so children of such nodes live in the same coordinate space as their parent. Transform nodes do modify the coordinate system, in some way transforming the matrix between ctm_in and ctm_out. The general Transform node accomplishes this transformation by multiplying the ctm_in matrix input by a xform matrix input, and providing that product at the ctm_out. Subclasses of Transform provide higher-level transform controls. For example, Rotate nodes rotate the ctm as specified by their Euler-angle or quaternion rotation input. Two special subclasses of Transform, Bones and Joints, are used to assemble articulated hierarchies. Transforms and their subclasses, including Bones and Joints, are described in more detail in Section 1.18.3.

Several types of nodes exist to issue geometry to the graphics port. For example, Surface nodes are used to draw subdivision surfaces. Other geometry nodes produce primitives such as points, lines, ellipses, quadrics and text. In addition to ctm_in and various node-specific inputs, most geometry nodes also possess a material input. This accepts values of type material, which are generated by various kinds of Material nodes. Basic Material nodes can be used to specify rendering state data such as ambient, diffuse, specular and emissive colors and surface roughness. Material node subclasses include Texture nodes for binding a texture image map, EnvironmentMap nodes for binding a reflection map, FragmentProgram and VertexProgram nodes for binding OpenGL fragment and vertex programs, and Shader nodes for binding procedural shaders for external offline renderers. Material nodes are described in greater detail in Section 1.18.4.

Other scene node types exist to specify the camera projection for rendering (Camera nodes) and to define scene lighting (Light nodes). Several node types exist to define named scopes over their descendent subgraphs (Models and Parts).

There are several special kinds of scene graph nodes, and one special situation, that modify the above view of render traversal. Switch nodes are used to select among multiple alternate sub-scenes, each beneath a distinct ctm output. Attach nodes allow a node to exist within a coordinate space different from that of the parent's ctm_out. Inverse Kinematics IK_solver nodes provide an alternative joint-transform evaluation mechanism in which the transform used at a joint is derived from the desired position of the end-effector of the joint/bone chain, rather than the usual case of end-effector position being determined forward-kinematically from the joint angles. Subgraph inversion is an alternative mode that inverts the usual flow of ctm data from parent to child within a local subgraph. These special cases are discussed in Section 1.17—Dynamic Topology Changes.

1.10 Data Types

The value produced at a particular node output will be one of a number of data types. Supported types include int, scalar (floating point, aka real), point, vector, covector (aka normal), matrix, quaternion, curve, mesh, field, deformation (Section 1.18.2), material (Section 1.18.4), image, char and string. Single- and multi-dimensional fixed-bound arrays of these types may be used as well. Anticipating the modeling language defined in Section 2, these may be instantiated as C-style arrays of fixed bound, for example, "int[32]", "scalar [5][6]". A field is a parameterized type defined over a mesh; for example, "field<normal>[m]" is a surface-normal field over mesh m.

1.11 Polymorphism

While a particular node output produces data of the same type, a given node input may accept multiple types. An output may be connected to an input only if the type of the output matches one of the types accepted by the input. This style of polymorphism corresponds to that of the C++ programming language, in which functions may be overloaded to accept multiple parameter input types, but function overloading by return (output) type is not permitted.

1.12 Inputs and Outputs

Every node type defines certain input and output tabs, to which incoming and outgoing edges, respectively may be connected. An input tab can function in one of three modes.
1. If there is an edge incident to the input, we say the input is connected and pulls at the input result in pulls to the upstream node.
2. Alternatively, the user may specify an internal expression for an input tab; pulls at that input result in evaluation of the expression. The expression language is described in Section 2.2.
3. If an input is not connected and has no internal expression, we say the node is defaulted, and pulls of the input yield a default value. Nodes provide standard default values for all their inputs, and users can specify alternative defaults.

Both input and output tabs possess a name that is unique among the inputs and outputs of that node. Input tabs specify a list of one or more data types that may be provided to that tab (by incoming edges, expressions, or custom defaults). Output tabs specify the unique data type output at that tab.

1.13 Gain and Bias

The user may specify a bias and/or gain for any input or output. The value at that input or output will be gain*original_value+bias. By default, gain=1.0 and bias=0.0 for scalar inputs and outputs. Other data types use appropriate values for gain and bias. For types for which the concepts of gain and/or bias are not applicable, those adjustments are ignored. Specifying gain or bias at an input scales or biases a single graph edge. By specifying gain or bias at an output, the user can scale or bias all edges leaving that output. Gain and bias may be set by the user within the application via a "node inspector" dialog box, or the model definition code itself may specify gain and bias as described in Section 2.1.2 below.

1.14 Integrals and Derivatives

Node outputs can be integrated and differentiated with respect to parameter t. For nodes with multi-line caches, integration over $[t_a, t_b]$ amounts to summing the (clean) cache lines between $M(t_a)$ and $M(t_b)$, scaled by stepsize $h = 1/c_r$. That is:

$$\int_{t_a}^{t_b} f(t)\,dt \approx f(t_a) + f(t_a+1) + f(t_a+2) + \ldots + f(t_b)$$

$$\approx h\psi_{M(t_a)} + h\psi_{M(t_a)+1} + h\psi_{M(t_a)+2} + \ldots + h\psi_{M(t_b)}$$

$$= \frac{1}{c_r} \sum_{i=M(t_a)}^{M(t_b)} \psi_i,$$

where f(t) is the output value at parameter t, $\psi_i$ is the value stored on cache line i, M(t) is the cache mapping function discussed previously and $c_r$ is the number of cache lines per unit change in t.

Differentiating at t involves taking the finite difference at M(t). Higher-order derivatives may be computed by comparing the derivatives at successive cache slots. Thus:

$$\frac{d}{dt} f(t) \approx \frac{1}{h} \nabla_{M(t)} = c_r \nabla \psi_{M(t)} = c_r (\psi_{M(t)} - \psi_{M(t)-1}), \text{ and}$$

$$\frac{d^k}{dt^k} f(t) \approx \frac{1}{h^k} \nabla^k_{M(t)} = c_r^k \nabla^k \psi_{M(t)} = c_r^k \sum_{i=0}^{k} (-1)^i \binom{k}{i} \psi_{M(t)-i},$$

where $\nabla$ is the finite backward difference operator, and $$\binom{k}{i}$$

is a binomial coefficient.

If some of the referenced cache lines are not already clean, one or more Pull($t_i$)'s may be implicitly necessary. In some cases it may be convenient to maintain a multi-line cache of the derivatives themselves to facilitate fast evaluation of higher-order derivatives.

Expressions written in our expression language may reference the integral or derivative of any node output as described in Section 2.2.

1.15 Signal Busses

Often many edges will follow a similar routing between two nodes or groups of nodes. Merging these edges into a bus, drawn as a single thick edge, simplifies display of the graph. Creating a bus has no effect on the functionality of the graph: the bussed edges continue to function autonomously.

1.16 Transmitters and Receivers

Another common contributor to clutter in the displayed graph is the output that is connected to a large number of inputs. For example, the global animation clock will usually have an outgoing edge to the parameter input of every avar (see Sections 1.18.1 and 2.3). Transmitter nodes "broadcast" their input value on a named channel. Any number of receiver nodes may "tune" to that channel by name, after which they will produce the transmitted value at their output. Functionally this is equivalent to an edge that connects transmitter to receiver. Expressions may reference a broadcast by name (see Section 2.2).

1.17 Dynamic Topology Changes

Sections 1.3 and 1.9 described the usual way information and render traversal are propagated through our expression graph. As mentioned previously, several situations modify the usual chain of dependence and traversal. Three such situations result from special nodes that enable dynamic local changes to the effective graph topology. A fourth situation arises when a model dynamically changes its own root to be at a different node. We discuss each of these four situations below.

1.17.1 Switches

Switch nodes are used to select among multiple alternate sub-scenes, each beneath a distinct CTM output. These nodes may have any number of CTM outs, and a scene node connected to any of these outputs is considered a "child", but render traversal will only proceed to one such output. The index of the active output is specified by a value input. The state of the switch only affects render traversal, not graph evaluation. That is, a push-dirty will push through to all connected outputs, and a pull from any output pulls on the inputs. The value input accepts both integer (or scalar) values and one-dimensional arrays of integers (or scalars). (Scalars will be rounded to the nearest integer.) When a single value is provided, only one output can be active at a time. Providing an array of values activates the multiple corresponding outputs. The number of output tabs a switch node will provide is specified by the user at model-construction time and may be anywhere from one to an implementation-dependent fixed upper limit. A selector value that does not correspond to the index of any connected output effectively disables all outputs.

Switches may be used to select between alternative representations or to dynamically enable (i.e., show) and disable (hide) a subgraph. An example of the use of switch nodes to model if-then-else and multi-way "switch<selector><cases>" constructs is given in Section 2.1.9—Conditional Execution.

1.17.2 Attaches

Attach nodes allow a node to exist within a coordinate space different from that of the parent's ctm_out. This is useful for a model whose frame-of-reference changes mid-shot. For example, a model of a cup sitting on a table might logically be represented within the coordinate space of the table; however, if a character picks up the cup, we would now like to represent the cup within the coordinate space of the character's hand, so that the cup will follow movement of the hand.

Attach nodes accomplish this by taking multiple alternate CTM inputs and a pair of selector inputs, and providing a single ctm_out. One selector input, sel_trans, specifies which CTM input will be used for translation; the other selector input, sel_rot, specifies which CTM input will be used for rotation. Translation and rotation of the input CTM's are separated through an orthonormalization step, then the selected translation and rotation are combined by matrix multiplication and provided at the ctm_out output. Scale, shear and perspective components of the input CTM's are discarded.

Specifically, an attach node accepts a variable number of inputs:

ctm_in, sel_trans, sel_rot, target_1, target_2, . . . , target_n and provides a single ctm_out.

While the attach changes the coordinate space in which its children exist, attaches do not modify the scene graph structure itself: the parent of the attach is the node above the one unique ctm_in input, regardless of the setting of the selector knobs. Sel_trans and sel_rot accept an integer or scalar input value, rounding scalars to the nearest integer. A value in [1.n] selects the corresponding target; values outside [1.n] select the ctm_in matrix. The user may set n at model-construction time to any number between zero and an implementation-dependent fixed upper limit.

1.17.3 IK Solvers

Forward Kinematics (FK) describes the normal chain of dependence within an articulated structure in which coordinate-space transformations are specified at a series of joints and/or bones and the position of the end of the chain (the end effector) is determined by concatenating these transformations. Inverse Kinematics (IK) reverses this process, allowing the user to specify a goal position from which are computed joint/bone transforms to position the end effector at (or as close as possible to) the goal. This computation may be over- or under-constrained, and many alternative methods exist to solve the IK problem.

We provide a general class of IK_solver nodes that solve inverse kinematic problems. Different IK_solvers implement different solutions, but all have in common a series of transform inputs and corresponding outputs, an enable input that enables selection between FK and IK operation mode, and inputs for the CTM's of the goal and the effector. Specific solvers may take other inputs as well. When the integer (or scalar, rounded to nearest integer) enable input is zero or negative, the IK solver is disabled, and the transform nodes it drives behave forward-kinematically. When the enable input is greater than zero (or 0.5, for scalar inputs), these transform nodes become inverse-kinematic.

Figure 2:
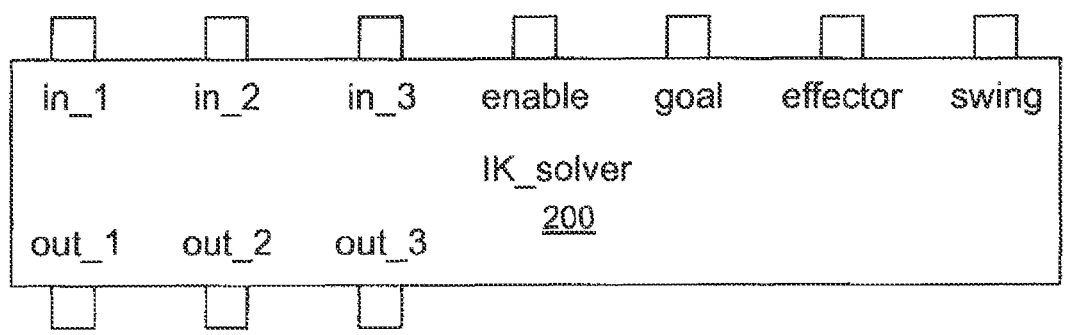
FIG. 2 illustrates an exemplary inverse-kinematics solver node.

Different IK solvers are capable of handling transform chains of different lengths. An example IK solver is shown in FIG. 2. This node can be set up to control a three-joint chain.

The transform inputs in_1, in_2, in_3 are driven by the forward-kinematic control graphs for these three joints. The corresponding outputs out_1, out_2, out_3 are connected to the xform inputs of the three joints. The enable input is connected to an FK/IK switching avar. The goal input is connected to the ctm_out of the target node. The effector input is connected to the ctm_out of the chain end-effector node. The swing input is connected to an avar for swinging the chain through alternative IK solutions in the underconstrained solution space. When enable is set to zero (or less-than 0.5 for a scalar input), in_1, in_2, and in_3 are passed through unmodified to out_1, out_2, and out_3, respectively. When enable is set greater than 0.5, internally computed transforms are provided at the out_1, out_2, and out_3 outputs. Depending on the algorithm used in this solver, the IK solution may completely ignore the transform inputs, or it may use the transform inputs as soft constraints and attempt to minimize error between the inputs and computed outputs. The solver algorithms we employ are standard, widely known methods.

Note that, unlike switches and attaches, both of which are scene graph nodes, IK solvers do not take a CTM input and do not provide a CTM output and thus are not scene graph nodes but rather are part of the non-scene expression graph.

The IK solvers we provide use one of several techniques. Cyclic coordinate descent (CCD) takes advantage of our ability to quickly re-evaluate a small number of outputs following a localized invalidation (push dirty) in the upstream graph. We visit each degree-of-freedom (i.e., avar) in the chain one at a time, making an adjustment to that avar to bring the end effector towards the goal; which way to adjust each avar may be found experimentally by making tentative changes to the avar and Pull-ing on the end effector.

Iterating on this process brings the effector to the goal if it is reachable, and stretches the effector out towards the goal if it is not reachable.

Jacobian inversion solvers compute the Jacobian matrix for the linkage at the current position. The Jacobian is the multidimensional extension to the differentiation of a single variable. It gives the partial derivatives indicating how the end effector will respond to small changes in the control avars. Inverting the Jacobian tells us how we should change avars to move the end effector closer to the goal. Because the Jacobian only is valid locally, we make only small changes, then recompute the Jacobian in the new configuration and iterate. The Jacobian for a given node may be found by differentiating node outputs as described in Section 1.14. However, a more convenient way to find the composite Jacobian across the entire linkage is to make small adjustments to each avar degree-of-freedom and observe the resulting changes (deltas) in the end effector. These deltas, suitably scaled, provide the content of the Jacobian matrix for the current linkage configuration. In general, we will not be able to invert the Jacobian, so we use a pseudo-inverse. The Jacobian transpose method avoids the (pseudo-) inversion step by using a simple matrix transpose.

Users are free to implement their own IK solvers using the External node plug-in interface described in Section 1.18.6.

1.17.4 Hierarchy Inversions

Hierarchy inversion is an alternative mode that inverts the usual flow of CTM data from parent to child within a local subgraph. This occurs when the user specifies that a different node within a given subgraph should be used as the root of that subgraph. This has the effect of flipping edges along the path from old root to new root.

Figure 3A:
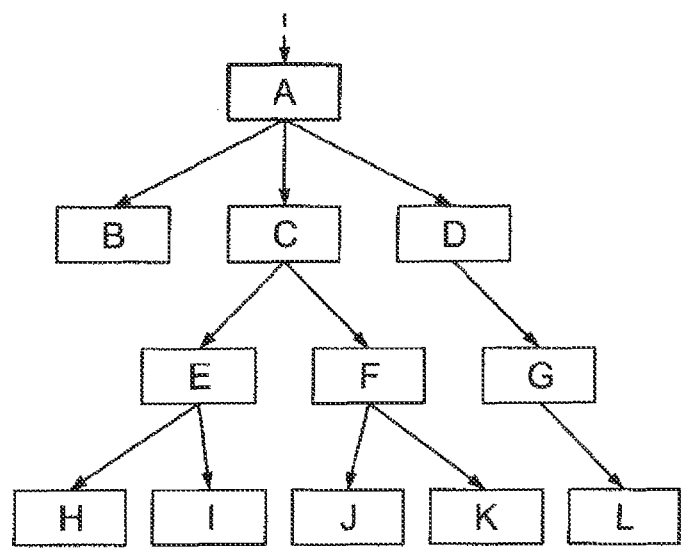
FIGS. 3a and 3b are examples of hierarchy inversion via subtree re-rooting.
Figure 3B:
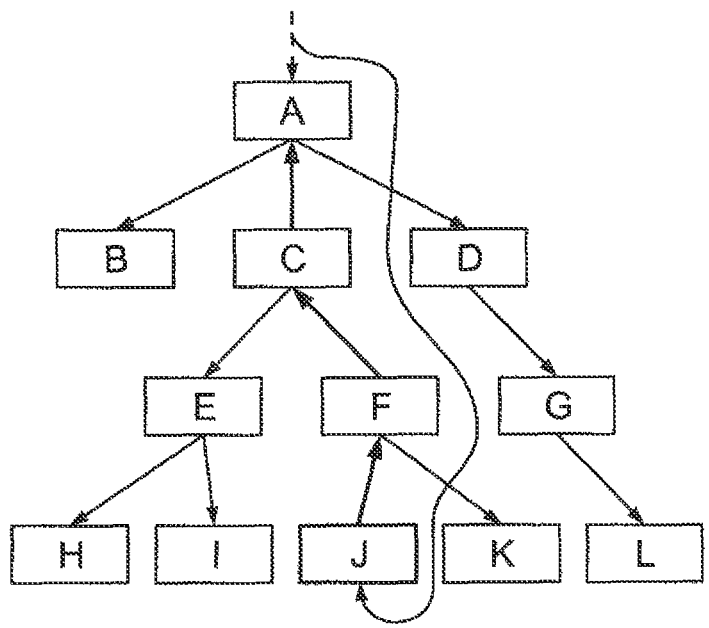

FIGS. 3a and 3b are examples of hierarchy inversion via subtree re-rooting. For clarity, only ctm_in and ctm_out connections are shown. In FIG. 3a, the original subtree is rooted at A. In FIG. 3b, the subtree below A is re-rooted at J, and the edges along path A-C-F-J have been flipped and the incoming edge incident to A has been routed to J. The graph above A is unaffected.

We introduce a new message, InvertHierarchy, that nodes may pass and receive. The application program maintains a serial number uniquely identifying each distinct render traversal. Before each time the application initiates a render, it increments the value of this serial number. When a node that is not inverted receives the InvertHierarchy message, it makes an internal notation that it is part of an inverted chain during the current render pass by raising an inverted flag and recording the serial number of the pass, and it then passes InvertHierarchy to its parent. A node that is inverted in the current pass (i.e., has inverted raised) will ignore any InvertHierarchy messages. Once a node has been inverted, subsequent Render's within the same pass are treated as inverted renders. When an inverted node X is rendered, it propagates the render not only to all its children but also to its parent. The anti-cycling inRender mechanism described in Section 1.9 prevents the Render from recursively being sent back to X from its children. When a Render is received for a different pass, the node lowers its inverted flag and renders normally.

To invert a local hierarchy, the user specifies the node at the top of that hierarchy (node A in FIGS. 3a and 3b), the node to become the new acting root (J in the Figs.), and the animation time range over which the hierarchy should remain inverted. Each node maintains a list of inversions that initiate at that node. In FIGS. 3a and 3b, node A will record internally that within the interval $[t_{invert}, t_{restore}]$ the subtree (properly, subgraph, since it may contain cycles) below it is re-rooted at node J. When A receives a Render at a parameter value in this interval, it will first raise its inRender flag (Section 1.9) and then will send InvertHierarchy to J and by induction to F and C. A will then pass the Render to J, which will recursively render F and C (and K, E, H, and I). A will receive a Render from C but will ignore it because A's inRender is raised; however, A will note that it received the Render from C. When J returns from rendering, A will proceed with rendering itself and then will recurse over all its children except C, that is, over B and D.

When rendering at a node on the inverted path from J to A, the behavior of the ctm_in and ctm_out inputs and outputs are switched; that is, it is as though ctm_in had become ctm_out, and vice versa. Rendering of geometry will still take place in the pre-ctm of the node; however in this case the pre-ctm first needs to be computed from the post-ctm. For inverted non-Transform nodes, this involves just copying the ctm_out to the ctm_in. For inverted Transform nodes, the post-ctm from the ctm_out "input" is multiplied by the matrix inverse of the xform input and the resulting pre-ctm is provided at the ctm_in "output". This reverses the usual (non-inverted) behavior of Transform nodes, which multiply ctm_in by xform, yielding ctm-out. The behavior of nodes not on the inverted path is unchanged.

Hierarchy inversion may be used when an animation task calls for an inverted view of a model hierarchy. For example, a character hanging by the arm from a tree limb may be animated relative to a model root in her hand rather than the usual model root at her pelvis. Bending the elbow joint of that character will then cause her entire body to swing relative to her stationary forearm, rather than the other way around.

1.18 Expression Nodes

Data in the graph originates from several types of nodes, including parameter drivers, constants, file readers and avars. Many other node types exist that process this data, performing calculations, generating other data, and producing the geometry, lighting and shading that ultimately is rendered in the 3-D view window. Here we describe each major category of node and give examples of each.

1.18.1 Data Sources

Parameter drivers, such as clocks, have already been mentioned. Such nodes have no inputs (or optionally min/max range inputs) and only a single output. They may be configured internally to vary their output over some value range. For clocks, the rate at which they vary is often tied internally to the application's notion of "wall-clock" time. However clocks may be paused, run backwards, run at slower- or faster-than-real-time speeds, or single-stepped (that is, incremented by some fixed stepsize) forwards or backwards. Non-clock parameter drivers also vary over some parameter range, but conceptually they take on all values in that range simultaneously. In practice, they return zero in response to a pull for kInputParam, and otherwise take on whatever specific value was pulled, clamped within their allowed range, if any.

Constants are another node type. As their name implies, constants have an unchanging value, no matter at what parameter value they are pulled. The value is set internally to the node at model-construction time. They have a single value output, and no inputs. There is no conceptual difference between providing a constant-valued input expression or connecting an input to a constant node. In different situations, one or the other method may be more convenient.

File readers are similar to constants, except that rather than their value being set internally, it is read from a disk file. File readers take a file input string designating the file path and provide a value output. Various file readers are available for reading different types of files, and some may have additional inputs for configuring import options or additional outputs providing extra information about the data read. For example, MeshReader nodes read meshes saved in Wavefront OBJ and several other formats. This reader has an objects input accepting a string giving names of objects to be read in that file; if no value (or a NULL value) is provided, all objects in the file will be imported. Other inputs control the assembly of meshes from the OBJ data, for example, by specifying a threshold dihedral angle at which a hard edge (two distinct face normals) should be introduced in the mesh normals. The MeshReader provides a mesh or array of meshes at its value output, plus an objects_read output giving the names of the meshes read. Other file readers exist for loading numerical arrays, images, QuickTime movies, audio, motion-capture data, and so forth.

Avars are nodes that correspond to articulated variables as defined in W. T. Reeves, E. F. Ostby, and S. J. Leffler, *The menv modeling and animation environment*, Journal of Visualization and Computer Animation, 1(1):33-40, August 1990. Examples of articulated variables are quantities that a human operator might want to vary over time (or other parameter value for a non-clock parameter driver). They have a parameter value input, which usually comes directly from the global animation clock node; an "override" input to allow overriding the data set in the avar; and"value" and "solo" outputs. The value output gives the value the avar takes on at the input parameter (when the pull is at kInputParam) or at the parameter requested by a pull. The solo output is discussed in Section 5.

As described in Section 2.1.3, avars are a templated node type and can be instantiated for any value type for which certain basic mathematical operations are defined. We have found scalar- and quaternion-typed avars to be of particular value, but other types are possible as well.

The value output of an avar is a function of the param input. The function definition is complex and is described in detail in Section 5. The function definition may include kinematic, dynamic, procedural, sampled and stochastic components. The kinematic components of an avar, if any, are defined by parameterized one-dimensional piecwisepolynomial curves, or splines, with knots specifying the value at particular parameters along the spline. The form and specification of these splines are described in Section 2.3.

The application keeps track of a user-specified current manipulation mode. Manipulation modes correspond to common modalities of manipulation; for example, translation, rotation, scale, bend, squash/stretch, mesh deformation, global deformation, etc. The active avars at any given moment are those avars designated (by the user at model-construction time) as relevant to the current manipulation mode, and that are within a subgraph driving any input (other than ctm_in) to the currently selected scene graph node or nodes. Active knots are knots in the active layer (see Section 5) of the active avars that are unlocked and free to be manipulated (Section 5.3).

We provide an in-camera indication of the names of the currently active node and the active avars. We also indicate in-camera which active avars have active knots at the selected motion-path knots (see Section 4.1.3) or current frame if no path knots are selected.

Figure 10A:
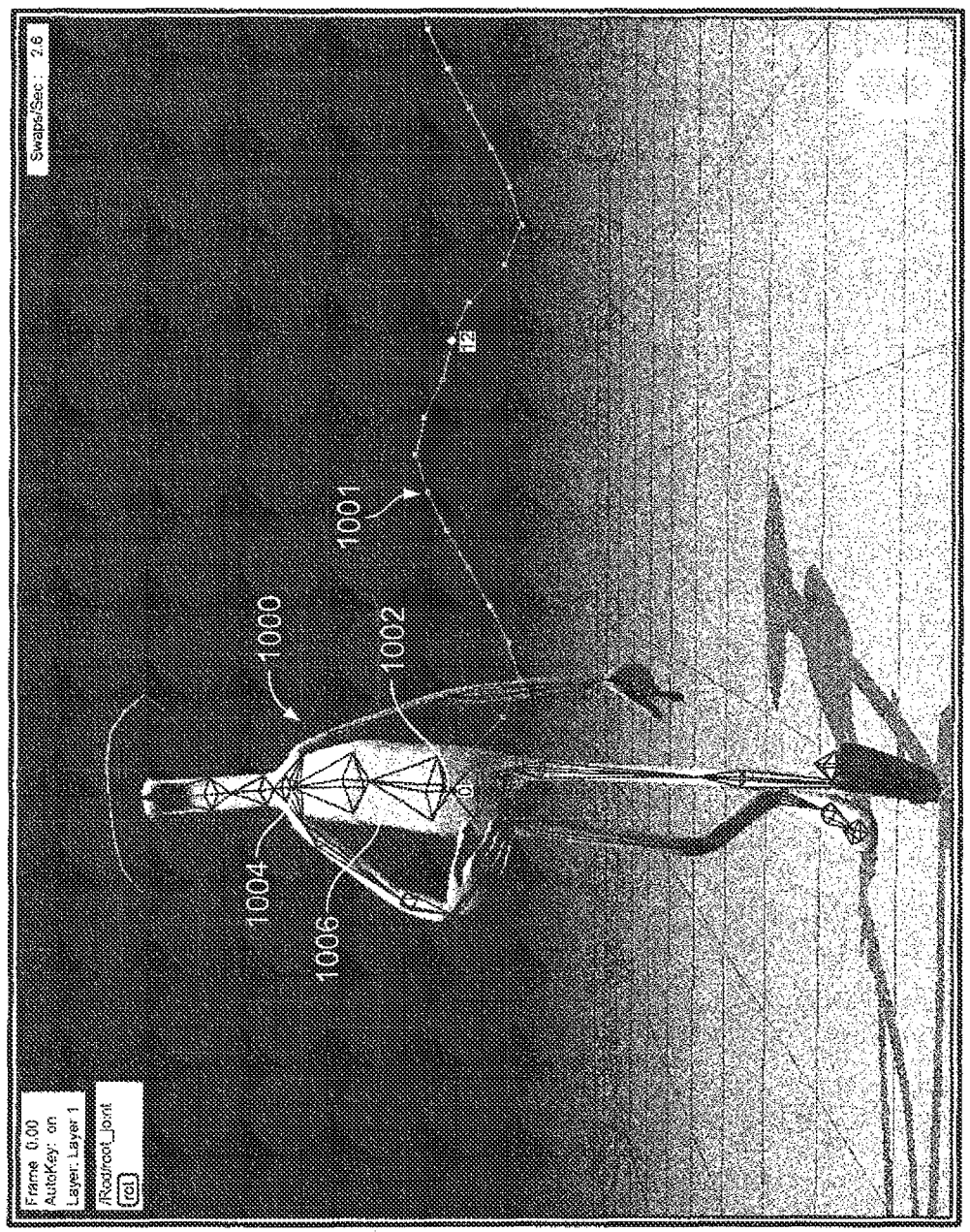
FIG. 10a is a screenshot illustrating the user selection of a root joint of the character in FIGS. 9a-9c with tickertaping enabled.

In the top-left of FIG. 10a, text annotations indicate that the active avar is the "rot" avar of the "root_joint" node of the "Rod" model. The yellow box around the word "rot" indicates that this avar has a knot at the current frame (frame zero). The yellow diamond on the motion path at frame zero confirms the existence of a knot there (Section 4.1.3), as does the yellow solid-line box around the large frame number "0" in the lower right corner of the view. If there were additional avars active, they would be listed to the right of the word "rot", and each would have a yellow box around it if and only if that avar had a knot at frame zero. The box around the large frame number at the bottom right would be drawn with a solid line if all active avars had knots at frame zero; if only some active avars had knots at frame zero it would be drawn with a dashed line.

Figure 10B:
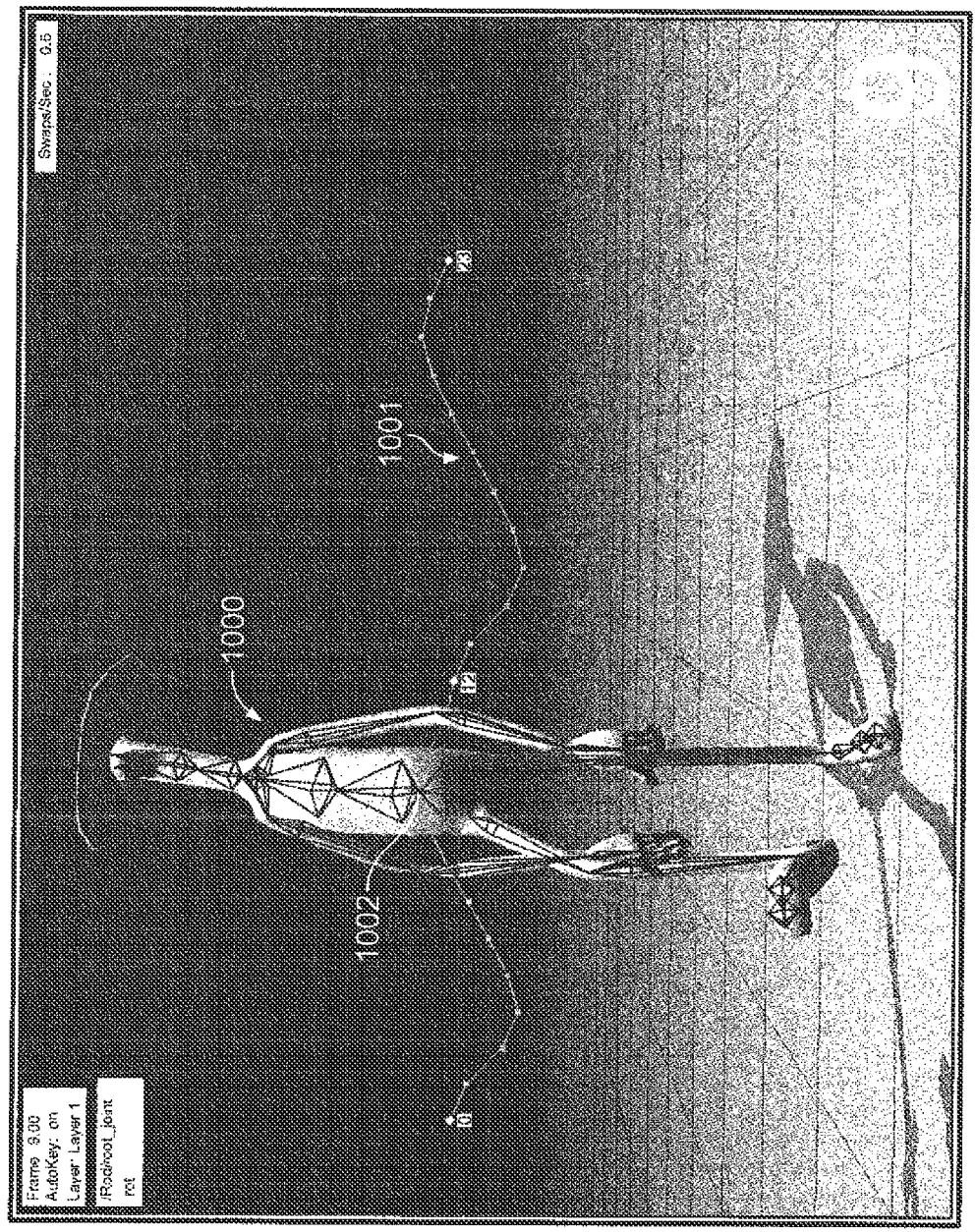
FIG. 10b is a screenshot illustrating a lateral shift of the motion path shown in FIG. 10a, so that frame 9 on the path lies at the root joint.

In FIG. 10b, we see that the "rot" avar is still active, but that it does not have a knot at the current frame (frame nine) because the word "rot" is not boxed in yellow. Similarly, we note there is no yellow diamond on the motion path at frame nine, and the large frame number "9" at the bottom-right of the view has no box around it.

Each avar is internally configured at model-construction time to have some default value, which is the value that avar takes on when it has no animation (i.e., no motion channels) in any enabled layer (see Section 5). Several settings concerning the preferred display format for avar data may be specified, such as the unit of measurement (e.g., meters, kilograms, seconds, radians, degrees), linearity (linear vs. logarithmic), and scale. An avar may also be configured to have an allowed output value range (i.e., hard limits) and a preferred range (soft limits). These ranges do not affect the evaluation of the avar itself, but they can be queried, for example, to guide a constrained optimization solver running in a dependent node or an external computation. The user can optionally set direct manipulation controls (see Manipulators below) to respect these value limits. For scalar avars, soft- and hard-limits are specified as minimum and maximum values. For quaternion avars, soft- and hard-limits are each specified as an array of unit quaternions demarcating a convex "spherical polygon" within which the avar may move.

The user can enable a Hold Poses mode in which all time-varying avars are evaluated as though they contained in every layer only stepped knots at those times at which the active avars have knots in the active layer. This has the effect of arresting movement between active knots. When playing the animation in this mode, at each active knot the scene elements jump discontinuously to the positions and state they normally take at that time, and otherwise do not move. We accomplish this by substituting for the output value of the global animation clock the knot time $t_{held}$ of the last active knot prior to or at the true animation time. Since time-varying avars use this output value as their param input, in response to pulls at kInputParam during rendering, they will hold their own value outputs constant except when the animation time $t_{now}$ passes the next active knot time $t_{next\_hold}$; then $t_{held}$ will update to $t_{next\_hold}$, and all the avars will jump to the output state at the new $t_{held}$.

1.18.2 Operators

Operators produce an output that is functionally dependent on some number of inputs. For example, basic operators include the polymorphically typed nodes Multiply and Add. These are actually convenience wrappers around a general Compute node that takes an arbitrary number of inputs and a user-provided string that expresses some function. We evaluate the function on the input tabs and provide the result at the output tab. The expression language is described in Section 2.1.5. Other convenience wrappers include Translation, Rotation and Scaling, which take scalar inputs for tx/ty/tz, rx/ry/rz and sx/sy/sz, respectively, and produce a transformation matrix output.

IK Solvers are expression nodes for introducing dynamic changes in graph topology in support of inverse kinematics. They are described in detail in Section 1.17.3.

Deformers are nodes that compute some point-valued function of points. That is, a deformer expresses the function p'=f(p). Mesh deformers apply this function across the vertices of a mesh, usually in some local coordinate frame, for example, a body coordinate frame, or in a surface-relative fashion. Spatial deformers, or global deformers, apply their function at arbitrary positions in global or local space. Both types of deformers accept a mesh in input mesh or point array. The only real difference between mesh and spatial deformers is that, while each accept additional parameters controlling the deformation function, the input parameters of mesh deformers are point-wise fields that conform to the input mesh, while spatial deformers and their inputs have no knowledge of, and need not conform to, the point-data topology or layout. (The one exception to this is that spatial deformers, like mesh deformers, can subdivide mesh inputs before acting on them, as described below.)

All deformers provide two outputs: mesh_out and deformation. Deformers may be used in either of two ways. They may be used to actually deform their input mesh or point array in a vertex-wise or point-wise fashion, with this deformed mesh or point array available at mesh out. Alternatively, they may be used to compute a vector field of the (global, local, or surface-relative, depending on the type and configuration of the deformer) vertex- or point-wise displacements as computed by the deformation function; this vector field is available at the deformation output.

In our implementation, all meshes are represented and rendered as subdivision surfaces. When a mesh is provided to the mesh_in input on a deformer node, the refinement level at which the deformer is acting may be specified at the deformer's sdlevel input. The surface will be deformed by moving the refined vertices at the specified level rather than moving vertices at the base (unsubdivided) level zero. When specifying sdlevel>0 for a mesh deformer, point-wise parameter fields conform to the subdivided mesh. Sdlevel is ignored when deforming simple point arrays lacking connectivity information.

Many deformer subclasses exist, such as RotateDeformer, BendDeformer, CylindricalDeformer, SphericalDeformer, ConicalDeformer, MuscleDeformer, JointDeformer, BoneDeformer and numerous others. Each performs a particular type of mesh deformation. These deformers may be chained sequentially, passing the mesh_out of one deformer to the mesh_in of the next; or their deformation vector-field outputs may be combined (summed) in parallel and later applied to a mesh via point-vector addition. It is common for complex deformation networks to include a mix of parallel and sequential deformations.

The SkeletalDeformer mesh deformer takes as inputs any number (up to some implementation-dependent limit) of bone ctm_out's, plus four pairs of bone_id, bone_weight point-wise scalar-field inputs and a body_space CTM input. The bone ID's index (counting from one) into the bone inputs, associating up to four bones with each point in the input mesh (or point array). The body-space CTM (pre- or post-, as described below) of each bone is noted with the skeleton in its home (default) pose, then the transform that carries each bone from home pose to the current pose is scaled by the corresponding bone weight and used to transform each mesh point. For each point, up to four such weighted-bone transforms are applied sequentially. A positive bone ID selects the post-ctm of the indexed bone, while a negative ID selects the pre-ctm of the bone indexed by the absolute value of the ID. Specifying a bone ID of zero is equivalent to specifying a zero weight. This deformer thus performs four-way weighted-bone deformation of the input mesh as is popular in many consumer-level and real-time graphics applications. On hardware that supports the OpenGL capabilities GL_ARB_vertex_blend or GL_vertex_ program, we are able to perform the skeletal deformation on the graphics card, provided (a) that the number of bones falls within hardware limits and (b) that the deformed mesh is not needed for any subsequent computations (other than rendering). For convenience, when connecting a SkeletalDeformer, one need only specify the root node of the skeleton hierarchy and the application will take care of connecting the body_space input and the many bones in the skeleton (and will mark those bone input tabs hidden so that they and their incident edges are not drawn in the graph editor view, thereby reducing clutter).

1.18.3 Scene Graph Nodes

Scene graph nodes were described in general in Section 1.9. These nodes constitute the scene graph embedded within the larger expression graph. While there are many varieties of scene graph node in our system, all respond to a Render message, and all take a Concatenated Transform Matrix (CTM) ctm_in input and provide a ctm_out output. The Render message and the roles of ctm_in and ctm_out in render traversal are described in detail in Section 1.9. There are numerous subclasses of the basic SceneGraphNode class, the most important of which are described below.

Group nodes are the most basic type of scene graph node. A group node itself serves only as a collective parent for the children beneath it.

Part nodes introduce a named scope over their scoped subgraph. We define the scoped scene nodes of a part node P as those scene-node descendents of P reachable by a path, such path having length greater than zero and containing no parts except one or two at the endpoints of the path. We say the scoped scene nodes of P are "scoped to P". The non-scene supergraph of a scene node R we define here as the union of non-scene subgraphs above (i.e., ancestral to) R's inputs (other than ctm_in). The potential scoped subgraph of part P we define as the union of the scene nod f fzes scoped to P plus the nodes in the non-scene supergraph of any scene node R scoped to P that are reachable from R via a path containing no scene nodes except R. Then we define the scoped subgraph of part P as the union of (a) those nodes in P's potential scoped subgraph that do not belong to any other part's potential scoped subgraph plus (b) those nodes below P, or in the non-scene supergraphs above P's descendents, that are not in the scoped subgraph of any descendent of P (other than P itself) and that are not in the potential scoped subgraph of any node not descendent to P.

The names of part nodes in the scene-graph path from the root to a given node A contribute the path components to A's full path-name. For example, a node "Thumb" whose full path is "/Fred/RArm/Hand/Thumb" exists in the scoped subgraph of a part node "Hand", and "Hand" is in the scoped subgraph of part "RArm", which in turn is in the scoped subgraph of part "Fred", which itself is in global scope.

A model is a type of part node that designates the top scope of an independently loadable scene subgraph. In the above example, part "Fred" would be best represented as a Model node.

Most scene graph nodes pass their pre-ctm (from ctm_in) through to their post-ctm (at ctm_out) unmodified. Transforms are scene graph nodes that transform their pre-ctm to produce their post-ctm (Section 1.9). Basic Transforms multiply their ctm_in input by the transform matrix at their xform input and assign the result to ctm_out. Convenience subclasses of transform, such as Translate, Rotate and Scale, simplify building common expressions, here effectively combining a Translation, Rotation or Scaling node, respectively, with a Transform node. The Rotate node is polymorphic, accepting any one of rx,ry,rz Euler angles, an orthonormal matrix, or a quaternion. Two Transform subclasses, Bones and Joints, provide higher-level control over the matrix transform and enable direct manipulation via Manipulator nodes (discussed below).

Bones are transform nodes that represent a nominally rigid linear element within an articulated skeleton. Inputs allow for animation of prismatic (lengthwise) translation, revolute axial twist, and two orthogonal axes of bend. There are independent min_u and max_u inputs for controlling the section of bone over which bend and twist occur. It may be convenient to normalize the length and other animation parameters of bones so that, for example, setting all length avars to 1.0 will produce bones of length appropriate for the default pose of a character. This may be accomplished by adjusting the bias (and possibly gain) of either the bone inputs or the avar outputs; generally it is best to set the bias and/or gain at the avar output so as not to interfere with other processes (e.g., IK solvers) that may try to adjust the bone inputs directly (see Section 1.17.3). Similarly, manipulation limits may be set by specifying value limits on the avars.

Joints are transforms that represent revolute or spherical joints within an articulated skeleton. Joints accept as their xform input either an orthonormal matrix (e.g., from an Euler-angle rotation) or a quaternion (e.g., from a quaternion-valued avar). It is often desirable to assemble the model so that all joints will be centered (i.e., Euler-rotation avars zeroed, quaternion avars set to quaternion identity) when the skeleton is in the default pose. As with bone parameters, this can be done by setting a "pre-orientation" via bias and/or gain at the avar outputs (or, less ideally, at the joint rotation input). Joint limits are set via limits on the (scalar or quaternion) avar(s) driving the joint. The application provides a simple "by-demonstration" joint-limit configuration mode in which the user moves the joint through its allowed range of motion and the application sets corresponding avar limits. For scalar avars, this is straightforward; for quaternion avars, we fit a convex "spherical polygon" around the observed motion range. The user may subsequently edit these joint limits "in-camera" by interactively manipulating the unit-quaternion vertices of this spherical polygon drawn on a 3-D virtual sphere centered on the joint, or the user may specify new limits by demonstrating a new range of motion.

To facilitate user understanding of the bones and joints comprising a skeleton, we provide an application option to draw a translucent skeleton overlay over geometry (FIGS. 10a and 10b). This is implemented by rendering a ghost (Section 3) in skeleton mode at the current animation-clock time. Bones and joints normally are excluded from final (off-line) rendering.

Surfaces provide a mechanism for rendering meshes as Catmull-Clark subdivision surfaces. A surface node accepts a mesh input and a material input (described below). The mesh undergoes n Catmull-Clark refinement steps, where n equals the numerical floor of the effective lod (Section 1.7) of the render. Commonly, a mesh will originate at a MeshReader node, be passed through a deformer network, and ultimately be fed to a surface node for rendering.

Switches and Attaches are scene graph nodes for introducing dynamic changes in scene topology. They are described in detail in Section 1.17.

Glyphs are scene graph nodes providing notational graphics that may be displayed, and possibly manipulated, in interactive views but that are not really part of the CG scene and are excluded from final (off-line) rendering. Examples include MotionPath (motion-path curves), ControlHull (meshed-surface control hulls), EditPoint (control points on motion paths and control hulls), Annotation (text labels and 2-D graphical markup), Jack (a 3- or 6-dof point for use as an IK goal, attach target, or anywhere else a virtual reference point is desired), and Manipulator (discussed below). During a normal rendering pass, glyphs are rendered in the same manner as other scene graph nodes, but glyphs generally are excluded from ghost and shadow rendering passes (Section 3).

Manipulators are glyphs that provide in-camera direct-manipulation control over animatable elements of the 3-D scene. Example manipulators include an arcball rotation controller, x/y/z translation handles, x/y/z scale handles, and a bend manipulator handle for controlling bend deformers. The application is responsible for creating and deleting manipulators appropriate to the surface, bone, joint, or other object currently selected and the current user-specified "manipulation mode" (defined above). For example, if the user selects a joint and then chooses "rotation mode", an arcball controller will be created by the application and connected as a child of the joint node. When the user later deselects the joint or changes to a different manipulation mode, the application will delete the arcball controller.

Light scene graph nodes define theatrical lighting in the 3-D scene. They take inputs corresponding to the particular light type. For example, Pointlight has inputs for diffuse and specular color, falloff rate, and linearity, while Spotlight also has inputs for cone angle, shape and penumbra. Like surfaces, lights take an optional material input for creating advanced effects such as gobo's (projected textures) and custom beam distributions or for associating arbitrary shaders with a light (Section 1.18.4). An n×m lighting matrix defines the weight with which each of the n lights in a 3-D scene illuminate each of the m surfaces in the scene. This matrix defaults to 1.0 everywhere and is editable by the user in an application dialog. Each light's intensity is scaled by the corresponding matrix entry before final rendering (and optionally before interactive rendering) of each surface.

Camera scene graph nodes define the virtual cinematic cameras used for viewing a scene. A camera defines the viewer's eye-point. The basic camera class takes transform-matrix inputs projection and view and sets the rendering projection and view matrices accordingly. Subclasses of the basic camera exist for providing higher-level control over camera mount movements (e.g., dolly, truck, crane, pan, tilt, and roll), view-camera movements (rise (and fall), shift, swing and tilt), lens settings (focal_length, aperture, distortion), shutter (shutter_angle) and film transport (fps). A filter input accepts a material value (see below) for creating advanced effects such as lens filters, vignetting, chromatic aberration, internal reflections (flare) and subsurface scattering (bloom), as well as binding arbitrary shaders to the camera. Cameras provide an image_plane output optionally used in conjunction with Film Backs and Imagers (Section 1.18.5) to further define or utilize the rendered image produced.

1.18.4 Material Nodes

Material nodes define optical and material properties such as ambient, diffuse, specular and emissive color; surface roughness ("shinyness"); texture, glow, reflection, irradiance, bump and displacement maps; atmospheric effects ("participating media"), and so forth. The simple Color material subclass provides a convenient way of setting just diffuse color. Texture material nodes bind a 1-D, 2-D, or 3-D texture map to a (OpenGL or offline renderer) texturing operation or the map input of another material node. EnvironmentMap nodes bind a spherical or cube reflection map. The texture image data itself comes from an image input, which may originate at a FileReader (Section 1.18.1) or at an Imager (Section 1.18.5).

Programmable materials include the FragmentProgram and VertexProgram nodes, which bind OpenGL fragment and vertex programs. Shader nodes allow a named external "shader" to be bound for use during final (off-line) rendering by a batch rendering program such as Pixar's RenderMan.

All materials take a material in input and provide a material out output. Connecting multiple materials in series allows the assembly of complex combined effects. For example, several texture nodes might be connected, with one specifying a diffuse map, another modulating that diffuse map with another map, a third specifying a glow map, and a forth specifying a bump map. These texture nodes could be connected to a shader for controlling the off-line rendering process and a basic material for specifying underlying material properties such as diffuse and specular color. The effects of these nodes will be combined as each is chained together.

An Atmosphere node is provided as a proxy for accepting a material input to affect the scene atmosphere, providing participating media effects such as haze, fog, Rayleigh scattering (visual perspective) and diffraction effects (e.g., halos and coronas). A given scene may have at most one atmosphere node that has global effect over the scene. Atmosphere material is primarily of importance for off-line rendering; with the exception of fog (which is supported in hardware by current graphics cards), most atmosphere materials are ignored during interactive rendering. Atmosphere nodes are unusual in that they have no outputs.

1.18.5 Imaging Nodes: "Camera Backs"

Film backs may be used in conjunction with cameras to provide further control over the final-image generation process. Film backs accept an imageplane input from a camera and a material input that can be used to simulate properties of film stock such as speed, transfer function, grain and reciprocity failure. Film backs also accept inputs for configuring the film format (aspect ratio and anisotropy). Film backs are the only node type other than atmosphere nodes that produce no output value. With the exception of the aspect-ratio setting, which the user may apply in constraining camera-window resizing during the interactive session, film backs are used only for controlling external off-line renderers and have no effect on interactive rendering.

Imagers accept an image_plane input from a camera and produce an image output. Imager nodes are analogous to the digital-imaging backs available for traditional (physical, film) cinematic cameras. They are typically used in conjunction with texture nodes (Section 1.18.4) to produce a reflection map or otherwise capture a rendered image of the scene for use within that scene. The image output may also be directed to an export node (implemented as an External, see Section 1.18.6) for integration into editing, compositing or color-correction software.

1.18.6 Miscellaneous

Transmitters and receivers together provide graph-wide broadcasts as described in Section 1.16.

Macros are encapsulated graphs in which particular outputs and unconnected inputs of the graph have been designated "public". All other outputs and inputs are private. The user may instantiate the macro in another graph, where it will appear as node providing these public inputs and outputs. Macros do not alter evaluation of the total graph at all; they only provide the user convenience of an encapsulated view of graph structure.

Externals are nodes whose definition has been loaded through an external plug-in interface. They are coded in C++ by using a provided API, then are loaded at runtime and are available for use along with macros and built-in nodes.

1.19 Graph Editing

Figure 6:
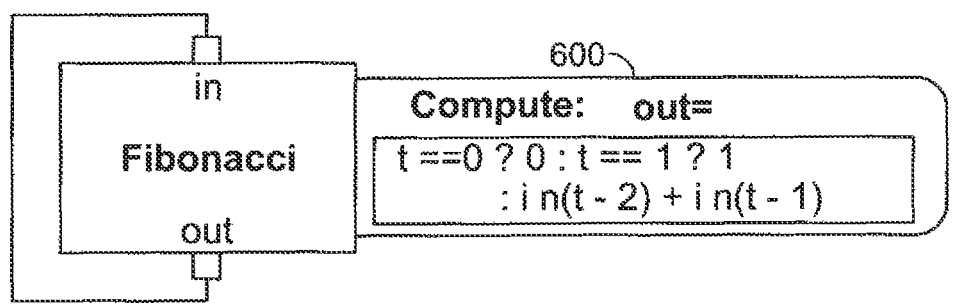
FIG. 6 illustrates a pull-out drawer for changing internal node settings.
Figure 4:
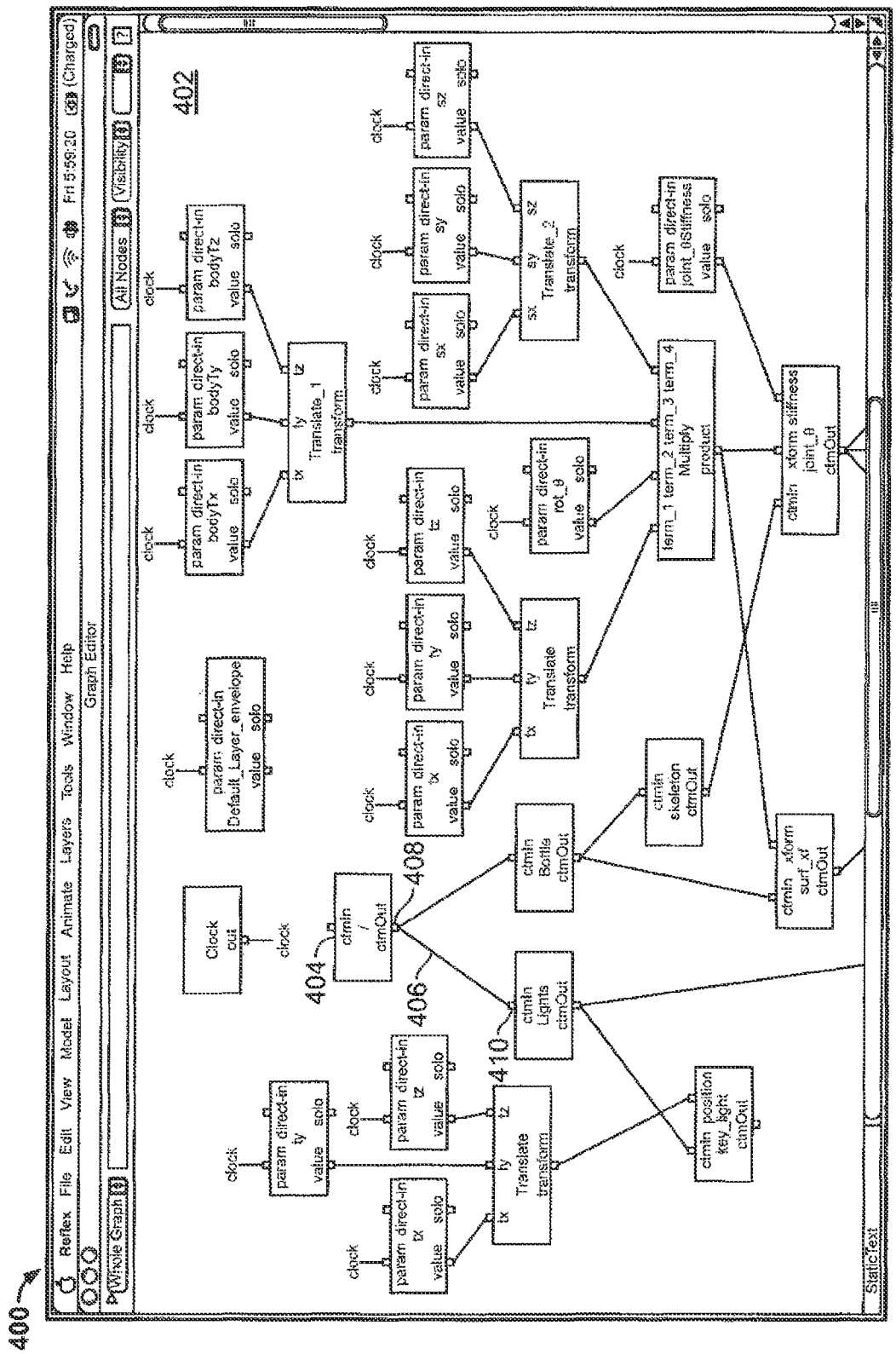
FIG. 4 is a screenshot of exemplary graphical user interface for creating, viewing and editing graph structure.
Figure 8A:
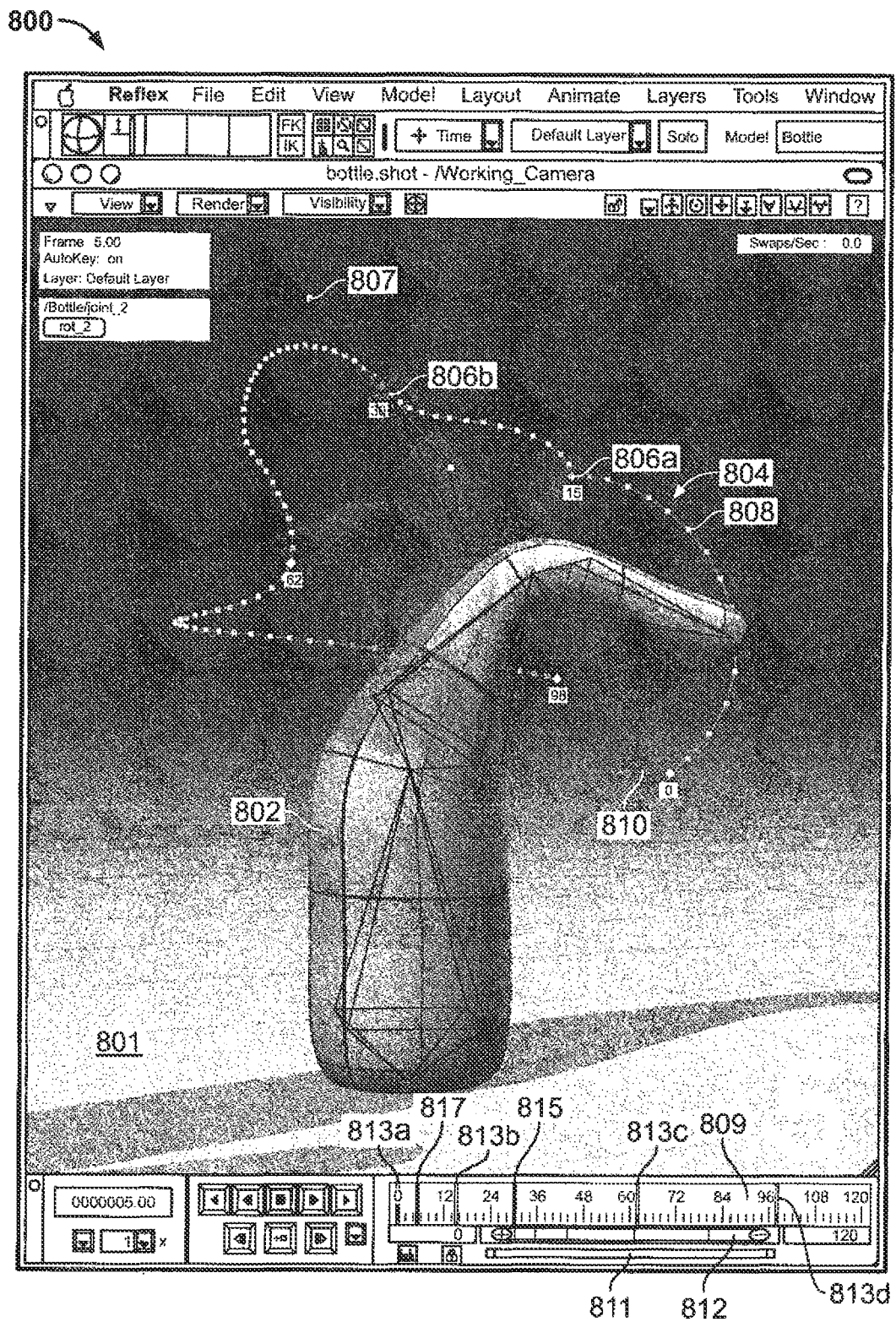
FIGS. 8a-8c are screenshots illustrating a bendable-bottle model.
Figure 8B:
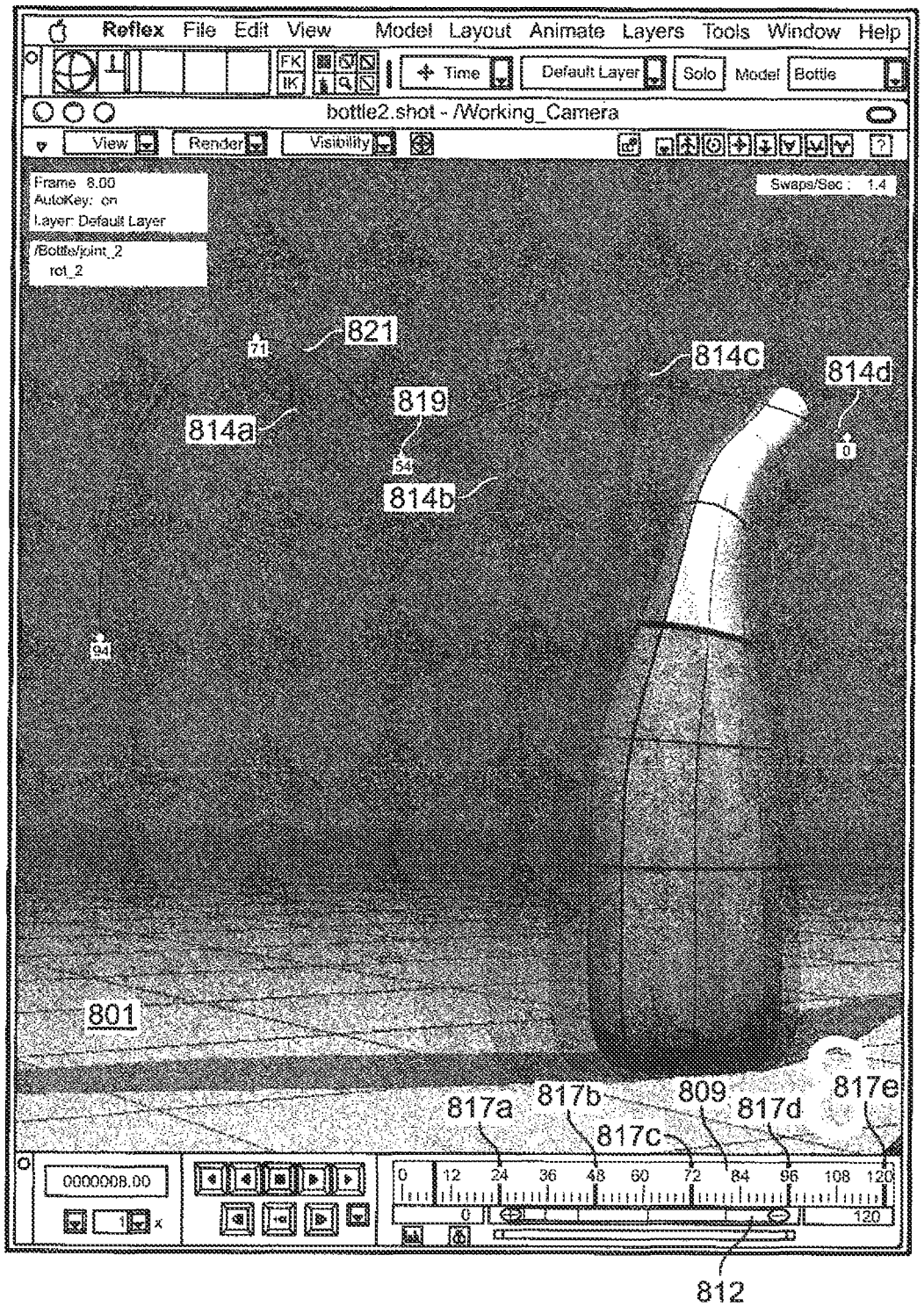
Figure 8C:
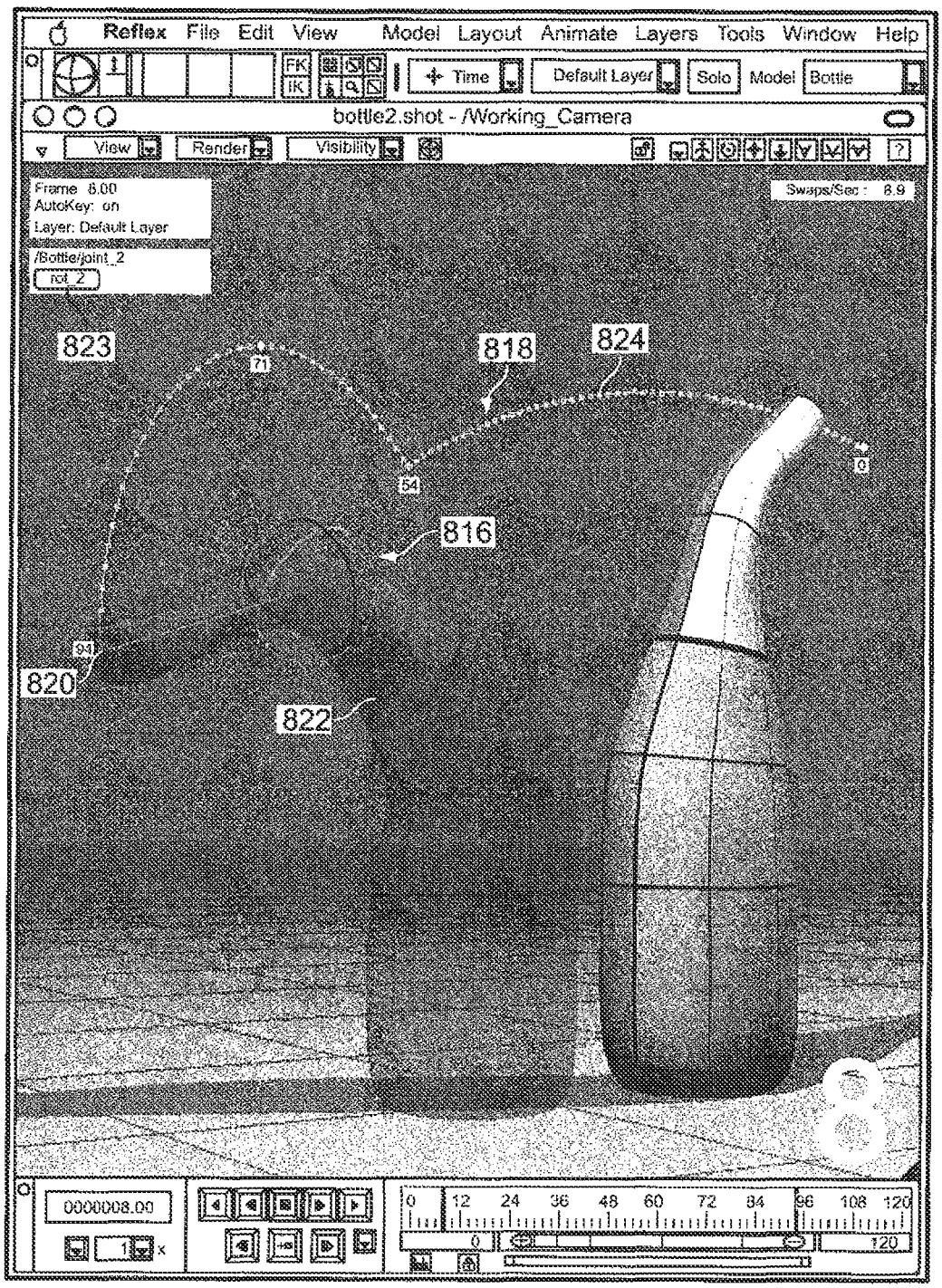

FIG. 4 is a screen shot of an exemplary control graph 402 for the bottle model shown in FIGS. 8*a*-8*c*. The graph editor 400 can be used for creating, viewing and editing the control graph 402. Example nodes 404 are shown in FIGS. 2, 4 and 6. Edges 406 are displayed as polylines joining node output tabs 408 and input tabs 410. Nodes 404 may be instantiated by selecting from a list of known node types. User-created nodes (Macros and Externals) also appear in this list. After creating a node 404, the user may click-and-drag on the node 404 to reposition it within the control graph 402. The user may connect node outputs to node inputs by dragging a rubber-band line from an output tab 408 to a type-compatible input tab 410, or vice versa. In some implementations, selecting one or more nodes 404 or edges 406 and pressing the Delete key will delete the selected graph elements. Selected nodes 404 may also be copied and pasted to create new nodes 404 of the same type with the same internal settings. Internal node settings (e.g., input expressions, gain and bias, user comments, output caching strategies, etc.) may be viewed and edited either in pull-out drawers 600, as shown in FIG. 6, and/or a node inspector application dialog. In some implementations, selecting a node 404 in the control graph 402 selects that node 404 elsewhere throughout the application user interface, and vice versa.

Figure 5:
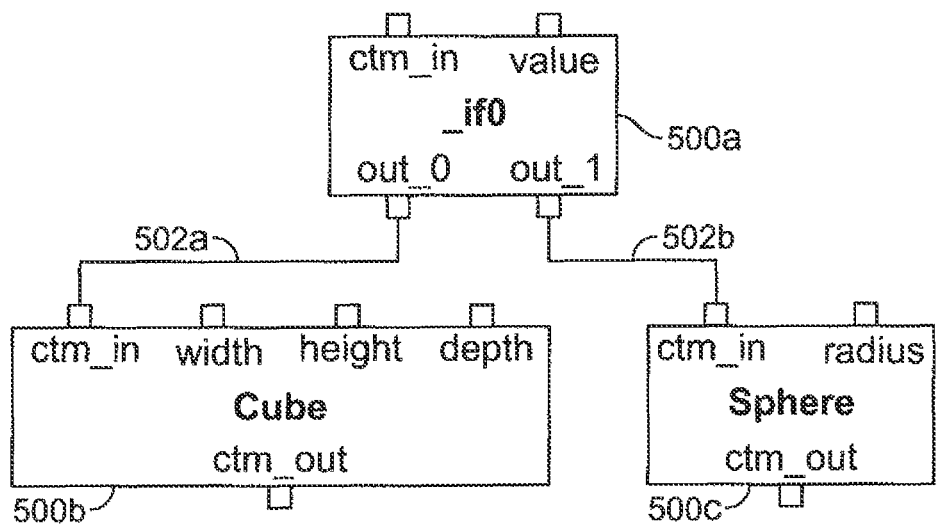
FIG. 5 illustrates the interconnection of nodes using the graphical user interface shown in FIG. 4.

Nodes 404, input and output tabs 410, 408, and edges 406 may be hidden, which has no effect on their behavior but prevents them from being drawn in the graph editor. Hiding an input tab 410 or an output tab 408 effectively also hides edges 406 incident to that tab. Hiding a node 404 hides its connection tabs and incident edges as well. Certain connection tabs are hidden by default. For example, Cameras, Lights, and basic Material nodes accept many inputs, but commonly only a few are used, so by default the more obscure inputs are hidden. Similarly, SkeletalDeformer nodes accept a great number of inputs, one from each bone within a skeletal hierarchy, but these bone inputs are all hidden by default. This provides a less-cluttered view of the graph. The user may show or hide any node, tab or edge at runtime or model-construction time. The user may also elect to have hidden elements shown within the graph editor 400, for example, to allow selecting a hidden element. Hiding a node in the graph editor 400 hides that node in 3-D scene views, and vice versa. Control graphs 402 may also be understood and edited with an external text editor using the text-based programming languages described next. FIG. 5 shows nodes 500*a*, 500*b* and 500*c*, connected with polylines 502*a* and 502*b*.

2. Programming Languages

Expression graph structures may be built interactively via a visual graph editor user interface. Frequently it is more convenient to specify the graph via a text-based programming language. We describe the core of our model-definition language (Section 2.1). Two subsets of the modeling language are commonly used outside the model-definition setting: these are the syntaxes for expressions, described in Section 2.2, and animation, described in Section 2.3. While we describe these in three distinct sections, they all are properly part of the same language and all can be used to define a model or collection of models. The resulting language is Turing complete, allowing specification of any computation or algorithm that could be expressed in a general purpose programming language such as C.

2.1 Modeling Language

The modeling language in our system is an object-oriented C/C++-like language. It has POEM (Parse Once, Execute Many) execution semantics, with models being unrolled and the corresponding graph instantiated once at parse time, after which the same graph is evaluated as often as necessary. The system provides garbage collection: there are no "new" or "delete" operators. Named symbols in the language correspond to nodes, node inputs, and node outputs. Common preprocessor directives such as #include, #ifdef, #elif, #else and #endif are available. We also provide a #includeonce convenience directive for including a particular header only once within a given translation unit.

2.1.1 Declarations

A node is created in the language simply by declaring it. For example, the model code:

Model Joe;
Model Sue;

creates two nodes of type Model named "Joe" and "Sue". Node inputs may be specified within parentheses on the declaration line as positional parameters or as name=value pairs:

```
Translate sideways(5,0,0);
Translate upwards(ty=2); /* tx and tz inputs default to 0.0 */
```

The first line above creates a Translate node "sideways" with its input tabs tx, ty and tz set to constant values 5, 0 and 0. The second line creates a node with only one input set to a non-default value. Anonymous nodes may be created as well, for example, "Translate(1,2,3)." Here the system will generate a symbol name to be used for the node, however that symbol name will not be available to the program so there is no way to refer to that node subsequently.

2.1.2 Inputs and Outputs

Node inputs and outputs may be referenced via the selection operator (".", period), either by name as node_name.tab_name or by index as node_name.in[i] (for inputs) or node_name.out[i] (for outputs). The first output of a node may be referenced with just the node name alone: thus, "myNode" is equivalent to "myNode.out[0]." Inputs are lvalues and outputs are rvalues. Assigning an output to an input establishes an edge. An edge is also created when an output is passed as an input parameter to a declaration:

```
Avar up, right;
Translate trans (ty=up);    /* connect up.value -> trans.ty */
trans.tx = right;           /* connect right.value -> trans.tx */
```

Nodes and inputs/outputs inhabit distinct namespaces, so we could have written the above as:

```
Avar tx, ty;
Translate trans (tx=tx, ty=ty, tz=nil);
```

The predefined symbol "nil" (or equivalently "NULL") indicates we wish to leave input tz disconnected. This is commonly used with positional parameters, for example, "Translate (tx,nil,tz)".

When referencing an output (as a parameter or as the rvalue in an assignment), by default that output will be Pull-ed at the param and lod at which the causational pull occurred. (The causational pull is the pull that caused the node on the left of the assignment operator to re-evaluate and thus request the given output rvalue). We can pull at a specific param and/or lod via the function-call-like format output (param, lad). Given an avar ty, "ty(2.5)" (or "ty.value (2.5)", "ty.out[0](2.5)", "ty (param=2.5)", etc.) references the value of ty at param=2.5. "Surface coarse (mesh (lod=0.5));" creates a Surface node "coarse" from the output of node "mesh" at level-of-detail 0.5.

In addition to its input tabs, every node has an implicit parameter named "comment" that can be used to provide text for the node comment. Avar nodes may have default values (the value the node takes when no animation channels are present) specified via assignment.

```
Avar rx(policy="+",           /* additive policy: see Section 5 of text */
units="degrees",              /* only affects display format in GUI */
comment="rotation about x axis") /* visible in GUI help */
= 30.0;                       /* defaults to 30 degrees */
```

2.1.3 Avars and Parameterized Types

Several node types are in fact templates, and the template type parameter may be defaulted. For example, Avars are a template with default type "scalar". (The type "real" is a synonym for "scalar".) To instantiate an avar with a different type, a C++-like syntax is used:

```
Avar tx, ty, tz;              /* scalar avars */
Avar<scalar> sx, sy, sz;      /* more scalar avars */
Avar<quaternion> rot;         /* quaternion avar */
```

By default, scalar avars default to 0.0 and use an additive layering policy. (Layering policies are described in Section 5). Quaternion avars default to quaternion identity (x,y,z, w=0,0,0,1) and use a multiplicative layering policy. The 0.0 default and additive layering probably are not what we want for scaling avars (e.g., sx,sy,sz above). We can specify a different policy and/or default. The default is inferred from the policy if not specified: additive avars default to a type-appropriate zero and multiplicative avars default to identity.

```
Avar tx;                      /* will default to 0.0, additive policy */
Avar length=1;                /* will default to 1.0, additive policy */
Avar sx(policy="*");          /* will default to 1.0,
                                 multiplicative policy */
Avar<quaternion> rot;         /* will default to identity, multiplicative policy */
```

Implicit in the declaration of an avar is assignment of the global animation clock output to the avar param input. The connection is made via broadcast (i.e., through a transmitter/receiver pair) to reduce clutter in the graph editor. If we do not want the avar to be time-driven, we need to explicitly specify that the param input is nil or is connected to some other output, as shown in Listing 3 below.

We may specify animation for the avar within a scope block ("{ . . . }") following the avar declaration using the format described in Section 2.3. Normally animation for time-variant avars would not be specified within the model itself; however, there are situations in which it is convenient to include "animation" within the model. For example, an avar driven by the u-parameter of a 3D curve might be used to define the profile of an extrusion of that curve. Similarly, an avar could specify one coordinate of the profile curve for a surface-of-revolution. In such cases, we may well wish to include the avar data within our model code. An example showing the use of embedded avar data is given in Listing 3 below.

Other templated node classes include Constant, Compute, Transmitter and Receiver. When the type can be inferred from usage we need not specify it explicitly:

```
Constant name="Fred";        /* <string> is inferred */
Transmitter foo (name);      /* <string> is inferred */
Transmitter<string> bar;     /* can't infer type so it is specified */
bar.input = name;
Receiver recv (bar);         /* <string> is inferred */
```

2.1.4 Assembling Scene Hierarchies

Scene node hierarchies may be built up by enclosing children within a scope block. Transform nodes implicitly scope the nodes beneath them up to the point where the transform itself goes out of scope. Material nodes implicitly chain into an input subgraph above the "material" input tab of subsequent geometry until that material node goes out of scope. Thus:

```
Translate (1,0,0) {
Cube (1,1,1);
}
Sphere (1);
and
{
Translate (1,0,0);
Cube (1,1,1);
}
Sphere (1);
``` both translate the cube, but not the sphere, to the right. Similarly, we can define a simple Box model with animation controls as:

```
Model Box {
Avar tx=0, ty=0, tz=0;
Avar sx(policy="*")=1, sy(policy="*")=1, sz(policy="*")=1;
Avar<quaternion> rot;
Translate(tx,ty,tz);
Rotate(rot);
Scale(sx,sy,sz);
Avar r=1, g=1, b=1, a=1;
Texture("mytex.tiff");
Color(r,g,b);
Cube(1,1,1);
}
```

The cube primitive will be transformed, textured and colored by the statements that precede it. The close of scope at the end of the model ensures that changes to the transformation stack and material chains within model Box will not affect geometry outside of this model.

2.1.5 Expressions and Optimization

Compute nodes may be created explicitly like other nodes or implicitly via an expression. The model program may contain arbitrary expressions as defined in Section 2.2 below, with the one modification that certain "predefined locals" are accessed as parameter-less functions (e.g., "lod( )" and "ctm( )"). Standalone expressions assigned to basic types (int, real, string, etc.) implicitly create a Compute node (except where optimized away, as described below). Assignment of expressions to node inputs may be made with the assignment operator ("="). For example:

```
real a = 3 + 4 * time;       /* create a Compute node named "a" */
Scale s (a+1, sin(2*a), 1);  /* create a Scale node "s" with input
                                expressions */
Avar up_down;
Translate trans;
trans.ty = 2 * up_down;      /* connect edge and set input expression */
```

These expressions and the implied graph structure may be optimized automatically. For example, multiple confluent expressions may be combined into a single Compute node (corresponding to the traditional compiler optimizations of "procedure integration" and "copy propagation"). When possible a standalone expression whose result is used only once will be encoded into the destination node input rather than instantiated as a separate Compute node ("inlining"). Common subexpressions may be merged into a single Compute node or input expression ("common subexpression elimination"). Expressions whose results are not needed are dead-stripped ("dead code elimination") unless their declaration is qualified by the volatile keyword:

```
{
volatile char c = 'a'+1; /* c is unused but will not be stripped */
}
```

The function within an explicitly declared Compute node is specified following an assignment operator ("="), using the expression language described in Section 2.2. Compute input names are scoped within the function definition. For example, we may (re-)define the linear interpolation function for meshes as:

Compute myMeshLerp(real $x$=blend, Mesh $a$=M0, Mesh $b$=M1)=(1−$x$)*$a$+$x$*$b$;

As $x$ goes from 0 to 1, myMeshLerp.out will linearly blend from M0 to M1. (We define mesh-scalar multiplication as a scaling of the vector distance of mesh vertices from the local origin.) Specifying type names here is optional. We can define a more general lerp (behaving identically to the built-in lerp function) as:

Compute myLerp($x$=, $a$=, $b$=)=(1−$x$)*$a$+$x$*$b$;

We specify "$x$=" (shorthand for "$x$=nil") to indicate that "$x$" is the first input to myLerp, rather than the name of a referenced output of some other node. The above statement will create a Compute node with three disconnected inputs named "$x$", "$a$" and "$b$". Input and output edge connections to this node are legal to the extent that the data types along those edges yield a legal expression. For example, passing (scalar,scalar,scalar) and (scalar,mesh,mesh) are both valid because the resulting expressions are valid. However, passing (mesh,scalar,scalar) will produce an error because mesh-scalar subtraction (the "1−$x$" above) is undefined.

2.1.6 Macros

We may define a macro by providing the macro body following the macro declaration:

Macro DoSomething(real $p$, matrix|quaternion $q$, $r$=)
{ ... }

Here parameters q and r are declared as polymorphic: q may be connected to matrix- or quaternion-valued outputs, while r may be connected to an output of any type, provided that type is compatible with the usage of r within the macro body. A macro may not be used in code before it is defined. Forward declarations of macros are not allowed.

In the graph editor, macros appear as encapsulated nodes. The outputs and inputs of a macro node correspond to specific outputs and unconnected inputs of nodes within the macro, so-called public outputs and inputs. These public tabs are declared by identifying particular inputs and outputs as "public" within a node declaration or by issuing export statements. Exported tabs can be renamed via the "export as" construct. For example:

```
Macro ColoredCubeAndSphere {
  Color (public r=, public g=, public b=);
  Group g {
    Cube (1,1,1);
    Sphere s;
  }
  export s.radius as sphereRadius;
  export g.ctm__in, g.ctm__out;
}
``` creates a macro with r, g, b, sphereRadius and ctm_in inputs and a ctm_out output.

The first output of a node may exported by declaring the node itself as public. In the above example, we could have declared group g as "public Group g . . . " rather than explicitly exporting g.ctm_out.

2.1.7 Naming Conventions

We may refer to node and node-component names by absolute or relative path. Relative path names begin with "." or ". .", to distinguish them from expressions involving division.

```
Model A {
  real x = 4;
  Part B {
    real x = 3;
    real y = ../x;          /* refers to /A/x */
    real z = x;             /* refers to /A/B/x */
  }
  Scale(x,1,1);             /* refers to /A/x */
  Translate(./B/x,0,0);     /* refers to /A/B/x */
}
Model C {
  Translate(/A/B/y,0,0); /* inter-model reference, error if A is not loaded */
}
```

2.1.8 Conditional and Iterative Unrolling

Conditional unrolling of model code may be specified via the preprocessor directives #if, #elif, #else and #endif. These conditions will be evaluated, and selected branches followed, exactly once, at unroll time (i.e., during initial parsing).

Iterative for and while loops are unrolled at graph construction time, thus these routines do not themselves give rise to iterative or recursive graph structures. For example:

```
for (i=1; i<=5; i++)

Avar make_symbol("v"+itoa(i));
``` creates five Avar nodes named "v1", "v2", "v3", "v4" and "v5". Note the use of the Lisp-like make_symbol to generate symbol names procedurally. These generated symbols may be used like any other name, for example, we could now write "Scale s(v1,v2 ,v3);".

2.1.9 Conditional Execution

Conditional graph evaluation may be introduced through conditional expressions (i.e., those containing "cond?a:b") or by instantiating graph structures involving conditional flow (i.e., switches, attaches and IK solvers, as described in Section 1.17). Switches may implicitly be created through the if-then-else language construct, for example:

```
if (drawSphere == 1)
  Sphere (5);
else
  Cube (3,3,3);
``` which is equivalent to:

```
Switch ___if0 (nil, drawSphere == 1);
Cube (___if0.out__0, 3,3,3);
Sphere (___if0.out__1, 5);
``` where the name "_if0" is generated automatically. The conditional "drawSphere=1" evaluates to one when true and zero when false. The corresponding expression graph is:

The underlined "value" input tab indicates it has an input expression ("drawSphere=1"). A multi-way switch is built by adding additional outputs to the Switch node and providing a multi-valued input expression (possibly via a separate Compute node).

2.1.10 Iteration and Recursion

Iterative and recursive graph structures may be created by connecting node outputs to inputs in order to form a cyclic subgraph. For example:

```
/* create Compute node with one input "x", expressing the function "out = x" */
Compute Fibonacci(real x) = x;
/* connect Fibonacci output to its own "x" input using the given input expression */
Fibonacci.x = t==0  ? 0 : t==1 ? 1
: Fibonacci(t-2) + Fibonacci(t-1).
```

Thus "Fibonacci(3)" yields the value 2, "Fibonacci(4)" yields 3, and so forth. Referring simply to "Fibonacci" with no explicit parameter yields the Fibonacci number for the implicitly pulled parameter, which only has meaning in the context of the surrounding graph. The scoping rules of the language are such that a node is declared as soon as its name has been provided, even though the declaration statement has not yet been closed by a trailing semicolon.

Thus, we could express Fibonacci simply as:

```
real Fibonacci = t==0  ? 0 : t==1 ? 1
: Fibonacci(t-2) + Fibonacci(t-1).
```

Here we provide the function as the body of the Compute rather than as an input expression. Note that although Fibonacci is declared as a real, it can be called as a function of (param,lod) and in fact it will return different values for different parameters because its expression depends on the Pull parameter t. As mentioned above, all outputs may be used as functions, but they will only return a value that varies with the function parameter if the variable definition references t, either directly, or indirectly through a time- (or more generally, parameter-) varying input. The graph generated by the above statement is shown in FIG. 6.

As mentioned previously, in part due to its ability to represent graph structures involving iteration and recursion, the modeling language, and the graph evaluation system itself, is Turing-complete, allowing specification of any computation or algorithm that could be expressed in a general purpose programming language such as C.

Listing 1 below gives a more complex example of modeling language usage. Listing 1 describes building a desk lamp.

Listing 1

```
#includeonce "global/lighting.m"
Macro StandardModelTransforms
{
    Avar tx=0, ty=0, tz=0;
    Avar sx (policy="*")=1, sy (policy="*")=1, sz (policy="*")=1;
    Avar<quaternion> rot;
    Translation trans (tx,ty,tz);
    Scaling scale (sx,sy,sz);
    public matrix xf_out = trans * rot * scale;
}
Model Lamp ( )
{
    StandardModelTransforms xf;
    Joint rootJoint (xf);
    Avar r=1, g=0, b=0;
    Material metal (diffuse = (r,g,b), specular = (r,g,b), shine = 50);
    Part Base {
        Mesh mesh ("Base.obj");
        Surf baseSurface (mesh, metal);
    }
    Part Arm {
        Joint j0 {
            Bone b0 {
                Joint j1 {
                    Bone b1 {
                        Part Head
                        {
                            Avar kind (comment="0 = pointlight, 1 = spotlight") = 1;
                            Avar radius=0.25;
                            Avar r=1, g=1, b=1, intensity=30;
                            real c[3] = (intensity * r, intensity * g, intensity * b);
                            if (kind == 1) {
                                Avar coneAngle (units="degrees") = 30;
                                Cone (radius*2, radius*1.5);    /* draw housing */
                                Spotlight (radius, coneAngle, color=c);
                            } else
                                Pointlight (color=c);
                            Color (r,g,b);
                            Sphere (radius);                    /* draw bulb */
                        }
                    }
                }
            }
        }
    }
    Mesh mesh ("Lamp.obj");
    SkeletalDeformer deform (mesh, j0);
    Surface armSurface (deform, metal);
}
```

2.2 Expression Language

The language we provide for entering mathematical expressions into node inputs uses standard infix mathematical notation. The input will take on the value of the expression after suitable variable substitutions. No assignment operator ("=") is necessary (or allowed) within the expression. Local-node inputs and global broadcasts (Section 1.16) may be referenced by name, and there are a number of pre-defined global and local variables, constants and a rich set of functions, most of which are listed in Table 1 below. Expressions are parsed and evaluated by an public off-the-shelf POEM (Parse Once, Evaluate Many) parser engine that applies aggressive optimization to the parsed expressions, providing fast evaluation speed approaching that of compiled code.

TABLE 1

Example Predefined Globals, Locals, Constants and Functions.

| | Name | Value |
|---|---|---|
| Globals | Time | global animation clock |
| | starttime | shot start time |
| | endtime | shot end time |
| | fps | shot frames per second |
| | systemdate, systemtime | wall-clock date and time |
| | <bcast_name> or bcast[<name>] | named broadcast |
| | $SHOT, $SEG, $PROJ, $USER, $DEPT, $HOST | program/system environment vars |
| Predefined Locals | name | local node name |
| | path | absolute path to local node |
| | <input_name> or in[<name>] | named input to local node |
| | in[i] | i-th input to local node (zero-based) |
| | numInputs | number of input tabs |
| | param or t | pulled parameter value |
| | lod.geom, lod.artic, lod.light, . . . | effective levels-of-detail |
| | priority, cost | local performance params (see text) |
| | ctm | concatenated transformation matrix (only defined for scene graph nodes) |
| Constants | pi | $\pi = 3.14159\ldots$ |
| | e | $e = 2.71828\ldots$ |
| | <type>::zero | type-specific zero value |
| | <type>::identity | type-specific identity value |

TABLE 1-continued

Example Predefined Globals, Locals, Constants and Functions.

| Name | | Value |
|---|---|---|
| Operators | +, −, *, /, %, ^, ~, !, &, \|, <, <=, >, >=, ==, !=, &&, \|\|, <<, >> | standard infix operators |
| Functions | exp, log, log10, log(b, x) | exponentials and logarithms |
| | sin, cos, tan, sec, csc, cot, asin, acos, atan, atan2, | trigonometric and hyberbolic |
| | asec, acsc, acot, sinh, cosh, tanh, sech, csch, | transcendental functions |
| | coth, asinh, acosh, atanh, asech, acsch, acoth | |
| | sqrt, pow(x, y) | square root and power |
| | min, max, floor, ceil, round, abs, sign, fmod | numerical functions |
| | srand, rand | pseudorandom numbers |
| | noise1D, noise2D, noise3D | Perlin noise |
| | binomial(n, m) | binomial coefficient |
| | lerp, bilerp, slerp, smoothstep | interpolation |
| | cond ? a:b | binary conditional |
| | <expr>.Derivative(n) | n-th time-derivative of given input |
| | <expr>.PartialDerivative(n, v) | n-th derivative with respect to v |
| | <expr>.Integral(a, b) | definite integral over interval [a, b] |

In addition to what is shown in the table, we provide functions for basic character and string manipulations; operators for array, mesh and matrix indexing; basic matrix and quaternion functions and operators, and so forth.

2.3 Animation Language

In Section 1.18.1, we described our use of avars, or articulated variables, to provide time- (or more generally, parameter-) varying values within our expression graph. In Section 5, we describe the layered representation of avar data and detail the process by which layers are combined to produce an articulated output value. We also describe, in Section 5.2, the taxonomy of avar motion channels, identifying kinematic channels as those involving the splined animation typically created by a human animator. Because of its suitability to interactive specification and modification, kinematic animation is in many ways the most important layer class within our system. Here we describe the text-based language used to specify kinematic data. Other layer classes are specified via tab-delimited tables (sampled layers), function pointers (procedural layers), parameters values (stochastic layers), or through the combination of parameter values and boundary values specified in lower-numbered motion channels (forward-dynamic and multi-point-dynamic layers).

Following common practice, our kinematic data consists of knots along parameterized one-dimensional curves or splines: each kinematic motion channel has one spline. Each knot specifies the value the spline takes at a particular parameter and possibly some additional information about the curve shape to either side of the knot. The spline is interpolated between knots. The data stored at a knot, and the algorithm used for interpolation between knots, depends on the knot type. We provide several knot types commonly used in prior systems, including stepped, linear, Bezier, Hermite, b-spline, cardinal, TCB and tau. For Bezier and Hermite knots, we provide left- and right-tangent handles that indicate the left and right derivatives at the knot. Interpolating a spline segment between knots of dissimilar type involves a two-step interpolation: first we interpolate the segment twice, once as each spline type; then we interpolate between these two splines.

The information we provide in specifying channel data includes: the path to the avar, the layer in which the channel resides, the curve parameter at which each knot occurs, the value of each knot and any knot-type-specific parameters (per knot). The parameters for each knot type are given in Table 2 below. We may optionally also specify the layer set (Section 5.4) to which the layer belongs.

TABLE 2

Knot Types and Associated Parameters

| Knot Type | Code | Parameter List |
|---|---|---|
| Stepped | D | empty |
| Linear | L | empty |
| Bezier | B | Left- and right-handle length and derivative |
| Hermite | H | Left- and right-handle length and derivative |
| B-spline | S | empty |
| Cardinal | C | tension (tension = 0.5 yields Catmull-Rom) |
| TCB | T | tension, continuity, bias (Kochanek-Bartels) |
| Tau | U | tension, continuity. |

Statements within an animation file define the scope of a particular avar, select which layer is being referenced, or provide the actual knot data. The format is a subset of that described in Section 2.1, with the additions of a "Layer layername" statement for scoping by layer and knot statements of the form "u: knot-code value parameter-list". Layers and scene hierarchy are scoped independently, that is, "Layer C {Model M {Avar tx { ... }}}" is equivalent to "Model M {Layer C {Avar tx { ... }}}", "Model M {Avar tx {Layer C { ... }}}", "Avar /M/tx {Layer C { ... }}", and so forth. An example kinematic animation data file is shown below in Listing 2. More particularly, Listing 2 is for kinematic motion channels for five avars; "/Greg/LArm/wristRot" is a quaternion-valued avar (with an extra "spin" parameter at the end of each knot statement), the others are scalar-valued.

Listing 2

```
/* Reflex cuesheet version 0.3
 * Auto-generated by Reflex dev build Jul 16 2003 18:23:58
 * User mjo on 7/21/03 at 12:20 PM
 *
 * File: /Users/mjo/shots/Dive.cue
 */
Layer "Up-down arc" {
    Model Greg {
        Part LArm {
            Avar ikGoal_tx {
                30: B −0.0203 0.05 0.05 0 0
                47: L 0.0142
                56: L 0.2506
            }
```

-continued

Listing 2

```
        Avar ikGoal_ty {
            30: B -0.0275 0.05 0.0801 0.12 0.12
            47: B 0.4219 0.082 0.3912 0.1511 0.1511
            56: B 0.1812 0.151 0.151 0.0021 0.0021
        }
        Avar ikGoal_tz {
            30: B 0.1243 0.05 0.05 0.91 0.91
            47: B 0.0903 0.11 0.11 0.1491 .125
            56: B 0.113 0.051 0.051 0.08 0.08
        }
        Avar wristRot {
            12: B (0.623, 0.681, 0.2, 0.29) (0,0,0,1) (0,0,0,1) 0.1,
            0.05, 0
            37: B (0.7799, 0.54, 0.253, 0.18) (0,0,0,1) (0,0,0,1)
            0.05 0.01 0
            84: L (0.578, 0.6356, 0.4459, 0.2512) 0
        }
    }
    Avar tz {
        43: B 0 0.05 0.05 0 0
        55: B 2.3851 0.4622 0.3395 0 0
        63: B 0.4347 0.01 0.05 0 0
        64: B 0.5303 0.05 0.05 0 0
        66: B 0.1788 0.05 0.05 0 0
        71: B 0.3649 0.05 0.05 0 0
    }
}
}
/* END OF CUE DATA */
```

As mentioned in Section 2.1.3, the animation specification syntax described above is not properly a distinct language from the modeling language of Section 2.1. In fact, animation may be specified within or alongside general model code by scoping layers and associated knot lists within Avar node declarations, as shown in Listing 3 below.

Listing 3

```
#includeonce "std defs.m"
Model Bottle
{
    StandardModelTransforms xf;
    Joint rootJoint (xf);
    /* Specify bottle radii at various u's: u=0 at bottom, u=1 at top.
     * Note this restricts us to a shape that does not bend back on
     * itself. A better shape could be had by using a point-valued
     * avar and from that driving the Revolve node directly.
     *
     * We pass param=nil so the avar is not time-driven.
     */
    Avar radii (param=nil) {
        Layer "Construction" {
            /* u: knot-type value params */
            0.000 B 0.00 0.05 0.05 0.0 0.0
            0.010 B 3.97 0.05 0.05 0.0 0.0
            0.070 B 4.00 0.05 0.05 0.0 0.0
            0.400 B 4.00 0.05 0.05 0.0 0.0
            0.750 B 2.50 0.05 0.05 0.0 0.0
            0 930 B 2.20 0.05 0.05 0.0 0.0
            0 940 B 2.25 0.05 0.05 0.0 0.0
            0.990 B 2.25 0.05 0.05 0.0 0.0
            1.000 B 0.00 0.05 0.05 0.0 0.0
        }
    }
    /* Build mesh surface-of-revolution. */
    real height=10;
    Curve3D profile (umin=0, umax=1, x=radii, y=u*height, z=0);
    Revolve revolve (profile, 'y');
    /* Generate surface from mesh. */
    Material ("glass");
    Surface (revolve);
}
```

3. Ghosts

In addition to the normal rendering of geometry described in Section 1.10, we optionally draw geometry as it would be posed at alternate times t, or with alternate animation variable settings, translucently into the scene as ghosted geometry. Normally only the "active" model (the model containing the active node) is drawn ghosted, however the user may override this by specifying particular geometry to include in the ghosted renders.

The user may specify one or more arbitrary times at which to draw a ghost. Ghosts may be drawn at regular intervals in time, for example: "on 24's", that is, once-per-second for a 24-frames-per-second (fps) animation, as shown in FIG. 8*b*. Ghosts may be drawn at "knots", or keyframed values, in the animation (Section 4, FIG. 8*a*). Ghosts may be drawn at designated "key poses" as defined by user-specified time markers associated with sections of geometry. Ghosts may be drawn at a particular motion path knot during interactive manipulation of that knot (Section 4, FIG. 8*c*). In some implementations, the user may set a preference to have such manipulation ghosts shown (1) never, (2) momentarily during interactive manipulation, or (3) always when one or more path knots are selected. Other preferences are possible. Several consecutive ghosts may be drawn during adjustment of knot interpolation rates, such as while the user is dragging frame-timing beads along the motion path or manipulating path knot tangent handles (Section 4.2.4). Rendering ghosts at alternative times is accomplished by performing a Render pass over the specified nodes after (1) setting the global animation clock to the ghost time, and (2) rendering the ghosts using a non-opaque color (alpha<1.0) with OpenGL or equivalent blending.

Ghosts may be shown to assist in comparing alternative animation, specifically with differing sets of enabled layers (Section 5). We can do this by rendering the scene once normally, then adjusting which layers are enabled, and then rendering the ghosted nodes a second time. Because changing enabled layers invalidates the affected portion of our expression graph, the ghosted nodes will be rendered under the alternative layer setup.

User controls over ghost rendering include: ghost opacity ("alpha"), illumination mode (whether to perform per-vertex lighting computations or use constant shading), fade rate (ghosts may fade in opacity away from the current time, as shown in FIG. 8*b*), and draw style (ghosts may be drawn as surfaces or "stick-figure" skeletons). A special "Doppler shift" mode colors ghosts at times earlier than the current time differently than ghosts later than the current time (blue-tinted and red-tinted, respectively, in our implementation). Finally, the user may choose whether or not ghosted geometry is selectable via the mouse cursor. By default it is not selectable, and clicks on ghosts have the same effect as they would if the ghost was not there, for example, they will select opaque geometry drawn behind the ghost.

Figure 9A:
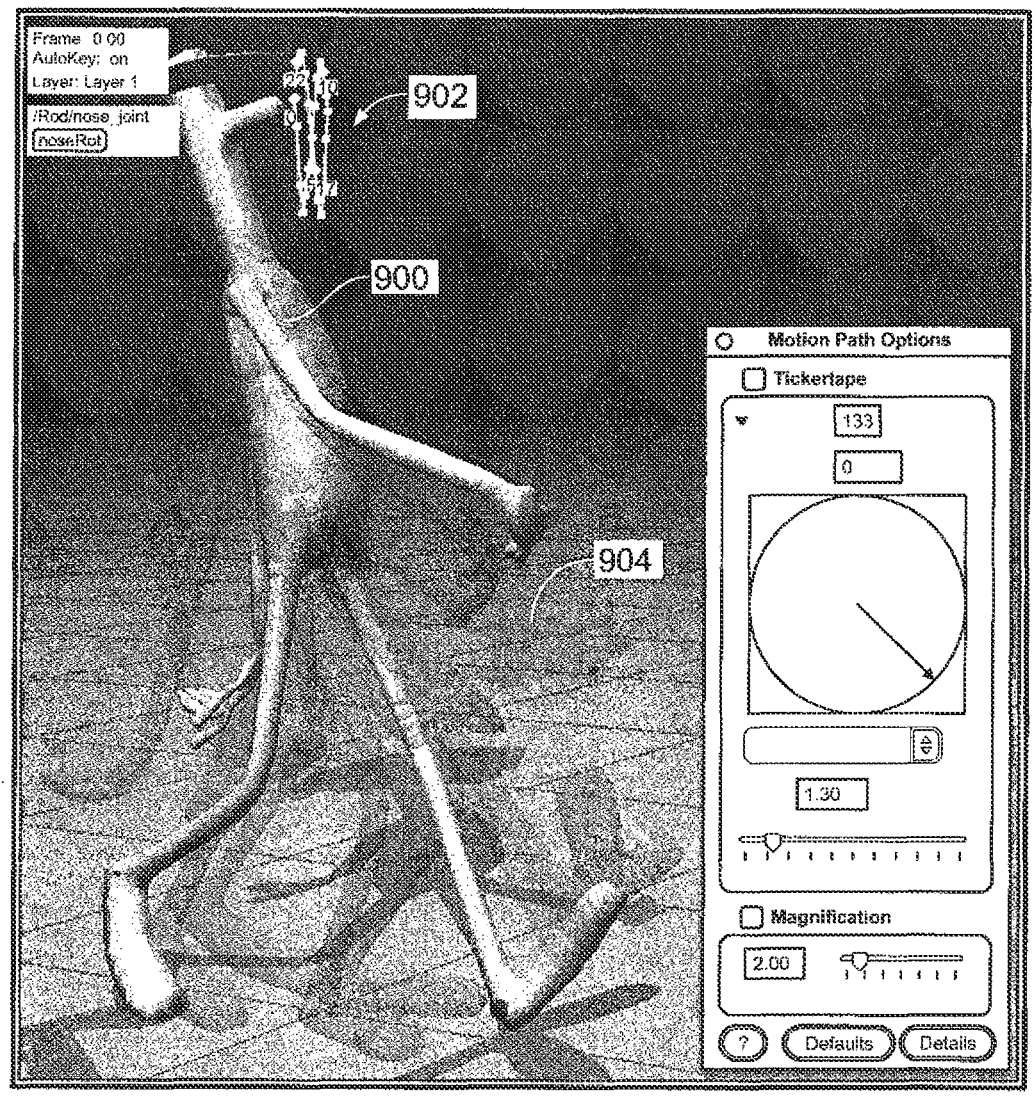
FIGS. 9a-9c are screenshots illustrating a character walking in place.
Figure 9B:
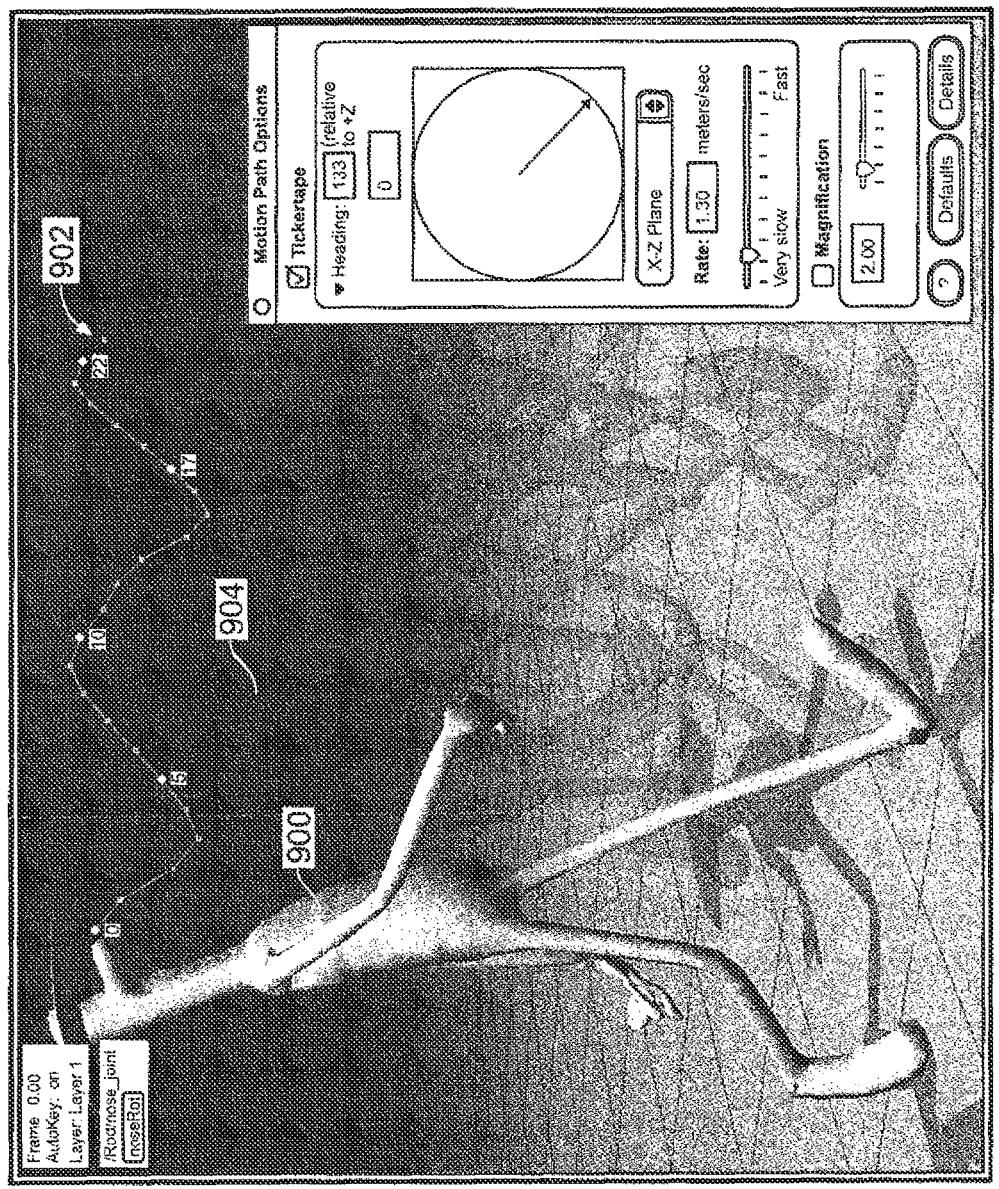
Figure 9C:
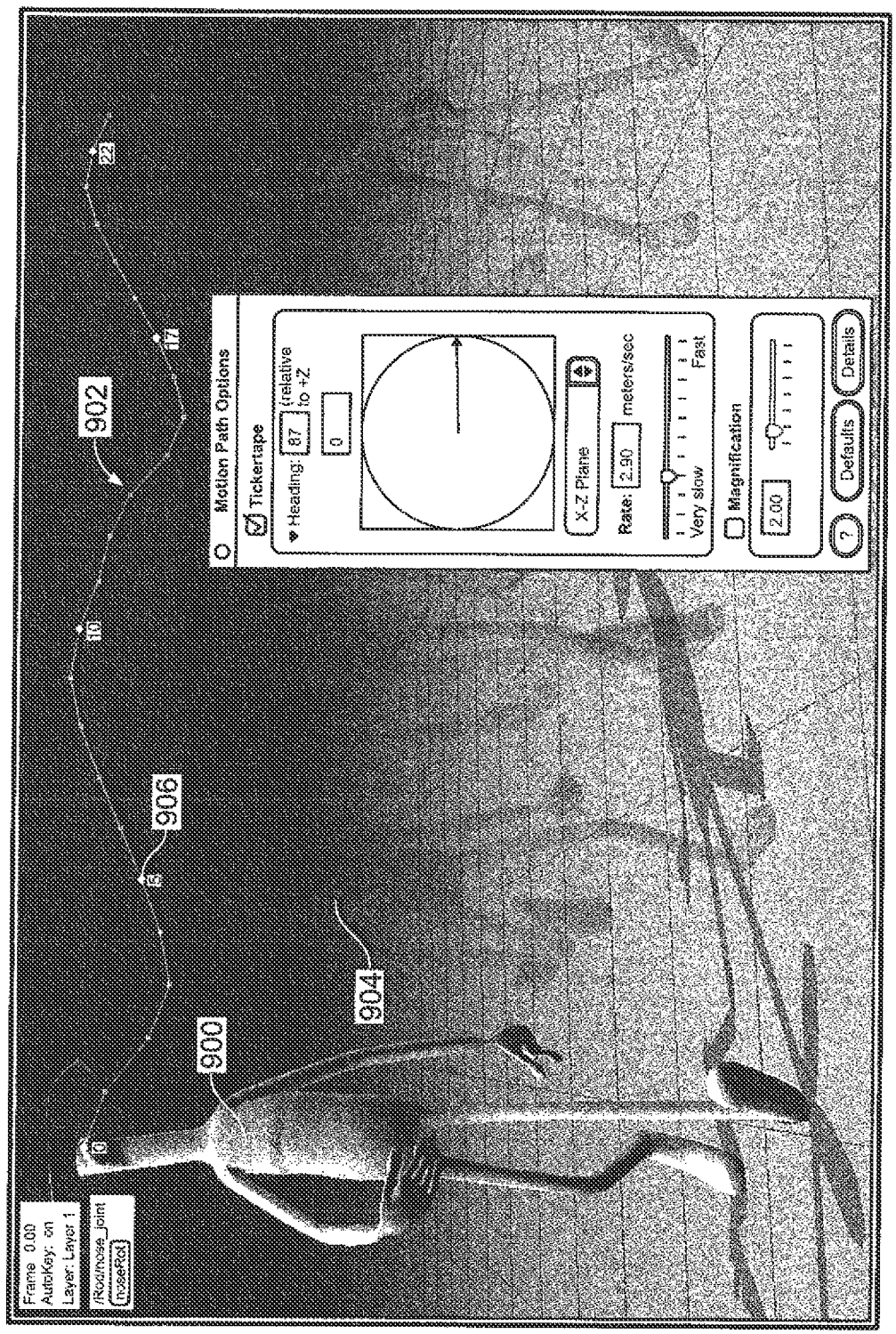

Ghost rendering follows any distortions of the motion path as described in Section 4.1.2 and shown in FIGS. 9*a*-9*c*. This is accomplished simply by pre-multiplying the ghost concatenated transform matrix (CTM) by the path distortion transforms in Section 4. Our ability to rapidly render ghosts across multiple animation times and layer settings is enabled by the temporal caching scheme described in Section 1.

4. Motion Paths

In this Section, we describe the use of motion paths for visualizing and controlling the movement of articulated and deformable bodies. A number of animation systems today are able to display a curve through 3D space indicating the path followed by an object moving through that space. We refer to such a space curve as a motion path. Some of these systems also provide user control over the motion path by allowing the user to directly manipulate the shape of the path, for example, via control points on the path. This effectively lets the user specify translation, and possibly rotation, of an entire object traveling through space by manipulating the path of the object directly. Unlike previous systems, we extend this motion path representation by providing control of articulated bodies and deformable surfaces, allowing not only the path of the whole object to be viewed and manipulated, but allowing changes in the shape of the object itself to be viewed and manipulated (FIGS. 8a-8c and 9a-9c).

Some notable features of our technique are that it is very fast due to temporal caching; it is flexible enough to control any type of motion, including rotation, translation, and scaling of and within articulated bodies, surface deformations, and global deformations; and the reference point through which the motion path is drawn, and to which refers user manipulation of the path, may be any point on or relative to the surface.

4.1 Visualization 4.1.1 Path Shape

Our technique for implementing motion paths relies on temporal caching within our expression graph (refer to Section 1). A user may specify any reference point on any surface in the 3D scene by a number of means (for example, by clicking directly on that surface while depressing a designated key on the keyboard). To draw a motion path indicating where that reference point on the surface moves through space over time, we compute where in world-space (i.e. global) coordinates that point is across some series of discreet sample times, and connect these points with line segments. We render these line segments as a connected polyline, giving the appearance of a curve through space. Note that we define "curve" herein to include straight line segments. Varying the spacing between time samples allows us to produce a smooth curve without unnecessary detail; the adaptive method for computing this spacing is described below. What remains is to describe how we compute the 3D position of the reference point at any given time. For simplicity we describe this assuming the reference point lies on the surface; note however that the reference point could as easily lie off the surface: all that may be required is that we know its position relative to the local surface coordinate system.

The position of any point on a surface is governed by the cumulative effect of a series of mathematical operations defined by our expression graph. We distinguish here two classes of cumulative effect: (1) rigid and (2) non-rigid (refer to Section 1.10). In the first case of concatenated rigid transformations, the position of the reference point $P_{ref}$ may be represented as a 3D point $P_{local}$ in the pre-transform (local or body) coordinate system of the surface containing that point. The local coordinate system itself is defined by the 4×4 Concatenated Transformation Matrix (CTM) $C_{surf}$ with which the surface is drawn. Computing the reference point position at any time t involves transforming $P_{local}$ by the value of $C_{surf}$ at t. $C_{surf}(t)$ is available to the surface node at its CTM input (refer to Sections 1.9 and 1.18). We automatically enable temporal caching of the CTM for a surface through which we are drawing a motion path (refer to Section 1.5). Thus we approximate the world-space position at time t of a reference point lying on a surface as:

$$P_{ref}(t)=C_{surf}(t)P_{local}\approx\psi_{M(t)}P_{local}$$

where ψ this the cache lookup operator for the expression node output connected to the CTM input of the surface.

In the second case of point motion governed by non-rigid deformations, we are faced with one of three alternatives. First, we may regard the deformations as being "nearly rigid", and compute the point motion as above. Second, if we desire an accurate representation of the motion under a surface deformation, we apply the deformation to the reference points. Let $D_{surf}$ be the time-varying function that maps points to their position under the surface deformation, then:

$$P_{ref}(t)=C_{surf}(t)D_{surf}(t,P_{local})\approx\psi_{M(t)}D_{surf}(t,P_{local}).$$

Finally, if we represent the motion of a point under a global, rather than surface-relative, deformation, we pass transformed points through the corresponding $D_{global}$ function:

$$P_{ref}(t)=D_{global}(t,C_{surf}(t)P_{local})\approx D_{global}(t,\psi_{M(t)}P_{local}).$$

For complex motion involving a mixture of rigid transformation, surface deformation and global deformation, we may combine these operations as needed.

The motion path polyline itself is represented in our expression graph as a MotionPath node (a subclass of the Glyph node type, see Section 1.18), which has among its inputs the object or surface to which the reference point belongs as well as the surface-relative position of that point. Thus we only recompute the motion path as necessary by changes in the reference point position (due to the user specifying a new reference point) or by changes to the transformations and deformations affecting the surface (due to user changes to the underlying animation).

4.1.2 Path Display Alternatives

In complex scenes the motion path can become difficult to see and understand clearly. This is particularly true when the path is tightly bunched: it may begin to resemble a ball of yarn. We have several options available for improving the display of the path in such circumstances.

When fine detail of the path is difficult to discern, the user may enable path dilation (also referred to as path magnification). This enlarges, or dilates, the path about some reference point in space. We accomplish this by translating the points of the path polyline so the dilation center sits at the origin, scaling the points by a user-specified dilation factor, and then translating them back:

$$P_{dilated}(t)=T^{-1}STC_{surf}(t)P_{local}\approx T^{-1}ST\psi_{M(t)}P_{local}$$

where T is the transformation that translates the dilation center to the origin, and S scales uniformly by the dilation factor. By default we wish the path to still pass through the target surface at the current frame, for which we provide a default mode in which the path target point is the dilation center. In this mode, when we play the animation and the target point moves in world space, the path will move with it since the dilation remains centered about the target point.

When the path becomes difficult to follow because it doubles back over itself repeatedly (the ball-of-yarn problem), the user may enable the path tickertape option (see FIGS. 9a-9c and 10a-10b). This has the effect of stretching the motion path out in time within the 3D world space by mapping time to a 3D vector in that space. The direction of the vector controls the direction in which we stretch the path, and the magnitude of the vector controls how much the path is stretched. To draw the path in this mode, we translate each point in world-space by the tickertaping vector V scaled by an amount that increases with t:

$$P_{tickertape}(t) = (t-t_{now})V + C_{surf}(t)P_{local} \approx (t-t_{now})V + \psi_{M(t)}$$
$$P_{local}.$$

Note that the path sample point at $t=t_{now}$ is unaffected by tickertaping; therefore the path continues to pass through the target surface/target point at the current frame, and when the animation is played the path will seemingly flow through space in the direction opposite the tickertaping vector so as to keep the path correctly positioned on a moving target surface (FIGS. 10a and 10b).

Figure 7C:
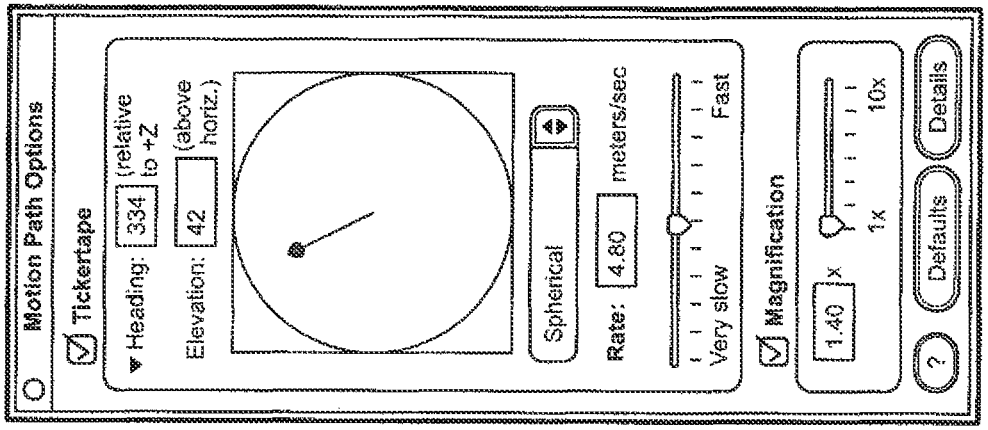
FIGS. 7a-7c are screenshots of exemplary manipulators for controlling dilation and tickertape.
Figure 7B:
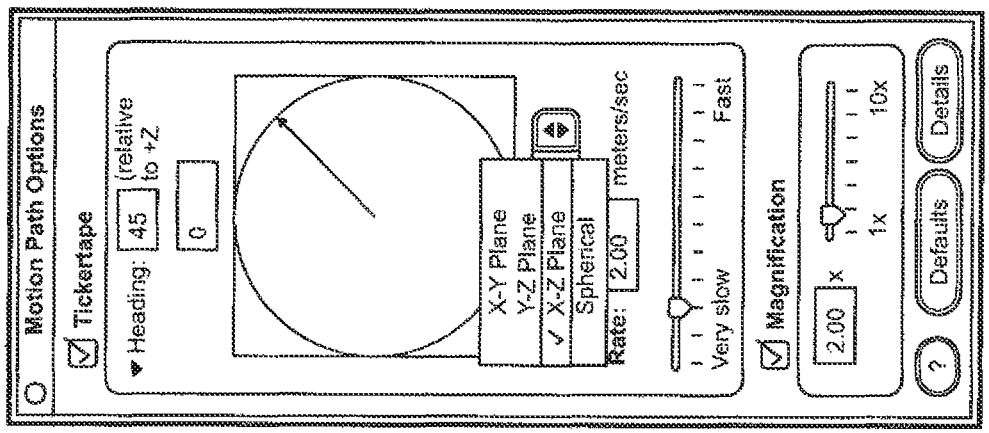
Figure 7A:
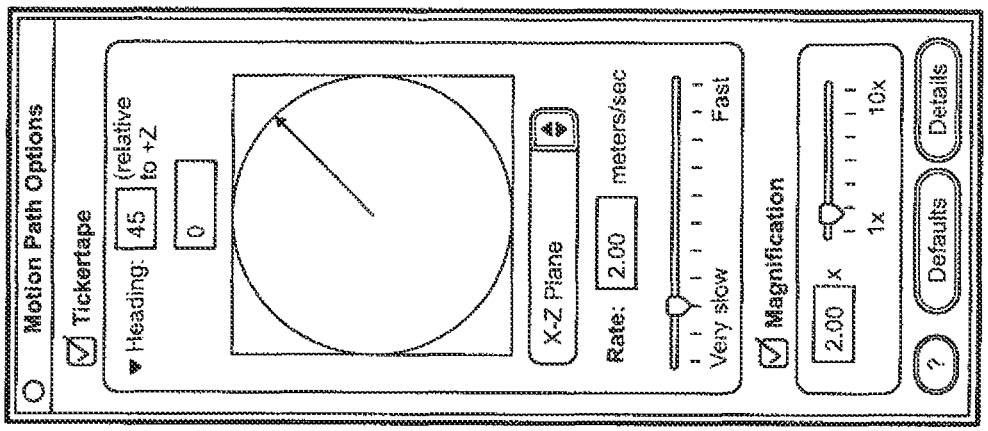

FIGS. 7a-7c are screenshots illustrating manipulators for controlling dilation and tickertape. Sometimes motion higher up an articulated hierarchy makes it difficult to visualize movement at the level in which we are interested. For example, we wish to view the path of the left arm swing of a character as the character walks across the screen. The path will travel across the screen due to the motion of the character; however, we may wish to see the path of the arm swing in isolation, without the effect of the cross-screen movement. We allow the user to specify any reference node relative to which to draw the path. In this example, the user might choose to draw the path relative to the left shoulder joint or to the root joint (e.g., the hips) of the character. We implement this by transforming path sample points into the coordinate space of the reference node before plotting the path polyline:

$$P_{relative}(t) = C_{reference}^{-1}(t) C_{surf}(t)$$
$$P_{local} \approx \psi_{reference,M(t)}^{-1} \psi_{surf,M(t)} P_{local}$$

in the case of rigid-body transformations, and we make an analogous extension for the non-rigid cases. Here we will cache the inverse CTM of the reference surface $C_{reference}^{-1}$, and $\psi_{reference}^{-1}$ is the corresponding cache lookup operator. Note that this does not limit us to reference nodes in the scene hierarchy above the motion path target surface; the path may be drawn relative to any node in the 3D scene. If we specify the path be drawn relative to the target surface itself, the displayed path will show the motion due only to deformations of that surface.

One particularly useful application of this is to draw the path relative to the camera when the camera we are looking through is moving. This causes the path to indicate how the target point moves within the camera view, rather than through world space. This is useful both for animated "shot" cameras and for attached "detail" cameras that move with the target surface, and we provide hotkeys for enabling these modes.

To improve visibility of the path over different-colored backgrounds, and to help in distinguishing among multiple paths, the user may specify a color for the path. The user may also choose to have the path drawn in two alternating colors (colorstriping), with the color changing over some interval of t (time-striping, FIG. 8b), or at every knot (see Section 4.1.3 below), or at user specified markers (also referred to as poses). The user may alternatively choose to enable the Doppler shift mode, where the section of the path over samples preceding $t_{now}$ is drawn in one color and the section following $t_{now}$ is drawn in a different color. Or the user may elect to have the path fade out at sample points progressively farther in time from $t_{now}$ in the same way ghosts may be faded in and out through time (Section 3, FIG. 8b).

Sometimes it may be difficult to see the path because it is obscured by foreground geometry. The path bleed-through mode causes the path polyline to show through obscuring objects as though they were translucent (FIG. 8a). We accomplish this by rendering the path twice, first fully opaque (that is, with "alpha" or opacity=1.0) with depth culling enabled, then a second time translucently (that is, with a user-specified opacity<1.0) after all other scene geometry has been drawn.

4.1.3 Path Decorations

In addition to the polyline of the path itself, we display several other pieces of information along the motion path. At sample points that fall on integral (whole number) frames, we optionally draw a small blue mark or bead (FIG. 8a). This gives an indication of the rate of movement over a section of the path: where frame beads are drawn close together, the motion will be slow; where the beads are far apart, the motion will be fast. The user can click and drag with the mouse cursor on these beads to adjust interpolation rates (Section 4.2). This provides visualization and control over the traditional animation concepts of ease-in and ease-out.

The user may click on frame beads or drag a selection box around those beads with the mouse cursor to select parameter values, for example, to select the corresponding shot times when the avar input parameter t is time. Subsequent program commands involving time will operate on the selected times. Selecting two or more contiguous frame beads selects a continuous parameter range. For example, the user may select a time range and then choose Copy from the application menus; this will copy animation of the active nodes within the selected time range. This animation may be subsequently pasted over a different time range or on a different group of geometry.

At sample points that fall on times at which active avars have knots (Sections 1.18.1 and 2.3) we draw a yellow diamond shape (FIG. 8a). This indicates the timing and value of animation keys. Timing is indicated both by the position of the knot along the path and explicitly by displaying next to the knot the frame number at which the knot occurs. Value is indicated by the position of the knot in 3D space and, for selected knots only, optionally explicitly by displaying next to the knot the numerical value(s) specified in the associated avar(s). Only knots for unlocked degrees of freedom within the model are shown. For example, when performing an axis-constrained manipulation (e.g., dragging on an axis-constraint handle of a manipulator widget or holding down an axis-constraint hotkey), only knots for the unconstrained avars are displayed on the motion path. The user can click and drag with the mouse cursor on a knot to adjust the knot value or timing (Section 4.2). We optionally display a text label next to the motion path knot indicating the names of the underlying avars possessing knots at that knot time (along with numerical values for those avars, as described above).

Knots that result in changes to the effective graph topology (for example, knots that enable or disable inverse kinematics, attaches, or hierarchy inversions, or that change graph switch-node settings) display on the motion path as a yellow diamond with a yellow line outline.

The user may select a knot on the motion path (e.g., by clicking on the knot with the mouse cursor or by dragging a selection rectangle over the knot). Selected motion-path knots that represent non-linear knots in the underlying avars will display path-tangency handles. The length and direction of these handles reflect the tangent-handle settings for the underlying avar knots, and direct-manipulating these path handles will modify the avar knot handles and thereby the motion path shape (Section 4.2). We compute the length and direction of the motion path handles by differentiating the motion path curve at the knot (Section 1.14). When one or more of the underlying avar knots has broken tangent handles (Sections 1.19.1 and 2.3), we draw the motion path knot as an orange, rather than yellow, diamond shape (FIGS. 8a-8c), and the path knot handles will themselves be drawn and behave in a "broken" fashion, that is, the left and right handles will be independent.

When tangent handles are drawn, we optionally display a rotation twist indicator on the local-coordinate-system +Z axis-line extending to the knot that indicates the direction of a perpendicular axis (e.g., +X or +Y); this allows visualization of how the articulation twists along its central (i.e., Z-) axis. The twist indicator can be used as a direct-manipulator to control interpolation of axial twist between motion path knots (Section 4.2.4).

On the tangent handles themselves we optionally display a sliding hashmark that indicates the rate at which the motion approaches (for the left handle) and departs (right handle) the path knot. The farther the marker is up the handle away from the knot, the faster the motion will move; these marks can be direct-manipulated via the mouse cursor to slide them up and down the handle and thereby control the motion rate (Section 4.2). This provides interpolation-rate visualization and control of ease-in and ease-out analogous to that provided by the frame-bead spacing described above. The user is free to have multiple paths drawn, each through a different piece of geometry or through a different target point on the same geometry. These multiple paths may be distinguished by setting each to a different color and/or by displaying textual annotations alongside each path that indicate the target surface name, the controlled bone or joint name, or a user-specified motion-path name.

FIG. 8a is a screenshot of a user interface 800 for an exemplary 3D CG animation system. In the example shown, the user interface 800 includes a view window 801 for presenting a display environment containing an animated body 802. For this particular example, the animated body 802 is a bendable-bottle model. Other bodies are possible. The term "body" includes but is not limited to: rigid objects, models, wire structures, articulated bodies, soft bodies, bodies with deformable surfaces, etc.

A motion path 804 is displayed in the display environment 801 with knots 806 and frame beads 808. The motion path 804 includes knots 806 for the active avar "rot_2" at frames 0, 15, 30, 62, and 98. Motion tangents are broken at frame 15. The knot 806b at frame 30 is selected and its (continuous, non-broken) handles 807 displayed. Ghosts 810 are drawn at each of these keyframes. We can see motion path bleed-through has been enabled, as the motion path 804 translucently shows through where it passes behind the bottle surface between frames 87 and 95. We see marker lines 813a, . . . , 813d at the keyframes in the timeline 809 below the view window 801, as well as a selected line 815 for the knot at frame 30 and a current-frame marker 817 at frame five; these lines are also drawn on the scrollbar 812 immediately below the timeline 809. The range bar 811 below the scrollbar 812 sets the time range for which the motion path 804 will be drawn.

FIG. 8b is a screenshot of another bottle animation showing time-fading ghosts at 1-second intervals and motion path colorstriping. In the example shown, the active avar "rot_2" has knots at frames 0, 54, 71, and 94. The knot 819 at frame 54 has broken tangents. Frame beads are hidden and colorstriping has been enabled. The colorstriping interval on the motion path 821 matches the colorstriping interval on the timeline 809 below the view window 801. Ghosts 814a, . . . , 814e, are drawn at one-second intervals; we can see their exact timing indicated by marker lines 817a, . . . , 817e, in the timeline 809 and timeline scrollbar 812. Ghost fading is enabled, with ghosts 814a, . . . , 814e, fading out away from the current frame eight.

FIG. 8c is a screenshot of another bottle animation showing a manipulation ghost 822 with an arcball manipulator 816. In the example shown, the user has selected the knot 820 at frame 94. The absence of tangent handles indicates this is a linear knot (or almost-linear knot with very short tangent handles). The manipulation ghost 822 has been created automatically at frame 94. The box 823 around the active avar name "rot_2" confirms there is a knot at the selected time. The round "arcball" manipulator 816 has been displayed around the "Bottle" model's "joint_2" node; it is drawn with its Y-axis constraint-ring highlighted to indicate the user is performing axis-constrained rotation about the joint-local Y-axis, perhaps because the user is holding down an axis-constraint hotkey or has initiated dragging by clicking directly on the Y-axis constraint-ring. The even spacing of frame beads 824 along the entire motion path 818 indicates that the rate of motion along the motion path 818 will be uniform, with no ease-in or ease-out.

FIGS. 9a-9c show a character 902 walking in-place (he does not have any forward motion through space). In FIG. 9a, we observe the motion path 902 of the end of the nose: it is an up-and-down cycle that overlies itself. A ghost 904 is shown at every keyframe. In FIG. 9b, the user has enabled motion path tickertaping: now the motion path 902 is stretched sideways and we can visualize the complete movement cycle. The ghosts 904 are displaced in space along with the corresponding sample points on the motion path 902. In FIG. 9c, the user has orbited the camera to look from the front, and has swung the tickertape direction to keep the motion path 902 stretched out to the right side; she has also increased the magnitude of the tickertape vector so the motion path 902 is more stretched out. The ghosts 904 remain correctly positioned relative to the path knots 906.

In FIG. 10a, the user has selected the root joint 1002 of the model 1000 and has tickertaping enabled. The bones of the underlying skeleton 1004 are translucently overlaid over the model surface 1006. At frame zero, we can see the motion path sample point (which happens to be at a knot) at frame zero lies at the root joint 1002; the rest of the motion path 1001 stretches off in the tickertaping direction. In FIG. 10b, the user has advanced to frame nine; now the motion path 1001 has shifted laterally so that frame 9 on the motion path 1001 lies at the root joint 1002.

Figure 11:
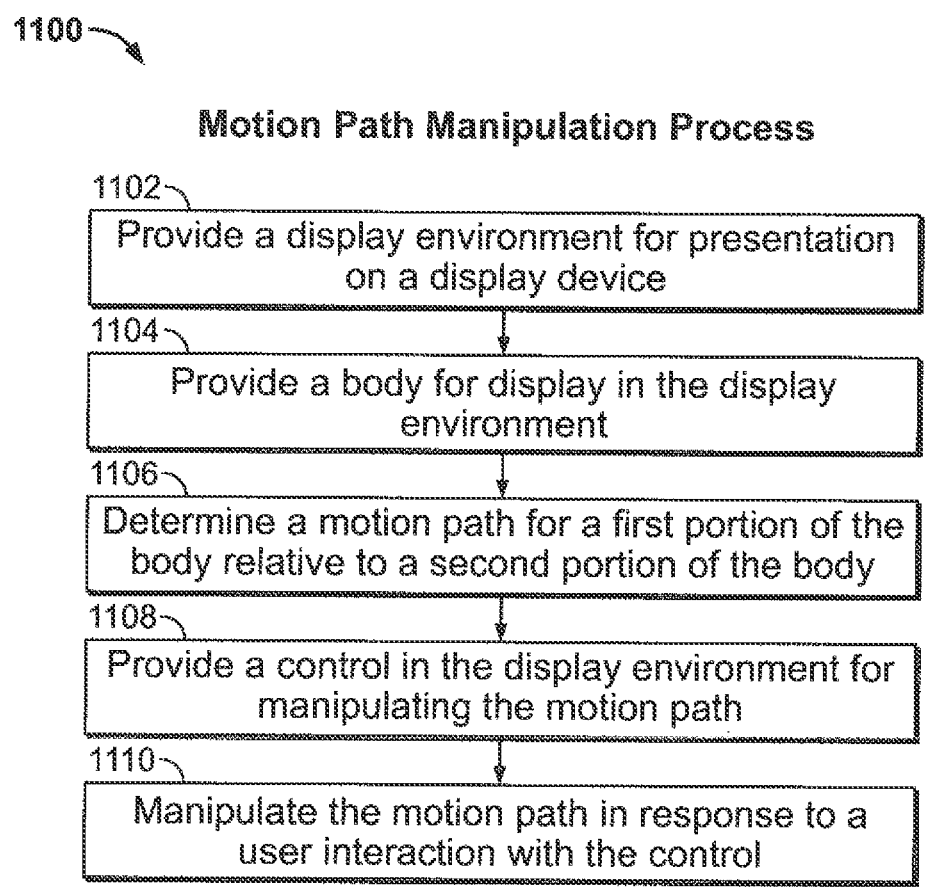
FIG. 11 is a flow diagram of an exemplary motion path manipulation process.

FIG. 11 is a flow diagram of an exemplary motion path manipulation process 1100. In some implementations, the process 1100 begins by providing a display environment for presentation on a display device (1102). The display environment can be a 2D or 3D virtual environment provided in a view window of a user interface that includes a scene having one or more graphical objects. A body or model is provided for display in the display environment (1104). The body can be a rigid body, an articulated body, a body with one or more deformable surfaces, or any combination thereof. An example of an articulated body is the walking character shown in FIGS. 9a-9c and 10a-10b. An example of a soft body is the bendable-bottle shown in FIGS. 8a-8c. A motion path can defined for a first portion of the body relative to a second portion of the body or relative to a coordinate system associated with the display environment (1106). A control is provided in the display environment for manipulating the motion path (1108). The control can be a knot, as described with respect to FIG. 8a. Other controls are possible. The path can be manipulated in response to a user interaction with the control (1110). For example, the user can use knots to change the starting and end positions of the motion path, change the shape of the motion path, etc. Other motion path manipulations have been previously described with respect to other figs.

4.1.4 Adaptive Path Resolution and Range

From the above description of path rendering, it should be clear that optimally we want to plot the position of the path only for values of t that cause valid cache mappings; in general we pick t's that fall centered within our cache lines. However, in some circumstances we may desire finer or coarser temporal resolution than the cache lines provide.

When an object is moving very slowly in space, the path will tend to change little between subsequent sample points. Rather than drawing a polyline through every sample point, we skip points that vary little in screen space from neighboring samples. We do this locally in t, starting with a coarse path and refining segments of the path whose midpoints differ from a straight-line interpolation of the segment endpoints by greater than some screen-space error threshold. We provide user control over the error threshold: selecting a high threshold causes the path to be less accurate but render faster.

When an object is moving very quickly through space, the path will tend to become stretched out. In such cases, sampling $P_{ref}(t)$ at each cache line may not provide an accurate representation of object motion. For the greater cost of evaluating our expression graph at non-cached t's, we may provide finer-grained sampling of the motion. We provide a user option to enable "accurate paths"; under this option we use a screen-space error metric to determine whether and how far we should locally refine any segment of the path beyond the cache-sampling rate.

We optionally scale the path subdivision threshold $e_{thresh}$ by the motion path Level of Detail lod, so that the path becomes less (or more) accurate as the LOD of the path decreases (or increases) (see Section 1.7).

Because rendering a very long path (i.e., one that extends across a wide range of t) can be slow, we optionally increase the error threshold as t diverges from the global animation clock $t_{now}$:

$$e'_{thresh}(t) = f(t-t_{now})*lod*e_{thresh}$$

giving us a time-varying threshold $e_{thresh}'(t)$, where $f(x)=1$ at $x=0$ and $f(x)$ increases as the magnitude of x increases. We have found that simply:

$$f(x) = 1 + \frac{c|x|}{t_{max} - t_{min}}$$

often works well, with c providing linear control over the rate of accuracy degradation away from $t_{now}$. This procedure yields a path that is accurate around the "current time" but becomes progressively less accurate farther from the current time. We automatically disable this option (i.e., set $f(x)=1$) whenever the global animation clock is dynamically changing, such as when the user plays the animation.

We also allow the user to specify the range of parameter values $[t_{min}, t_{max}]$ over which the motion path will be drawn; specifying a narrower interval both makes the motion path render faster and reduces clutter on the screen. The green range-bar seen at the bottom of the timeline in FIGS. 8a-8c provides one means of controlling the path range. We optionally also display in the camera view range-manipulator tabs at either end of the motion path itself: dragging on one of these tabs or selecting a tab and typing in a new time adjusts the corresponding setting for loop start or end times.

4.1.5 Automatic Path Placement Option

When manipulating an object, we often want a motion path to be drawn through that object. In the case of an articulated body consisting of bones connected by rotational joints, it is it often is convenient for a motion path to be drawn through the end of the manipulated bone. To facilitate this, we provide the option of automatic path placement. With this option enabled, selecting any scene object causes a motion path to be created drawn through the root of that object. Selecting a part (such as a bone) within an articulated object causes a path to be drawn through the distal end of that part. Selecting a model (such as a character) causes a path to be drawn through the root joint of that model.

4.2 Manipulation

In addition to showing us the path and timing of motion, our motion path provides full direct-manipulation control over motion. The user can click and drag with the mouse cursor on a knot or its handles to adjust knot value, timing, motion tangents, twist rates and interpolation rates.

In general, manipulating motion via the path involves inverting the mechanism that is responsible for the motion being what it is, that is, the mathematical and procedural computations that map from changing avars to 3D movement; these computations are exactly those represented by the relevant subsections of our expression graph. This inversion of the graph computations allows us to map from desired changes in the path shape and timing to the necessary changes to be made in the underlying avars. In some cases the forward mapping from avar to motion will be non-invertible; in such cases a "pseudo-inversion" is readily available from our expression graph, as detailed below.

In addition to knowing what changes need to be made to avars, we also track dependencies arising from this control mechanism. Changes to the motion path cause dependent avars to be adjusted. Adjustment of avar knots has the side effect of pushing dirty on the avar outputs over the interval of support of the knots. This push will recursively push dirty through the articulation and/or deformation hierarchies, ultimately pushing the active surface. The motion path itself is a child of the active surface, and so it too will receive the push that it originated. Thus manipulation of the motion path forces us to re-evaluate and redraw the surface and, by extension, the motion path itself. This straightforward dependency-based reciprocal invalidation of surface and motion path is enabled by our toleration of cycles within the expression graph.

Avar discovery is the process of traversing the graph and enumerating the avars up-graph of a particular node. This avar list will define the degrees-of-freedom that exist in animating that node. Avar discovery is normally done at model unroll time, that is, when the model is first instantiated in core memory from disk at the beginning of an animation session. However, we can also perform avar discovery on a just-in-time basis, deferring discovery for every node until the first time that node is made active. Static changes in graph topology (for example, creating or deleting nodes or adding or removing edges) may require that we rediscover upstream avars. Dynamic topology changes (due to switches, inverse kinematics state changes, attaches, and hierarchy inversions) may not require rediscovery however; we simply maintain multiple lists for the upstream avars of affected nodes, and use whichever list is currently applicable based on the current topology. This is possible because these dynamic topology changes are discrete changes in which the alternative topologies are fixed and thus enumeratable at unroll time.

4.2.1 Graph Inversion

In Section 1, we detailed how our expression graph represents the computations and dependencies underlying our 3D scene. We identified that this is a directed graph, that is, edges in our graph have direction, and that the direction indicates both the conceptual flow of information and (in the opposite direction) computational dependency. We also discussed (in Section 1.17) how we can locally invert a subgraph within our expression graph by inverting each node and switching the edge directions. Recalling from that section, nominally it falls upon each node type to define its own inverse; however, the system can establish a local inverse (a Jacobian) for nodes that fail to define their inverse function. The Jacobian is not a true inverse because it only is valid around a local region of parameter space.

Here we use this same mechanism to map desired changes in knot position to changes in the animation control variables (avars). We recall that the forward computation defined by the expression graph maps avar settings to scene configurations. Said another way, the forward expression graph maps from avar parameter space to 3D configuration space. By inverting (or pseudo-inverting) the expression graph, as detailed in Section 1.17, we can map from 3D configuration space to avar parameter space. Specifically, we can map from local changes in motion-path knot position to corresponding changes in the underlying avars. This local inverse mapping is precisely what the Jacobian defines. For optimization of pseudo-inversion across complex graph structures involving deformations and similar "expensive" operations, we compute the composite Jacobian across the subgraph using the method of Section 1.17. This is convenient when the user is direct-manipulating a motion path dependent upon expensive articulations and deformations.

In certain circumstances, the local pseudo-inversion provided by Section 1.17 is not capable of successfully adjusting avar parameters in a way that would achieve the desired change to motion-path knot position, even though such a change is possible. This occurs when the configuration becomes stuck in local minima from which our local view of the inverse is not able to escape. Such circumstances mostly arise only in pathological graph configurations, so they do not overly concern us here. When they do arise, the user will rely on other manipulation methods, such as direct manipulation of skeletal joints and bones or adjustment of the underlying avars themselves, to escape the local minima.

In many cases we can avoid issues of local minima by ensuring our nodes define globally valid inverse operators. In some cases this won't be possible. We can employ an automatic stochastic technique for escaping local minima. This is accomplished simply by injecting noise into the avar parameters in the hope that a "lucky" random change to an avar will allow us to escape the local minimum. In practice, generally we have found it to be more convenient to allow the user to direct-manipulate the skeleton or other geometry out of the local minimum. Because manipulation of the motion path knots, the skeleton or geometry itself, and the actual avars all affect the same underlying representation (the avars), the user may freely move between these control mechanisms, for example by "untwisting" or otherwise manipulating geometry directly when the motion path knots get "stuck". Nonetheless, we do provide stochastic escape of local minima as a user option.

4.2.2 Knot Value Adjustment

Each motion path knot represents some non-empty set of knots on unlocked active avars (Section 4.1.3). When the user drags with the mouse-cursor on a motion-path knot, we wish to adjust the corresponding avar knots as necessary to keep the motion-path knot under the cursor. In general, as described in Section 4.2.1 and elsewhere above, this is an underconstrained problem (that is, there are multiple "good" solutions), although in some situations it will be overconstrained (there is no solution). We find a "best" solution as follows.

First, we need to identify a point in 3-space to which we want the motion path knot to move. The mouse position defines a ray in 3-space that begins at the camera-space origin and extends through the projection of the mouse cursor on the screen plane. We choose as our target point for the motion path knot the intersection of this ray with the plane passing through the current motion path knot position and perpendicular to the camera forward (−Z) axis. Thus the current knot position and the target knot position both lie in the same X-Y plane. Subtracting the current position from the target position gives us a goal vector in that plane. We now need to find the change to the active unlocked avars that produces movement in the path reference point that best approximates this vector.

In the simplest case we will have an explicitly invertible path available through the expression subgraph that subsumes the active avars and the path target surface. In this case it is straightforward to solve for the necessary avar changes by passing our goal vector through the inverted graph, yielding a vector of avar deltas. These deltas are applied to the avars as described in Section 5.

In another simple case, we do not have an explicitly invertible path but the composite Jacobian for this subgraph is orthogonal with respect to the control avars. Here it is straightforward to transform the vector through the Jacobian and extract the necessary avar deltas. These deltas are then applied as described in Section 5. We then examine how closely the motion path knot approaches the desired position, and iterate until we reach a preset error bound. This iteration is independent of frame rendering (see Sections 1.6 and 1.8) and therefore does not interfere with maintaining target rendering rates. However, because we do maintain fast update rates, rarely does the mouse move far enough in a single update pass that one or two iterations are insufficient to achieve the error bound, so we rarely need to iterate further. Because we are relying on a gradient descent method, we have no problem tolerating overconstrained systems; we will find a "good" solution, if not the exact solution. We deal with local minima as described in Section 4.2.1 above.

In more complex cases, the composite Jacobian will not be orthogonal and may have degeneracies. The system may still be under- or over-constrained. There are a number of ways to deal with such systems; we take the pragmatic approach of the model specifying preferred avar settings (as defined by the avar default values) and limits and weighting particular avars as being "more stiff" than others, which the human designer of the model explicitly defines. We iterate as above, but stochastically choose among avars to adjust and amounts to adjust them so as to favor changes that preferentially move less-stiff avars and keep avars in their preferred ranges and near their preferred center values. We can use an off-the-shelf constrained optimization solver for performing this iteration quickly. Again it is rare for the knot target to move so far in a single update pass that we need to iterate more than a couple times. This tends to happen only in highly non-linear control graphs. Such graphs are consequently difficult for us to manipulate via the motion path, and users will typically resort to direct manipulation of the geometry or adjustment of the underlying avars in controlling these structures.

When assembling a model for this system, it is worth considering how common non-linearities in the parameterization of articulation controls may affect naturalness of motion-path manipulation. For example, singularities in Euler rotations can make direct manipulation of the motion path awkward in some situations. We allow users to build models using Euler angle or quaternion rotations but prefer quaternions because they yield more natural direct manipulation.

We provide several simple ways for users to exercise some control over the constrained solution without modifying the underlying model or avar setup. First, the user may lock particular avars at will, thereby eliminating corresponding degrees-of-freedom in the solution space. The most common example of this is using an axis-constraint hotkey or manipulation handle to limit control to a single avar. For example, rotating an Euler-angle joint by dragging on the red (+X) axis constraint ring of the arcball will adjust only the rx avar for that joint. In the case of quaternion rotations, the system will project the specified rotation onto the desired rotational axis, thereby enforcing the axis constraint without actually causing any avars to be locked. The user may also explicitly lock or unlock any avar. Motion-path manipulation solutions will honor that lock by not considering that avar to be a degree-of-freedom. The motion path display reflects this by only showing knots for "free" avars (Section 4.1.3).

The user may also control the constrained solution to some extent by adjusting the "stiffness" of the avars (as described above). We provide a manipulation mode in which clicking and dragging the mouse on a joint or other node adjusts the stiffness of avars directly driving that joint. This is particularly useful for inverse kinematics solutions, where we prefer a linkage to bend more at one particular joint than at another.

Finally, we may avoid the entire analytic or numerical graph inversion process described above by having the model explicitly define inverse mappings from common manipulations (translation, rotation, scale, longitudinal bends, etc) to its avars. This is the simplest and in many ways most convenient method, but naturally it lacks flexibility for exceptional circumstances. Nonetheless, in simple models such as jointed skeletons this method may be sufficient for most or all avars.

When the user enables the option to display numerical values for the associated avars at selected motion path knots, in addition to manipulating a path knot itself, the user may edit the numerical labels directly or may drag right and left on them to "mung" them up and down.

4.2.3 Manipulator Widgets

A model may specify supported manipulation modes and corresponding manipulation widgets (such as the rotation arcball shown in FIG. 8c) for use in controlling particular sets of avars. The system provides default manipulator widgets for translation, rotation, scale, shear, bend, squash/stretch and similar basic operations. Custom widgets may be added as externally defined Glyph nodes through the plug-in interface (Section 1.18). All avars can be associated with some manipulation mode to be manipulated via the mechanism described in Section 4.2.2 above. Avars associated with a particular mode will be "active" only when that mode is selected by the user.

If no other manipulation style makes sense, avars may be designated to manipulate via "munging." Motion path knots associated with such avars are manipulated by mouse cursor drags in screen space; these drags map directly to changes in the avar value. For example, in the case of a scalar avar, drags to the left might decrease the value of the avar while drags to the right would increase it. Again, it is up to the modeler to specify these mappings.

Inverse kinematics represents a special case of direct-manipulation control. Here the control graph has already been inverted, and we simply provide direct manipulation of the IK goal. That is, to visualize motion of or control the endpoint of an IK chain, one selects the IK goal (drawn as a "jack" glyph in 3D space). The path is drawn through the goal. The goal has simple translation, and optionally rotation, avars that may be manipulated through motion path knots and manipulator widgets as described above. Relative bend at multi joint chains may be adjusted by modifying the relative stiffness at these joints, as described above. Multiple solutions obtained by rotating about the longitudinal axis from the IK root to the IK goal may be selected among via a "swing" manipulation mode; in this mode, dragging on any geometry within the IK chain, or on a motion path knot through any such geometry, rotates the IK chain through that solution space. More sophisticated IK chains, for example involving non-planar linkages, or non-revolute joints, will need to be handled through the conventional graph inversion mechanism described above.

4.2.4 Other Manipulations

In addition to the ability to reposition motion path knots in 3D space, we provide several other manipulation controls. For control over rotations only, for example when the active node is a spherical joint or the root transform of a model, we provide an axial twist control as described in Section 4.1.3. This control is a manipulator handle that is drawn when tangent handles for a selected path knot are drawn. It is drawn from the joint-local Z-axis line, extending in a direction orthogonal to that line (e.g., +X or +Y). It indicates the axial twist around the local Z-axis. Dragging on the handle causes the joint to rotate about that axis. We determine the implied spherical quaternion rotation using an arcball-style projection of the mouse cursor onto a sphere centered at the base of the twist handle. For Euler rotations, we then extract the z-axis rotation from that spherical rotation and set only the rz avar for that joint. For joints controlled by quaternion-valued avars, we project the spherical rotation onto the local z=0 plane and then convert that rz-only rotation back into a quaternion, which we use to adjusted the avar. In both cases, the avar is updated as described in Section 5.

Tangency handles at a Bezier or Hermite motion path knot at time t indicate the left and right derivatives of the path around t. The user may click and drag with the mouse cursor on a handle to control the path shape; we need to map this control back to the necessary changes in the underlying avars. The desired tangent handle direction and length specifies a 3D vector; we add that vector, scaled by the inverse of the frame rate, to the motion path knot position to find the desired position of the path target point at times $t^-=t-1/fps$ (for the left handle) or $t^-=t+1/fps$ (for the right handle). We pass that target point through the inverse expression subgraph in exactly the same way as we do for knot position (Sections 4.2.1 and 4.2.2). This gives us desired values for each avar at $t^-$ or $t^+$. Taking finite differences with the avar values at t gives us an estimate of the desired derivates in each avar, which we use directly to set the avar knot tangent handles. Sometimes it will be impossible to select a path tangent handle with the mouse cursor because the tangent handle is very short and thus obscured by the path knot itself Clicking and dragging on the motion path knot while depressing a hotkey (our implementation uses the Option/Alt key) results in dragging the left knot handle. Pulling out tangent handles for a motion path knot with underlying linear avar knots converts those knots to be Beziers. Normally when dragging a knot tangent handle, only that handle is manipulated; the opposing tangent handle will rotate accordingly if the handles are "mended" (not "broken", as described above) but its length will not change. Dragging a knot tangent handle while depressing a hotkey (again we use the Option/Alt key) causes the lengths of both tangent handles to change symmetrically (regardless of whether the handles are "broken"): the opposite handle length "mirrors" the change in the manipulated handle. Thus, when the user "option-drags" on a path knot with null tangent handles, not only the left handle but the right handle also are pulled out from the knot. There are menu items, as well as a hotkey, to "break" and "mend" the tangent handles at the selected motion path knot; these actions are applied to the underlying avar knots. Mending broken tangent handles causes the right handle to be set to match the slope and length of the left handle. Breaking tangent handles does not immediately change the slope or length of either handle, but allows the handles subsequently to be manipulated independently.

Motion path knots may be retimed by dragging on them while depressing a hotkey (the Control key in our implementation). Dragging to screen-left decreases the time of each underlying avar knot, while dragging to screen-right increases the time of the avar knots. Knots can only be retimed in the interval between nearest preceding and succeeding path knots. When multiple path knots are selected, retiming one path knot similarly retimes the others. That is, if path knots at frames 6 and 10 are selected, and the knot at frame 6 is retimed to frame 7, then the knot at frame 10 will be moved to frame 11. Knot times are adjusted to the nearest integral (whole number) frame by default, but this behavior can be overridden in the preferences or via a hotkey during dragging. Retiming a knot while holding an additional hotkey (Option/Alt in our implementation) causes the underlying avar knots to be copied to the new time, rather than moved in time. Retiming a number of selected knots while holding another hotkey causes the knot times to be stretched in time (or, more precisely, dilated about the current time), causing the corresponding motion to occur more quickly or slowly.

Depressing a hotkey (the Command key in our implementation) while clicking the mouse cursor on a frame bead inserts a new knot (i.e., a breakdown) on all active avars at the corresponding time. We optionally insert the new knots as Bezier knots with tangent handles adjusted to preserve the existing shape of the path. We accomplish this by differentiating each avar at the frame time and solving for the tangent slope and lengths that will preserve this differential. We adjust the new knot tangent slope and length and the proximal tangent lengths of the preceding and subsequent knots.

Interpolation rate along the path is adjusted in one of two ways. First, the user may drag on the frame beads displayed along the path. We solve for the change to the nearest-knot tangent handle slope and length that will approximate the new frame bead position in the same way we solve for changes to the tangent handles themselves (described above). Second, the user may adjust the interpolation rate slider on the handle itself; changes to this are mapped directly to the interpolation rate of the underlying avar knots.

During manipulation of knot time and interpolation rate, we optionally display multiple ghosts along the time interval between the preceding and subsequent motion path knots. These ghosts may be drawn as full ghosted models, as minimal skeleton "stick figures" of the full model or as skeleton stick figures of the subsection of the model articulation hierarchy being manipulated (that is, the portion of the model skeleton from the "active" node to the node through which the motion path is drawn).

It should be clear in this description that the motion-path-based manipulation of motion timing and shape are orthogonal in our system. That is, a user manipulating the motion path may adjust the timing of movement along the path independently of the path shape, and vice versa. Furthermore, the motion path display and control mechanism we have described is equally applicable to varied types of animated values (e.g., scalars, points, vectors, quaternions, and others) and to arbitrary expression graphs involving articulated structures, deformable surfaces, or indeed any Turing-expressible computation. It provides real-time direct manipulation and visualization fully decoupled from frame rendering rates. All this is enabled and facilitated by the temporal caching, cycle safety and related features of our expression graph described in Section 1.

5. Animation Layers

In Section 1.18.1, we described our use of articulated variables, or avars, to provide changing values within our expression graph. Here we present the heterogenous, multi-layered representation used within these avars; their implementation; and associated mechanisms for their use. We introduce the idea of layers of motion, analogous to the image layers provided in popular image-editing applications.

An avar node in our expression graph expresses some function of its scalar input parameter. Often this parameter is time, but that need not be the case. So far we have said little about how this function is defined.

Avars are composed of multiple motion channels, each of which specifies some aspect of the total avar output function. Motion channels are composited together under a programmable functional composition, described below. Motion channels are organized into layers. A given avar may have zero or one motion channels for each layer. If it has zero channels on a given layer, we say it has no animation for that layer. If it has one channel on a given layer, we say it has animation for that layer. If an avar has animation for any layer, we say that avar is set; otherwise it is unset or defaulted. If the output value of an avar varies as its input parameter changes, we say the avar is animated; otherwise it is constant.

As described in Section 1.18.1, a given avar may have any one of a number of value types, such as scalar, vector, point, quaternion, scalar field, or mesh. All motion channels within that avar will have the same type.

At a given time, a single layer is the active layer. Direct manipulation, display of knots on the motion path, and manipulation of the motion path all involve the active layer only, and are only possible when the active layer is a kinematic layer (Section 5.2). The user chooses what layer is active and may change between active layers at will.

5.1 Motion Compositing

There are two components to the channel composition: (1) a layer-wide compositing operator, and (2) an avar-specific layering policy. The compositing operator is one of the operators defined by Porter and Duff in T. Porter and T. Duff., *Compositing Digital Images*, Computer Graphics (Proceedings of SIGGRAPH 84), 18(3):253-259, July 1984, which article is incorporated by reference herein in its entirety. We draw the loose analogy that our notion of "layer" corresponds to Porter and Duff's "picture" and our "motion channel" corresponds to Porter and Duff's "pixel". Accordingly, we provide the following operators for compositing two layers A and B:

TABLE 3

Compositing operators, after Porter and Duff

| Operation | Name | $w_A$ | $w_B$ | Interpretation (relative to A) |
|---|---|---|---|---|
| clear | clear | 0 | 0 | erase all animation |
| A | replace | 1 | 0 | replace all underlying animation |
| B | ignore | 0 | 1 | disable layer A |
| A over B | over | 1 | $1-\alpha_A$ | override specified avars |
| B over A | under | $1-\alpha_B$ | 1 | override previously defaulted avars |
| A in B | in | $\alpha_B$ | 0 | keep only avars common to both layers, overriding previous animation |
| B in A | mask | 0 | $\alpha_A$ | mask out all but specified avars |
| A out B | out | $1-\alpha_B$ | 0 | animate only specified avars except those that were previously animated |
| B out A | exclude | 0 | $1-\alpha_A$ | mask out specified avars |
| A atop B | atop | $\alpha_B$ | $1-\alpha_A$ | override previously animated avars |
| B atop A | mask-under | $1-\alpha_B$ | $\alpha_A$ | animate only specified avars, keep any existing animation in those avars |
| A xor B | xor | $1-\alpha_B$ | $1-\alpha_A$ | eliminate avars animated in both layers |
| A plus B | blend | 1 | 1 | blend layers together according to channel layering policy |
| A plus B | add | 1 | 1 | blend layers together using an additive layering policy |
| A plus B | multiply | 1 | 1 | blend layers together using a multiplicative layering policy |

The operation column specifies the Porter-Duff compositing operation, name specifies the term we use to identify this operation, and $w_A$ and $w_B$ ($F_A$ and $F_R$ in Porter-Duff) are weighting factors for layers A and B as discussed below. We part ways with Porter and Duff in that they: (1) pre-multiply pixel values by alpha, while we do not similarly pre-scale our motion channels, and (2) in the detail that they specify an alpha plane that provides a fractional masking value per pixel. In contrast, our motion channels are not associated with individually variable alpha values. We recall that avars lacking animation on a particular layer do not possess a motion channel for that layer. We consider the alpha associated with such a non-existent channel to be zero. Channels that do exist in the layer all have the same alpha, specified layer-wide by a special envelope avar. Each layer has exactly one envelope avar, and these avars are unique in that they are themselves unlayered, that is, each envelope avar contains a single motion channel for the layer that envelope affects. The envelope avar is unaffected by the compositing operator and layer alpha. However, the envelope avar is optionally subject to the time-course avar described below. For example, the envelope for a cycling layer may optionally be cycled along with the rest of the layer. As with other avars, layer envelopes may be defaulted (to 1.0), set to a constant value, or animated. The value-type of envelope avars is scalar, and they are usually kinematic (i.e., splined, as described below). As we shall see, setting envelopes to fractional values between 0.0 and 1.0 allows continuous blending between layers.

The layering policy for a given avar is either additive or multiplicative. The policy defines how the channels of that avar combine under compositing. For example, translation avars and most other scalar avars are additive, that is, their numerical values in layers A and B are combined through scalar addition. Conversely, scale avars (sx,sy,sz) and unit-quaternion rotations are multiplicative: they are combined by (scalar or quaternion, respectively) multiplication. Transformation matrices are normally multiplicative. The user who constructs the expression graph for the model may specify either policy for a given avar. The avar will follow the same policy on all layers except those using the add or multiply operators, both of which override the avar-specific layering policy with a layer-wide policy.

During layer compositing, the layer-weighting factor ($w_A$ or $w_B$) is multiplied by the layer alpha (recalling that our motion channels are not pre-multiplied by alpha), and the resulting value is used to scale the motion channels within the layer. Scaling a motion channel is interpreted as a linear interpolation between the channel value and a type-specific zero (for additive channels) or identity (for multiplicative channels); zero and identity are defined per type according to common mathematical convention, for example, for scalars they are just the usual 0.0 and 1.0, respectively. Scalars, points, vectors, matrices, and most other types interpolate according to the standard linear interpolate (lerp) operator, while unit quaternions interpolate via the spherical interpolate (slerp) operator. Thus for an additive scalar avar, scaling a motion channel corresponds to a scalar multiply of the channel value. Scaling a (multiplicative) quaternion rotation involves a slerp between quaternion identity (no rotation) and the channel value.

For example, given two motion channels of an additive scalar avar f, the over operator would composite these avars as:

$$f(t) = \alpha_A w_A f_A(t_A) + \alpha_B w_B f_B(t_B) = \alpha_A f_A(t_A) + \alpha_B(1-\alpha_A)f_B(t_B)$$

where $f_v(x)$ gives the value of avar f's motion channel for layer v at input parameter x. For now we assume $t=t_A=t_B$. (We will reexamine that assumption below.) Similarly, two channels of a multiplicative quaternion avar q would composite via the atop operator as:

$$q(t) = \alpha_A w_A q_A(t_A) * \alpha_B w_B q_B(t_B)$$
$$= \alpha_A \alpha_B q_A(t_A) * \alpha_B(1-\alpha_A) q_B(t_B)$$
$$= slerp(\alpha_A \alpha_B, q_{identity}, q_A(t_A)) slerp(\alpha_B(1-\alpha_A), q_{identity}, q_B(t_B)).$$

We have assumed thus far that all motion channels are parameterized identically, that is, that $t=t_A=t_B$ for all layers A and B. Now we introduce the notion of a time-course avar. Each layer has exactly one time-course avar and, like the envelope avar, this avar is special in that it is unlayered, that is, each contains a single motion channel for the layer that time-course affects. The time-course avar is unaffected by the compositing operator, layer alpha or the layer envelope. For some layer A, the time course avar defines a function $T_A$ mapping from avar input parameter space to the parameterization of the evaluation function $x_A$ for motion channels within layer A. That is, $t_A=T_A(t)$.

A particularly useful time-course function is the saw-tooth function curve. This causes animation within a layer to cyclically repeat ("cycle") over some time range. Cycling is the most-common use of the time-course avar, and, for convenience, we provide an easy mechanism in the application GUI for cycling layers over some given range. More complex time-course manipulations can be done by editing the time-course avars directly via a spreadsheet or curve editor.

In general, layer composition for avar x involves:

$$x(t) = \prod_{i=n}^{0} x_i = x_n \circ_n x_{n-1} \circ_{n-1} \ldots \circ_2 x_1 \circ_1 x_0$$

where $o_i$ is the (user-specified) operator for compositing layer i upon layer i−1, with associated weighting factors $w_A$ and $w_B$ as defined in Table 2, and $x_i$ is the value of the (existent) motion channel for layer i. We recall that the layering policy for a given compositing operation is the layering policy of the avar being composited, except under the special compositing operators add and multiply, as indicated in Table 2. Then:

$$a \cdot b = \begin{cases} a \oplus b & \text{when layering policy is additive} \\ a \oplus b & \text{when layering policy is multiplicative} \end{cases}$$

$$x_i \oplus x_j = interp(w_A \alpha_i(t), 0, x_i(T_i(t))) + interp(w_B \alpha_j(t), 0, x_j(T_j(t)))$$

$$x_i \oplus x_j = interp(w_A \alpha_i(t), 1, x_i(T_i(t))) * interp(w_B \alpha_j(t), 1, x_j(T_j(t)))$$

$$\alpha_i(t) = \begin{cases} E_i(T_i(t)) & \text{if time-course affects layer } i\text{'s envelope} \\ E_i(t) & \text{otherwise} \end{cases}.$$

For quaternion-typed avars, interp is the spherical linear interpolation, or slerp, operator; otherwise it is lerp. 0 and 1 denote type-appropriate values for "zero" and "identity". $E_i(t)$ is the value of the envelope avar for layer i at parameter t, and the alternative lookup strategies for E( ) reflect the user-specified option of whether a particular layer's envelope should be affected by that layer's time-course avar.

We note that motion compositing is not mathematically commutative, that is, the compositing order is significant, both because the Porter-Duff compositing operators are non-commutative and because multiplication of some of our avar data types (e.g., matrix and quaternion tensors) is non-commutative. However, motion compositing is mathematically associative, that is, the grouping of compositing steps is not significant, because the Porter-Duff compositing operators are associative and tensor multiplication is associative. In fact, one limitation we impose on value types within our system is that those types generally are associative under addition and multiplication, as well as possess a well-defined zero and identity.

5.2 Motion Channel Taxonomy

We have said nothing yet about how the functional mapping from parameter t to value $x_i$ within a single motion channel is specified. In fact, rather than a single such specification, there are alternative specifications; this choice may be made per layer. The classes of layers include kinematic, forward dynamic, multipoint dynamic, procedural, sampled, and stochastic. All motion channels within the same layer are of the same class.

Kinematic animation refers to animation that is defined by "splines", that is, curves whose shape is defined sparsely via knots and an interpolation rule for filling in the gaps between knots. Kinematic animation is often, though not necessarily, created by a human operator.

Forward-dynamic motion refers to animation that has been generated via a computer-simulation solution to a single-point boundary problem. The boundary value is specified for some initial parameter, e.g., t=0, and the simulation uses a differential equation solver to integrate forward in time, computing values at subsequent t's. This is generally done as an offline process and the resulting animation data is saved in a tabled format for fast access.

Multipoint-dynamic motion refers to animation that has been generated via a computer-simulation solution to a multi-point boundary problem. Boundary values are specified at a number of parameters $t_i$, and the simulation uses an iterative process such as gradient descent to develop a solution that interpolates the specified boundaries subject to certain constraints. Again, the solution is generally computed as an offline process with the resulting animation data saved in a readily accessible format Procedural animation in general is any animation computed automatically by a computer process. Here it refers to animation computed by a user- or modeler-supplied external function, typically written in C++ code using a supplied plugin API. The animation is generated by the external function on an as-needed basis, though values once computed may be retained within our expression graph via temporal caching, as described in Section 1.

Sampled motion refers to animation data recorded as discrete time-samples on disk. This includes motion capture data and the output of externally executed computer simulations or other computer procedures that write their output to disk as tabled time-based samples.

Stochastic motion denotes motion computed by a pseudo-random process. We provide various controls for "shaping" the distribution of the random number generation. In general, any user-level or code-level representation of a probability distribution function (PDF) could be used for shaping the generated motion, including the provision of representative example motion whose PDF could be extracted through an automatic or manual process.

Any class of layer may be converted to a sampled layer by sampling the motion in that layer and outputting the time-based samples to a data file in table format. Any class of layer may be converted to a kinematic layer by automatically fitting spline segments to the motion in that layer and storing the knots that define those spline segments.

Boundary values for forward- and multipoint-dynamic simulations are specified via selected "lower-numbered" (i.e., lower in the compositing stack) layers. These boundary-specification layers exist only to guide the simulation and are effectively disabled when the overlying dynamic layer is enabled.

There is no limitation on how the different classes of motion are intermixed. Layers of different classes may be composited freely one upon another. The class for each layer is independently user-specified.

5.3 Editing Kinematic Animation

When the user wishes to modify by direct manipulation the pose of a model, we take into account the contribution to the existing pose not only of the active layer but of all other layers as well. We factor out the effect of the non-active layers in deciding how to modify the active layer. We do this by inverting the composition process around the active layer. (For clarity, in the discussion that follows we assume that all time-course avars give the default mappings $t=T_i(t)$ and that the envelope avar for the active layer is 1.0 everywhere. For full generality, we could replace all occurrences of t with $T_i(t)$ and scale the resulting $f_v'(t)$ by the inverse of the envelope value, as is done in our implementation.)

That is, in order to set avar f to value y at parameter t, we compute the new value $f_v'(t)$ for active (kinematic) layer v as:

$$f_v'(t) = \begin{cases} \left( -\prod_{i=v-1}^{0} f_i(t) \right) \cdot y \cdot \left( -\prod_{i=v+1}^{n} f_i(t) \right) & \text{when layering policy is additive} \\ \left( \prod_{i=v-1}^{0} f_i(t) \right)^{-1} \cdot y \cdot \left( -\prod_{i=v+1}^{n} f_i(t) \right)^{-1} & \text{when layering policy is multiplicative} \end{cases}.$$

For example, suppose we wish to set an additive scalar avar f to have the value y at parameter t by modifying only layer v. For simplicity we assume that all layers are composited under the blend operator and that the envelope avar for each layer is left at the default of 1.0. Then the new value we should set in layer v is:

$$f'_v(t) = f_v(t) + \Delta f_v$$
$$= \left(-\prod_{i=v-1}^{0} f_i(t)\right) \cdot y \cdot \left(-\prod_{i=n}^{v+1} f_i(t)\right)$$
$$= -(f_{v-1}(t) + f_{v-2}(t) + \ldots + f_0(t)) + y +$$
$$\quad -(f_n(t) + f_{n-1}(t) + \ldots + f_{v+1}(t))$$
$$= y - \sum_{i \neq v} f_i(t)$$
$$= y - (f(t) - f_v(t))$$
$$= y - f(t) + f_v(t)$$
$$= y - f(t) + f'_v(t) - \Delta f_v$$

$$\Delta f_v = y - f(t).$$

Thus, we can see the necessary change to layer v is simply the difference between the desired value and the current value, as expected. Taking another example, we wish to set multiplicative quaternion-valued avar Q to value q, again at parameter t and modifying only layer v. The new value we should set in layer v is:

$$Q'_v(t) = \left(\prod_{i=v-1}^{0} Q_i(t)\right)^{-1} \cdot q \cdot \left(\prod_{i=v+1}^{n} Q_i(t)\right)^{-1}$$
$$= q^{-1}_{prerotation} \; q \; q^{-1}_{postrotation}$$

where or $q_{prerotation}$ is the composite rotation due to layers prior to v, and $q_{postrotation}$ is the composite rotation from layers subsequent to v. Naturally, the easy way to compute the pre- and post-active-layer composite values is to use the existing compositing machinery described in Section 5.1; we simply disable layers numbered ≥ and ≤v, respectively, and evaluate the avar at parameter t. In pseudocode:

| Avar::SetLayeredValue(v,t,y): |
| --- |
| EnableLayers(0..v-1);   /* disables all other layers */ |
| prevalue = Evaluate(t); |
| EnableLayers(v+1..n); |
| postvalue = Evaluate(t); |
| EnableLayers(0..n) |
| if policy = additive then |
| /* additive layering policy */ |
| newvalue := -prevalue + y + -postvalue; |
| else |
| /* multiplicative layering policy */ |
| newvalue := prevalue.Inverse( ) * y * postvalue.Inverse( ); |
| Layer(v).SetValue(t, newvalue); |

Again, we may wish to scale newvalue by the inverse of the layer envelope before actually inserting or adjusting a knot in the spline curve for layer v.

5.4 Layer Properties

Layers may be given user-specified names, comments, and arbitrary tag-value pairs. A layer name is unique within its layer set (see below). Layers may be searched for and selected by name, comment or tag-value pair. A selected layer or layers may be operated upon in a number of ways. Clearing a layer corresponds to deleting all motion channels for that layer, leaving a layer containing no animation. Deleting a layer deletes the layer's motion channels as well as the layer itself The user may also create new layers; new layers initially have no motion channels and thus no animation. The compositing operator for a layer may be changed at any time. In contrast, the layering policy for each avar is normally set at model construction time.

Layers may be locked or unlocked. The information stored in the motion channels of a locked layer may not be modified. Layers may be grouped into layer groups called layer sets. All motion channels for a given layer set are stored on disk within a single logical file. Individual layers may be moved between layer sets, subject to certain limitations described below; the motion channel data will correspondingly be moved between disk files. Layer sets may be locked or unlocked. Locking a layer set locks all layers within the set and corresponds to locking the associated file on disk. Unlocking a layer set corresponds to unlocking the associated file and can only be done by a given user if that user has sufficient operating system "privileges" to unlock the file. When loading a layer set from disk, the contained layers will be locked if the disk file is locked; otherwise they will be unlocked.

Layers may be enabled or disabled. Disabling a layer is equivalent to specifying a layer alpha of zero (See Section 5.1). Sets of layers may be enabled and disabled together. A layer may be soloed, which is equivalent to enabling that layer and disabling all other layers. The output value of an avar as it would be if the active layer were soloed is available at the avar's solo output. Changing active layers pushes dirty on all avar solo outputs.

Layers are displayed within a layer list window and optionally within a layers pane within the timeline window. The compositing order of layers may be changed by dragging the layers into a different order in the list using the mouse cursor. Each line of the layer list corresponds to one layer and shows the layer name, the range if any over which the layer cycles (via a sawtooth time-course function), toggles for the layer lock and enable attributes, and an indication of whether or not any of the active avars have motion channels on that layer. There are two display modes for the layer list: layers may be organized by set, so that the layer view contains a hierarchical list, or layers may be organized by compositing order, and then the layer view gives a flat listing with layers color-coded to indicate set membership by associating a (user-specified) color with each layer set. Next to each layer is an optional preview tile that shows the active model (or some particular model specified by the user) rendered with only that layer enabled (or some particular set of layers specified by the user). This tile animates when the user moves the mouse cursor over the tile, and otherwise shows a still image.

The layer pane in the timeline window additionally shows the duration in time over which particular layers (and/or layer sets, when viewed hierarchically) contain animation (that is, contain motion channels with time-varying values) by the position of colored bars for each displayed layer drawn under the timeline itself. The layer (or layer set) envelope may be drawn as a curve over its corresponding layer bar, and the curve may be directly manipulated. By setting interaction modes (with user-interface buttons or by depressing keyboard keys) and then clicking and dragging with the mouse upon layer bars, the motion within layers or layer sets can be retimed, scaled in time, cycled, duplicated and similarly manipulated. Specific layer and layer set operations are discussed in Section 5.5—Operations on Layers.

The contribution of a particular layer to the total animation may be visualized in several ways. The numerical data within layer motion channels may be viewed and edited in a spreadsheet or curve editor. The animation may be played back while the user toggles the layer on and off, or soloed and non-soloed, and observes the change. The animation may be played back simultaneously in both enabled and disabled state, with geometry rendered opaquely with the layer enabled and translucently (i.e., ghosted) with the layer disabled, or vice versa. More generally, the user may specify two sets of enable states for the layers, and then view the difference between these sets by simultaneously rendering one set opaquely and the other set ghosted.

5.5 Operations on Layers

The user may perform various operations on the active layer, on multiple selected layers, and on layer sets. Layers may be converted to kinematic or sampled layer classes, as described in Section 5.2. Layers may be locked and unlocked, enabled and disabled, cycled (via the time-course avar), faded (via the envelope avar), cleared and so on as described in previous sections. Layers may be duplicated, producing a new layer with motion channels identical to those in the original layer. Layers may be renamed. Layers may be moved into a different layer set provided that the user has write access to that set.

Multiple selected layers may be flattened into a single layer by merging the motion channels between layers. If the layers to be flattened are not all of the same layer class, the layers will first be converted to a common class, either kinematic (via curve fitting) or sampled (via channel sampling) according to user preference.

A single layer may be decomposed into multiple layers in a number of ways. The motion channels affecting selected geometry may be extracted into a new layer. The portion of all motion channels affecting a selected time range may be extracted into a new layer. More generally, the user may select some geometry and a time range, and extract the motion-channel data for the selected geometry over just the selected time range into a new layer. The geometry whose motion is to be extracted may be specified via regexp "regular expressions"; for example, the user may specify all avars whose pathname matches "*Foot", thereby identifying two avars "LeftFoot/midBend" and "RightFoot/midBend".

The user may specify a range infrequency-space to extract into a new layer. The channel data will be converted to the sampled class (Section 5.2) and a Fast-Fourier Transform (FFT) of the channel data will be performed. The data in the specified frequency band will then be copied or moved (as specified in command-option dialogs) into a new layer. Several frequency ranges may be specified, producing multiple band-specific layers. By adjusting the alpha (Section 5.1) of the layers so extracted and then flattening these layers back into a single layer, the user may perform parametric equalization of the animation data. To ease this process, we provide a single-step parametric equalization dialog with fully adjustable band centers, widths and gains for a user-specified number of bands. This is implemented by performing an FFT, decomposing by band, and recomposing with the specified equalization. We similarly provide a single-step notch filter using the same technique.

We provide other analogs to audio signal processing, allowing the user to limit, compress, expand, compress-expand (compand), gate, and duck the motion-channel signals. A compressor provides an automatic form of level-control, attenuating high levels and thereby reducing the dynamic range. A limiter is an extreme form of compressor that provides very sharp attenuation above a set level. An expander attenuates the signal below some threshold, reducing low-level noise and expanding the dynamic range. A gate is an extreme form of expander that sharply attenuates signals below some threshold, suppressing noise when the signal is low. A compander combines a compressor with an expander, increasing dynamic range while avoiding excessive output level. Ducking attenuates a signal when another signal exceeds some threshold, allowing one layer to automatically override another layer when a signal (i.e., motion) of significant magnitude is present, and have no effect otherwise. The user can specify both the primary and override layers for ducking; the other effects involve a single layer.

Channel data may be smoothed or sharpened via one-dimensional convolution. More generally, any finite-kernel convolution filter, specifiable by the user, may be convolved over the channels within a layer.

The difference between two layers may be extracted as a new layer. "Difference" is interpreted relative to the channel layering policy, with additive channels being subtracted and multiplicative channels divided.

Sampled layers may be resampled at different sampling rates. Upsampling produces data at a higher sample rate. Downsampling produces data at a lower rate. We use a cubic resampling technique described in D. P. Mitchell and A. N. Netravali, *Reconstruction filters in computer graphics*. Computer Graphics, (Proceedings of SIGGRAPH 88), 22(4):221-228, August 1988, which article is incorporated by reference herein in its entirety. Other sampling methods are possible.

Entire layers may be scaled and biased. This is accomplished by applying a gain and bias to every motion channel within the layer, in the exactly the same way gain and bias are applied to node inputs and outputs as described in Section 1.13. Similarly, a layer may be shifted or stretched in time, by retiming and stretching the animation in all channels within the layer as described for single-channel editing in Section 4.2.4. Indeed, most of the operations that may be performed on individual avars may also be performed across entire layers, with the software simply applying the given operation to each channel within the layer. The notable exceptions to this are operations that depend upon the data type of an avar, for example, setting knot values.

6.0 User System Architecture

Figure 12:
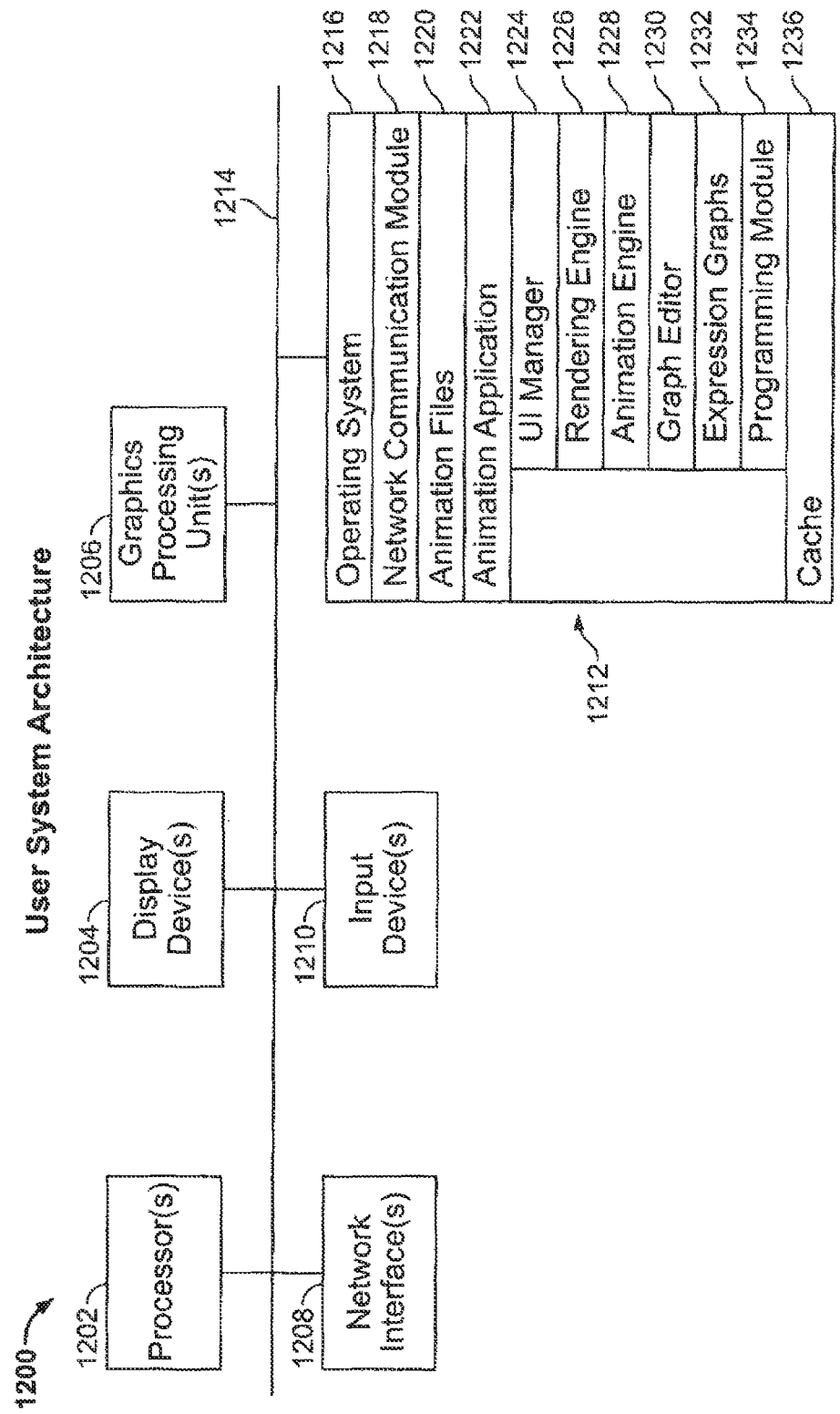
FIG. 12 is a block diagram of exemplary user system architecture.

FIG. 12 is a block diagram of an exemplary user system architecture 1200 for hosting an animation application. The architecture 1200 includes one or more processors 1202 (e.g., IBM PowerPC®, Intel Pentium® 4, etc.), one or more display devices 1204 (e.g., CRT, LCD), one or more graphics processing units 1206 (e.g., NVIDIA® Quadro FX 4500, GeForce® 7800 GT, etc.), one or more network interfaces 1208 (e.g., Ethernet, FireWire, USB, etc.), one or more input devices 1210 (e.g., keyboard, mouse, etc.), and one or more computer-readable mediums 1212 (e.g. SDRAM, optical disks, hard disks, flash memory, L1 or L2 cache, etc.). These components exchange communications and data via one or more buses 1214 (e.g., EISA, PCI, PCI Express, etc.).

The term "computer-readable medium" refers to any medium that participates in providing instructions to a processor 1202 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 1212 further includes an operating system 1216 (e.g., Mac OS®, Windows®, Linux, etc.), a network communication module 1218, animation files 1220, an animation application 1222 and cache memory 1236. The animation application 1222 can be integrated with other applications or be configured as a plug-in to other applications. In some implementations, the animation application 1222 includes a UI manager 1224, a rendering engine 1226, an animation engine 1228, a graph editor 1230, expression graphs 1232 and a programming module 1234.

The operating system 1216 can be multi-user, multiprocessing, multitasking, multithreading, real-time and the like. The operating system 1216 performs basic tasks, including but not limited to: recognizing input from input devices 1210; sending output to display devices 1204; keeping track of files and directories on computer-readable mediums 1212 (e.g., memory or a storage device); controlling peripheral devices (e.g., disk drives, printers, GPUs 1206, etc.); and managing traffic on the one or more buses 1214. The network communications module 1218 includes various components for establishing and maintaining network connections (e.g., software for implementing communication protocols, such as TCP/IP, HTTP, Ethernet, etc.). The animation application 1220, together with its components, implements the various tasks and functions, as described with respect to FIGS. 1-11. The UI manager 1224 is responsible for the generation and display of user interfaces. The rendering and animation engines 1226, 1228, are responsible for renderings and animating bodies in the display environment. The graphic editor 1230 is described in Section 1.19. The expression graphs are described in Section 1.1. The programming module 1234 is responsible for the modeling, expression and animation languages described in Section 2. The cache 1236 is used in adaptive/temporal caching described in Section 1.

The user system architecture 1100 can be implemented in any electronic or computing device capable of hosting an animation application, including but not limited to: portable or desktop computers, workstations, main frame computers, network servers, etc.

Various modifications may be made to the disclosed implementations and still be within the scope of the following claims.

What is claimed is:

1. A computer graphics animation method, wherein user inputs are received by a computer graphics application and motion sequences of elements of a geometric model in a scene space are output corresponding, at least approximately, to the user inputs, the method comprising:

providing, to a user device, a display environment for presentation of the scene space on a display device;

providing, to the user device, a camera view of a body in the display environment, the body including a tracked point present in the scene space, wherein the tracked point is a point on, or relative to, a portion of the body;

associating one or more control mechanisms with the body, wherein a control mechanism of the one or more control mechanisms corresponds to a corresponding control parameter that defines movement of a corresponding portion of the body and/or a rate of movement in time of the portion of the body for changes in value of the corresponding control parameter, and wherein a plurality of control parameters define a parameter space distinct from the scene space with dimensions of the parameter space corresponding to the plurality of control parameters;

associating at least some of the user inputs as inputs to the one or more control mechanisms, wherein changes in values of the plurality of control parameters specify animation details;

providing, to the user device, in the camera view of the body, a motion path of the tracked point;

receiving motion path user inputs corresponding to values of the motion path in the scene space; and translating, using an inverse mapping, the values of the motion path in the scene space into the values of the plurality of control parameters wherein when the body is animated, the values of the plurality of control parameters in the parameter space are such that the tracked point follows, at least approximately, the motion path in the scene space.

2. The computer graphics animation method of claim 1, further comprising:

controlling the motion path relative to a user-specified reference that is at least one of a world space, another portion of the body, a moving camera, or a node in a scene; and providing for display the motion path relative to the user-specified reference.

3. The computer graphics animation method of claim 1, where the tracked point is at least one of:

a user-specifiable point on, or relative to, a surface of the body; or a user-specifiable point on, or relative to, a skeleton to which the surface of the body is bound.

4. The computer graphics animation method of claim 1, further comprising:

providing one or more visual markings along at least a segment of the motion path, wherein the visual markings represent the motion path user inputs for at least one of a position, a rate of interpolation, a motion tangent, or a rate of twist.

5. The computer graphics animation method of claim 4, wherein providing the one or more visual markings includes providing a spacing between two visual markings, the spacing indicating the rate of interpolation, where at least one visual marking of the visual markings corresponds to slide input to adjust the spacing and control the rate of interpolation, wherein the slide input is along the motion path or on a handle associated with the visual marking.

6. The computer graphics animation method of claim 1, further comprising:

providing one or more visual indications along the motion path, each visual indication indicating a position of the tracked point corresponding to an animation time, where an adjustment of the one or more visual indications changes the animation time.

7. The computer graphics animation method of claim 1, further comprising:

stretching the motion path in time to improve visibility of the motion path, the stretching including:

mapping the time to three dimensional vectors in a three dimensional space, each three dimensional vector having a direction and a magnitude, wherein:

the direction of the three dimensional vector controls the direction in which the motion path is stretched; and the magnitude of the three dimensional vector controls an amount in which the motion path is stretched.

8. The computer graphics animation method of claim 1, further comprising:
   receiving timing or rate user inputs corresponding to values of timing of the tracked point along the motion path; and
   adjusting a timing of changes in the values of the plurality of control parameters, using inverse mapping, wherein when the body is animated, the values of the plurality of control parameters in the parameter space are such that the tracked point follows, at least approximately, the motion path in the scene space at a timing that, at least approximately, corresponds to the timing or the rate user inputs.

9. The computer graphics animation method of claim 8, wherein the timing or rate user inputs are represented by knots on the motion path.

10. The computer graphics animation method of claim 9, wherein the knots include tangent handles that specify position and tangency of the tracked point in the scene space.

11. The computer graphics animation method of claim 10, wherein the tangent handles and controls associated with a knot on the motion path are automatically shown and hidden in response to user interactions in the display environment.

12. The computer graphics animation method of claim 8, wherein the timing or rate user inputs are represented by visual beads on the motion path.

13. The computer graphics animation method of claim 1, further comprising:
   determining the portion of the body and the tracked point automatically in response to user interactions with the body in the display environment.

14. The computer graphics animation method of claim 1, further comprising:
   displaying visual markings along the motion path with a rate of interpolation along a respective segment of the motion path indicated by the visual markings, wherein the visual markings are visual beads drawn at regular time intervals on the motion path and wherein spacing between the visual beads corresponds to the rate of interpolation along a respective segment of the motion path.

15. The computer graphics animation method of claim 1, where providing for display of the motion path comprises:
   bleeding the motion path through an obscuring object.

16. The computer graphics animation method of claim 1, where providing for display of the motion path comprises:
   providing for display of the motion path using one or more color modes that include at least one of:
   a colorstriping mode, where the motion path is to be displayed in multiple alternating colors, where the multiple alternating colors change based on a time interval, at each display position where the one or more control mechanisms are displayed, or at user-specified markers;
   a color shift mode, where a portion of the motion path preceding a specified time is to be displayed in a first color, and a portion of the motion path following the specified time is to be displayed in a second color that is different from the first color; and
   a fade out mode, where the motion path fades out at points progressively farther in time from the specified time.

17. The computer graphics animation method of claim 1, wherein the motion path is a first motion path and the method further comprises providing for display of a second motion path, where the second motion path is at least one of:
   a motion path associated with a second point of the body;
   a motion path associated with another body; or
   a motion path based on which the body is animated differently from animation based on the first motion path.

18. A system, comprising:
one or more processors configured to perform operations comprising:
a computer-readable medium coupled to the processor and operable for storing instructions, which, when executed by the processor, causes the processor to perform operations comprising:
   (1) providing, from an animation application to a user device, a display environment for presentation of a scene space on a display device, wherein the animation application is a component of the computer-readable medium;
   (2) providing, from the animation application to the user device, a camera view of a body in the display environment, the body including at least one tracked point present in the scene space, wherein the tracked point is a point on, or relative to, a portion of the body;
   (3) associating one or more control mechanisms with the body, wherein a control mechanism of the one or more control mechanisms corresponds to a corresponding control parameter that defines movement of a corresponding portion of the body and/or a rate of movement in time of the portion of the body for changes in value of the corresponding control parameter, and wherein a plurality of control parameters define a parameter space distinct from the scene space with dimensions of the parameter space corresponding to the plurality of control parameters;
   (4) associating first user inputs as inputs to the one or more control mechanisms, wherein changes in values of the plurality of control parameters specify animation details;
   (5) providing, from an animation application to a user device, in the camera view of the body, a motion path of the tracked point;
   (6) receiving second user inputs corresponding to values of the motion path in the scene space; and
   (7) translating, using an inverse mapping, the values of the motion path in the scene space into the values of the plurality of control parameters wherein when the body is animated, the values of the plurality of control parameters in the parameter space are such that the tracked point follows, at least approximately, the motion path in the scene space.

19. The system of claim 18, where providing for display of the motion path comprises:
   bleeding the motion path through an obscuring object.

20. The system of claim 18, where providing for display of the motion path comprises:
   providing for display of the motion path using one or more color modes that include at least one of:
   a colorstriping mode, where the motion path is to be displayed in multiple alternating colors, where the multiple alternating colors change based on a time interval, at each display position where the one or more control mechanisms are displayed, or at user-specified markers;
   a color shift mode, where a portion of the motion path preceding a specified time is to be displayed in a first color, and a portion of the motion path following the specified time is to be displayed in a second color that is different from the first color; and a fade out mode, where the motion path fades out at points progressively farther in time from the specified time.

21. The system of claim 18, where providing for display of the motion path comprises:
controlling the motion path relative to a user-specified reference that is at least one of a world space, another portion of the body, a moving camera, or a node in a scene; and
providing for display the motion path relative to the user-specified reference.

22. The system of claim 18, where the tracked point is at least one of:
a user-specifiable point on, or relative to, a surface of the body; or
a user-specifiable point on, or relative to, a skeleton to which the surface of the body is bound.

23. The system of claim 18, wherein the operations further comprise:
providing one or more visual markings along at least a segment of the motion path, wherein the visual markings represent the motion path user inputs for at least one of a position, a rate of interpolation, a motion tangent, or a rate of twist.

24. The system of claim 23, wherein providing the one or more visual markings includes providing a spacing between two visual markings, the spacing indicating the rate of interpolation, where at least one visual marking of the visual markings corresponds to slide input to adjust the spacing and control the rate of interpolation, wherein the slide input is along the motion path or on a handle associated with the visual marking.

25. The system of claim 18, where providing for display of the motion path comprises:
providing one or more visual indications along the motion path, each visual indication indicating a position of the tracked point corresponding to an animation time, where an adjustment of the one or more visual indications changes the time.

26. The system of claim 18, where providing for display of the motion path comprises:
stretching the motion path in time to improve visibility of the motion path, the stretching including:
mapping the time to three dimensional vectors in a three dimensional space, each three dimensional vector having a direction and a magnitude, wherein:
the direction of the three dimensional vector controls the direction in which the motion path is stretched; and
the magnitude of the three dimensional vector controls an amount in which the motion path is stretched.

27. The system of claim 18, wherein the motion path is a first motion path and the operations further comprise providing for display of a second motion path, where the second motion path is at least one of:
a motion path associated with a second point of the body;
a motion path associated with another body; or
a motion path based on which the body is animated differently from animation based on the first motion path.

28. The system of claim 18, wherein the operations further comprise:
receiving timing or rate user inputs corresponding to values of timing of the tracked point along the motion path; and
adjusting a timing of changes in the values of the plurality of control parameters, using inverse mapping, wherein when the body is animated, the values of the plurality of control parameters in the parameter space are such that the tracked point follows, at least approximately, the motion path in the scene space at a timing that, at least approximately, corresponds to the timing or rate user inputs.

29. The system of claim 28, wherein the timing or rate user inputs are represented by knots on the motion path.

30. The system of claim 29, wherein the knots include tangent handles that specify position and tangency of the tracked point in the scene space.

31. The system of claim 30, wherein the tangent handles and controls associated with a knot on the motion path are automatically shown and hidden in response to user interactions in the display environment.

32. The system of claim 28, wherein the timing or rate user inputs are represented by visual beads on the motion path.

33. The system of claim 18, wherein the operations further comprise:
determining the portion of the body and the tracked point automatically in response to user interactions with the body in the display environment.

34. The system of claim 18, wherein the operations further comprise:
displaying visual markings along the motion path with a rate of interpolation along a respective segment of the motion path indicated by the visual markings, wherein the visual markings are visual beads drawn at regular time intervals on the motion path and wherein spacing between the visual beads corresponds to the rate of interpolation along a respective segment of the motion path.

35. A computer program product, stored on a non-transitory storage device, operable to cause one or more processors coupled to the non-transitory storage device to perform operations comprising:
providing a display environment for presentation of a scene space on a display device;
providing a camera view of a body for display in the display environment, the body including a tracked point present in the scene space, wherein the tracked point is a point on, or relative to, a portion of the body;
associating one or more control mechanisms with the body, wherein a control mechanism of the one or more control mechanisms corresponds to a corresponding control parameter that defines movement of a corresponding portion of the body and/or a rate of movement in time of the portion of the body for changes in value of the corresponding control parameter, and wherein a plurality of control parameters define a parameter space distinct from the scene space with dimensions of the parameter space corresponding to the plurality of control parameters;
associating first user inputs as inputs to the one or more control mechanisms, wherein changes in values of the plurality of control parameters specify animation details;
providing, in the camera view, a motion path of the tracked point;
receiving second user inputs corresponding to values of the motion path in the scene space; and
translating, using an inverse mapping, the values of the motion path in the scene space into the values of the plurality of control parameters wherein when the body is animated, the values of the plurality of control parameters in the parameter space are such that the tracked point follows, at least approximately, the motion path in the scene space.

36. The computer program product of claim 35, wherein the motion path is a first motion path and the operations further comprising providing for display of a second motion path, where the second motion path is at least one of:
a motion path associated with a second point of the body;
a motion path associated with another body; or
a motion path based on which the body is animated differently from animation based on the first motion path.

37. The computer program product of claim 35, where providing for display of the motion path comprises:
controlling the motion path relative to a user-specified reference that is at least one of a world space, another portion of the body, a moving camera, or a node in a scene; and
providing for display the motion path relative to the user-specified reference.

38. The computer program product of claim 35, where the tracked point is at least one of:
a user-specifiable point on, or relative to, a surface of the body; or
a user-specifiable point on, or relative to, a skeleton to which the surface of the body is bound.

39. The computer program product of claim 35, wherein the operations further comprise:
providing one or more visual markings along at least a segment of the motion path, wherein the visual markings represent the motion path user inputs for at least one of a position, a rate of interpolation, a motion tangent, or a rate of twist.

40. The computer program product of claim 39, wherein providing the one or more visual markings includes providing a spacing between two visual markings, the spacing indicating the rate of interpolation, where at least one visual marking of the visual markings corresponds to slide input to adjust the spacing and control the rate of interpolation, wherein the slide input is along the motion path or on a handle associated with the visual marking.

41. The computer program product of claim 35, where providing for display of the motion path comprises:
providing one or more visual indications along the motion path, each visual indication indicating a position of the tracked point corresponding to an animation time, where an adjustment of the one or more visual indications changes the time.

42. The computer program product of claim 35, where providing for display of the motion path comprises:
stretching the motion path in time to improve visibility of the motion path, the stretching including:
mapping the time to three dimensional vectors in a three dimensional space, each three dimensional vector having a direction and a magnitude, wherein:
the direction of the three dimensional vector controls the direction in which the motion path is stretched; and
the magnitude of the three dimensional vector controls an amount in which the motion path is stretched.

43. The system of claim 35, where providing for display of the motion path comprises:
bleeding the motion path through an obscuring object.

44. The system of claim 35, where providing for display of the motion path comprises:
providing for display of the motion path using one or more color modes that include at least one of:
a colorstriping mode, where the motion path is to be displayed in multiple alternating colors, where the multiple alternating colors change based on a time interval, at each display position where the one or more control mechanisms are displayed, or at user-specified markers;
a color shift mode, where a portion of the motion path preceding a specified time is to be displayed in a first color, and a portion of the motion path following the specified time is to be displayed in a second color that is different from the first color; and
a fade out mode, where the motion path fades out at points progressively farther in time from the specified time.

45. The computer program product of claim 35, wherein the operations further comprise:
receiving timing or rate user inputs corresponding to values of timing of the tracked point along the motion path; and
adjusting a timing of changes in the values of the plurality of control parameters, using inverse mapping, wherein when the body is animated, the values of the plurality of control parameters in the parameter space are such that the tracked point follows, at least approximately, the motion path in the scene space at a timing that, at least approximately, corresponds to the timing or rate user inputs.

46. The computer program product of claim 45, wherein the timing or rate user inputs are represented by knots on the motion path.

47. The computer program product of claim 46, wherein the knots include tangent handles that specify position and tangency of the tracked point in the scene space.

48. The computer program product of claim 47, wherein the tangent handles and controls associated with a knot on the motion path are automatically shown and hidden in response to user interactions in the display environment.

49. The computer program product of claim 45, wherein the timing or rate user inputs are represented by visual beads on the motion path.

50. The computer program product of claim 35, wherein the operations further comprise:
determining the portion of the body and the tracked point automatically in response to user interactions with the body in the display environment.

51. The computer program product of claim 35, wherein the operations further comprise:
displaying visual markings along the motion path with a rate of interpolation along a respective segment of the motion path indicated by the visual markings, wherein the visual markings are visual beads drawn at regular time intervals on the motion path and wherein spacing between the visual beads corresponds to the rate of interpolation along a respective segment of the motion path.

* * * * *